United States Patent [19]

Klauber et al.

[11] Patent Number: 5,675,094

[45] Date of Patent: Oct. 7, 1997

[54] LOAD VARIATION DETECTOR

[75] Inventors: Robert D. Klauber; Erik B. Vigmostad, both of Fairfield, Iowa

[73] Assignee: Sensortech LP, Fairfield, Iowa

[21] Appl. No.: 585,431

[22] Filed: Jan. 11, 1996

Related U.S. Application Data

[63] Continuation-in-part of Ser. No. 575,739, Dec. 18, 1995, which is a continuation-in-part of Ser. No. 509,733, Aug. 1, 1995, which is a continuation-in-part of Ser. No. 223,522, Apr. 5, 1994, Pat. No. 5,495,774, which is a continuation-in-part of Ser. No. 74,861, Jun. 10, 1991, Pat. No. 5,313,826, which is a continuation-in-part of Ser. No. 720,240, Jun. 24, 1991, Pat. No. 5,269,178, which is a continuation-in-part of Ser. No. 625,222, Dec. 10, 1990, Pat. No. 5,287,735.

[51] Int. Cl.$^6$ ............................................. G01L 3/02
[52] U.S. Cl. ............................................. 73/862.191
[58] Field of Search .................. 73/763, 862.333, 73/862.334, 862.335, 862.336, 862.191, 118.1, 116, DIG. 2; 324/34; 364/431.08

[56] References Cited

U.S. PATENT DOCUMENTS

| | | | |
|---|---|---|---|
| 2,053,560 | 9/1936 | Janovsky | 177/351 |
| 2,081,748 | 5/1937 | Janovsky | 177/351 |
| 2,370,845 | 2/1945 | Davis | 175/183 |
| 2,553,833 | 5/1951 | Rifenbergh | 73/136 |
| 2,637,205 | 5/1953 | Miller | 73/136 |
| 2,912,642 | 11/1959 | Dahle | 324/34 |
| 3,681,982 | 8/1972 | Hiratsuka et al. | 73/141 A |
| 4,541,289 | 9/1985 | Valdemarsson . | |
| 4,802,368 | 2/1989 | Nordvall . | |
| 4,825,709 | 5/1989 | Nordvall . | |
| 4,833,926 | 5/1989 | Todoroki et al. | 73/862.333 X |

Primary Examiner—Elizabeth L. Dougherty

[57] ABSTRACT

A method and apparatus to detect variations in load by comparing signals related to, but not necessarily accurately correlated with, stress/strain states of a load transmitting member. In one embodiment, a first signal is obtained relating to the time rate of change of stress in the member produced by a first loading event or series of events. A second signal is obtained which relates to the time rate of change of stress in the member produced by a second loading event or series of events. The first and second signals are compared to detect significant variations in loading. Each of the two signals may be a composite of other signals. A magnetostrictive sensor may preferably be used to obtain the signals relating to the stress in the load transmitting member. The load may be applied force, torque, stress, strain, or deflection. In another embodiment, the time rate of change of a single segment of an analog signal related to, but not directly correlated with, stress is used to determine rapid changes in load. In yet another embodiment, a statistical value derived from a plurality of signals is used to determine variation in load. Applications comprise internal combustion engine and driveline torque variation diagnostics, brake pedals, and suspension systems.

19 Claims, 20 Drawing Sheets

AIR GAP

ROTATION

ROTATING ENGINE CRANKSHAFT

CYLINDER #1 FIRING

CYLINDER #3 FIRING

CYLINDER #4 FIRING

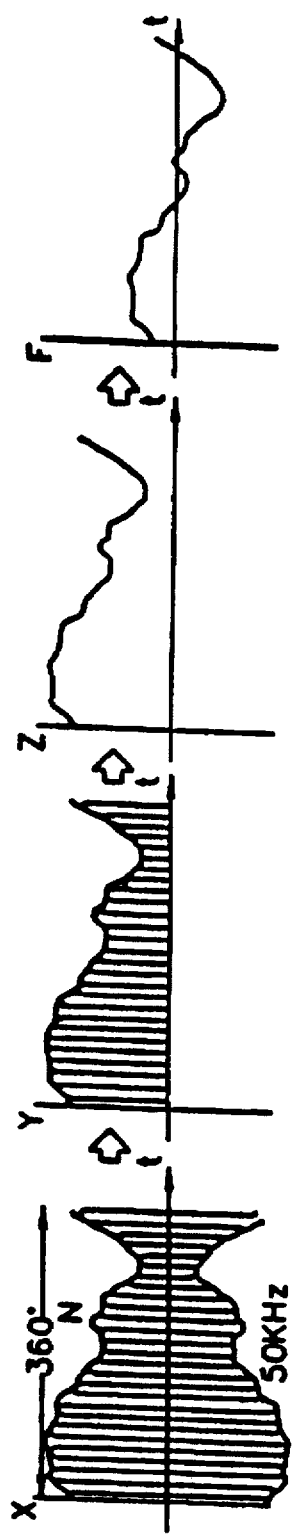
FIG. 14E
FIG. 14D
FIG. 14C
FIG. 14B
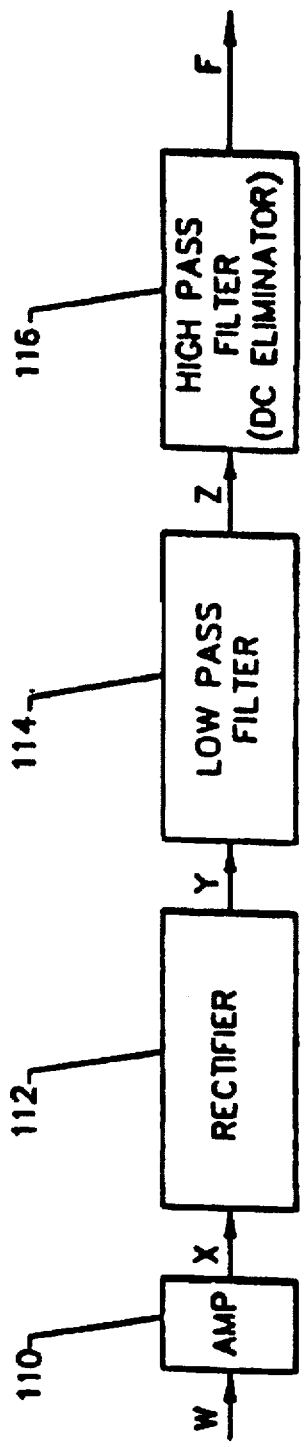
FIG. 14A

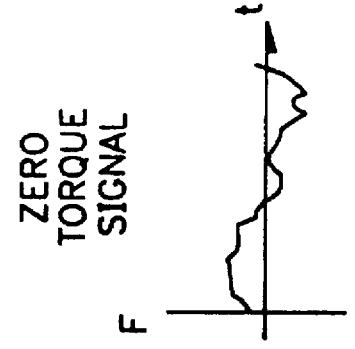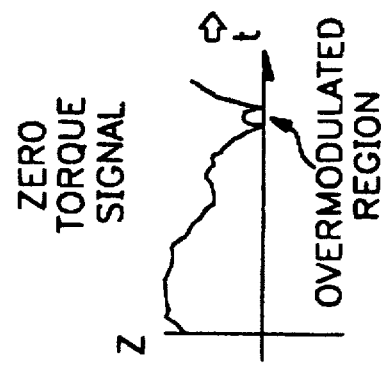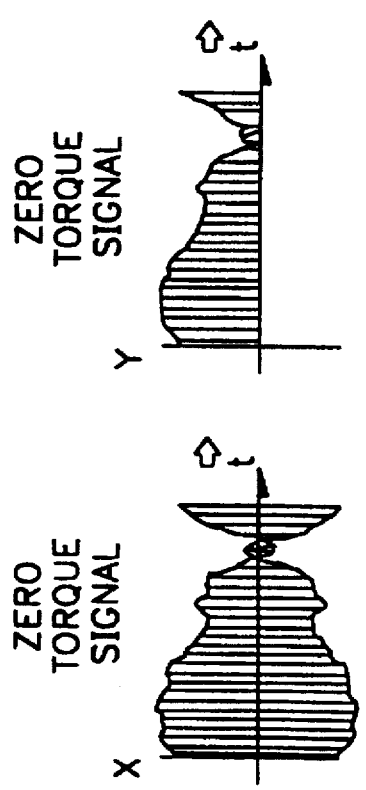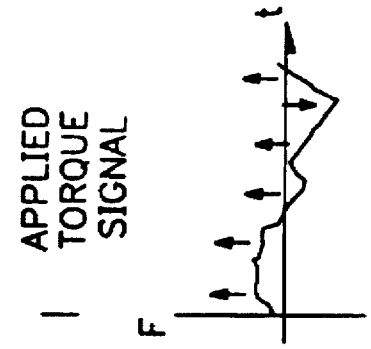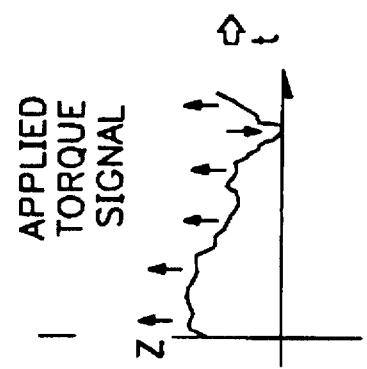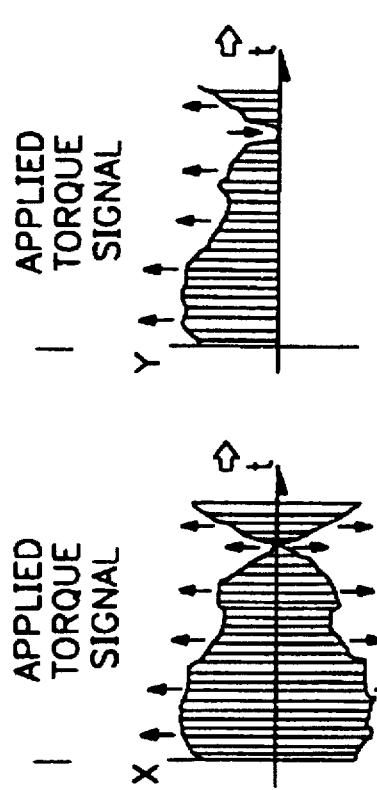

LOAD VARIATION DETECTOR

RELATED APPLICATIONS

The present application is a continuation-in-part (CIP) of co-pending application entitled "Stress and Load Variation Detector" Ser. No. 08/575,739, filed Dec. 18, 1995 which is a CIP of co-pending application entitled "Engine Misfire, Knock or Roughness Detection Method and Apparatus", Ser. No. 08/509,733, filed Aug. 1, 1995; which is a CIP of application Ser. No. 08/223,522 filed Apr. 5, 1994, now U.S. Pat. No. 5,495,774; which is a CIP of U.S. Ser. No. 074,861, now U.S. Pat. No. 5,313,826 filed Jun. 10, 1993; which is a CIP of U.S. Ser. No. 720,240, now U.S. Pat. No. 5,269,178 filed Jun. 24, 1991; which is a CIP of U.S. Ser. No. 625,222, now U.S. Pat. No. 5,287,735 filed Dec. 10, 1990.

FIELD OF THE INVENTION

The invention relates to a method for discerning between (typically undesirable and/or irregular) variations in stress/load and more uniform stress/load states in a load carrying member, such as a shaft under torque, or a mechanical structure under force, in applications wherein direct measurement of load is infeasible, and wherein valuable load variation diagnostic information may be obtained via a sensor signal which may be only partially dependent on the load and otherwise dependent on other factors such as, but not limited to, temperature, magnetic permeability, material anisotropies, other material properties, drift with time, air gap, and/or the like. In the present invention, the sensor signal is typically obtained from a magnetostrictive sensor, and the load variations may be variations in torque, force, stress, strain, linear deflection, angular deflection and/or the like. Typical applications comprise internal combustion engine misfire or other irregular automotive or non-automotive torque conditions; brake pedal/shaft force and stress variations; and automotive suspension system force/stress variations.

BACKGROUND OF THE INVENTION

There are a number of applications, particularly within the auto industry, for an inexpensive and simple device which could discern between relatively smooth applied loads (e.g., torque, force, stress, strain, displacement) and irregular or varying such loads. In anti-lock braking (ABS) systems, for instance, foot pressure on the pedal should be steady for best braking performance. Many people have, however, been trained to "pump" their brakes when sliding. Pumping of the brake pedal in ABS systems therefore reduces, in some instances drastically reduces, brake performance. Hence, there is a need for a simple, inexpensive means for discerning between pumping (varying) loads and more steady foot force loads on the brake pedal. With this discernment, the ABS system electronics could automatically adjust the braking system response to compensate for any pumping action applied by the vehicle operator. The present invention, as will be shown, provides a method and apparatus for sensing and discerning between relatively uniform and irregular foot pressure loading applied by the operator.

Another suitable application involves automotive vehicle or other types of suspension systems. As an automobile hits bumps or other irregular road surfaces, it exhibits sudden changes in orientation which are related to the rapidly varying force loads being transmitted through the suspension systems. It is possible, however, in modern suspension systems, to provide computer control to the system which can effectively smooth out the rapid force variations induced in the wheels by the road surface before such forces are transmitted through to the vehicle compartment and the passengers. These "active" suspension systems use sophisticated electronics to make near instantaneous adjustments to various physical parameters of the system, and thereby smooth out the force variations. To do so, however, such systems need a means to distinguish between rough roads (rapid force variations) and smooth roads (relatively uniform force with little variation). As will be seen, the present invention comprises a simple method and apparatus to make such a distinction.

Misfire detection is another application for discernment of rapid force variations. (See later extensive discussion relating misfire detection to torque variations.) A sensor placed on or in the structure near or under a given cylinder would experience different force variations for a normal or abnormal cylinder firing. The methods shown hereinbelow to detect misfire, knock, or engine roughness due to torque variations may be used according to the present invention thereby for force (or stress/strain) variations to the same end.

Prior art methodologies for discerning load variations invariably entail load cells, typically employing strain gages, to make precise measurements of the load. An accurate, repeatable, mathematically explicit, correlation exists between the load being measured and the signal produced by the sensor (strain gage, transducer, etc) which monitors the load. Since the actual load is known to good accuracy, it is a simple matter to detect and flag load variations. The present invention, on the other hand, permits the effective use of a sensing system, such as a magnetostrictive sensing system, which for various "real world" physical reasons, may not be capable of providing an accurate correlation between load (as typically measured in pounds, pound-feet, psi, inches, inches per inch, etc) and sensor output (typically volts, milli-volts, milli-amps, etc).

Prior art configurations do not have the durability required for long term automotive and other application uses. For example, a strain gage mounted externally on a suspension system component such as a spring would have essentially zero probability of lasting even 10,000 miles, let alone the 100,000 miles modern day automotive manufacturers are demanding. Still further, such gages are virtually impossible to apply consistently and successfully in a mass production environment. Additionally, such sensing systems are vulnerable to temperature variations, and would be quite costly.

The present invention, as will be seen below, solves all of these prior art force variation sensing problems in a simple, inexpensive, and elegant manner, and does so in a unique and heretofore unprecedented way.

Further, the present invention may be employed to determine significant variations, not just of force, but of torque, stress, strain, deflection, and the like as well. A particularly useful application comprises misfire detection monitoring in automotive engines. It and other internal combustion engine torque variation applications are discussed in the ensuing paragraphs.

Two primary objectives of automobile engine control systems are to maximize engine performance, such as power for passing, etc., and to minimize fuel consumption. Rough running engines affect both power output and fuel economy adversely. On-board monitoring and control systems should be able to detect and, in some instances, correct for such roughness. Roughness may be due to incomplete burning of fuel in one or more cylinders. Extreme engine roughness occurs during cylinder misfire is, when no fuel is burned in one or more cylinders. Misfire can occur for several reasons, including lack of spark from the ignition system, malfunctioning of the fuel injection system, lack of sufficient air intake, faulty valves, etc.

While detection of roughness and misfiring during vehicle operation is highly desirable from the standpoints of performance and fuel economy, it has significant environmental impact as well. Incomplete burning of fossil fuels is a prime source of air pollution. An engine which misfires only 2% of the time, for example, may produce pollutant levels which exceed emission standards by 150%.

Governmental regulations covering emissions caused by cylinder misfire are being proposed. For example, the state of California has already notified automobile manufacturers that beginning with the 1994 model year, vehicles sold in California must have on-board means for detecting and warning of cylinder misfire. Such means must be capable of identifying which particular cylinder is misfiring, or in the case of multiple cylinder misfire, indicating that more than one cylinder is misfiring. California regulators have also stated they would prefer a system which could additionally: determine precisely which cylinders are misfiring in the case of multiple misfires; identify sporadic, non-periodic misfiring events; detect isolated misfires occurring a small percentage of the time, for example, 5 or fewer misfires for every 1,000 firings; and function properly under all engine speeds and driving conditions. Other states, as well as the U.S. Environmental Protection Agency, have indicated that they may issue cylinder misfire regulations similar to those proposed for California.

Prior art devices for roughness and misfire detection in internal combustion engines have utilized several different approaches. For example, the measurement of rotational speed (RPM) fluctuations is disclosed in U.S. Pat. Nos. 4,843,870 to Citron et al., and 4,932,379 to Tang et al.; and SAE papers #900232 by Plapp et al., #890486 by Citron et al., and #890884 by Rizzoni.

Detecting roughness and misfire has also been attempted by determining the absence of a spark in the ignition system as disclosed in U.S. Pat. Nos. 4,886,029 to Lill et al. and 4,928,228 to Fujimoto. The spark plug has also been used as a plasma probe as described in Johnson and Rado, "Monitoring Combustion Quality in Internal Combustion Engines Using Spark Plug as s Plasma Probe," IEEE Transactions on Vehicular Technology Vol VT-24, No 2, May 1975.

Sensing temperature at the exhaust port of each cylinder is disclosed in U.S. Pat. No. 3,939,711 to Hanaoka. Using non-magnetostrictive torque sensing and speed measurements is disclosed in SAE paper #890485 by Mauer et al. A generic torque sensor and comparison of mean or maximum versus minimum torque signals (and typically other signals such as RPM, accelerator depression level, etc.) to expected values stored in computer memory, is disclosed in U.S. Pat. Nos. 4,606,005 to Ribbens, and 4,940,030 to Morikawa. Monitoring exhaust chemistry, such as with a Lambda oxygen sensor in the exhaust flow, is taught in SAE paper #900232 by Plapp et al.

Each of these prior art approaches has disadvantages and it is likely that none may meet the strict standards that the California regulators and others seek. For example, rotational speed fluctuation detection is computationally intensive, and may be limited to engine speeds below 3500 to 4000 RPM, and has difficulty detecting non-repetitive misfires. Moreover, engine speed detection is subject to false alarms for vehicles operating on rough roads. A rough road will induce speed changes into the engine driveline at the drive wheels, irrespective of any engine misfire. These road induced speed changes will effectively mask the changes in speed that may be caused by engine misfire.

Detecting the absence of a spark will not detect misfire if the misfire is caused by fuel injection, valve, or other mechanical malfunctions. Plasma probing, temperature sensing, and exhaust gas chemistry sensing are all too slow and, heretofore, impractical for detecting low percentage misfire states. Further, exhaust gas sensing cannot identify which cylinder, or cylinders, are faulty. Torque sensing using non-magnetostrictive torque sensors are typically too large and unwieldy—often also requiring two or more monitoring locations along the crankshaft. Non-magnetostrictive torque sensors, such as strain gauge torque sensors, are impractical for mass production and extensive usage. U.S. Pat. Nos. 4,606,005 and 4,940,030 disclose using generic torque sensors; however, to the best of Applicants' knowledge, no such sensors currently exist which have proven suitable for automobile engine torque on-board monitoring.

A number of researchers have attempted to develop magnetostrictive torque sensors. Magnetostrictive torque sensors take advantage of the magnetostrictive property of ferromagnetic materials whereby tension stress in the material causes an increase in an induced magnetic field B in the material. Compressive stress causes a decrease in the induced magnetic field B. Typically an alternating current carrying coil is used to induce the magnetic field B into a ferromagnetic torque transmitting shaft. A secondary pickup coil, or other means, then monitors the change in the induced magnetic field B as the stress of the shaft changes with torque. The voltage signal generated across the secondary coil is an indicator of the torque. Specific geometry and the number of coils may vary for different magnetostrictive torque sensor designs, but the underlying principle is the same.

Typical magnetostrictive torque sensors are disclosed in U.S. Pat. Nos. 4,760,745 to Garshelis; 2,912,642 to Dahle; 4,414,856 to Winterhof; 4,589,290 to Sugiyama; 4,697,459 to Nonomura et al.; 4,939,937 to Klauber et al.; and application Ser. No. 07/518,083 to Klauber et al. The sensor disclosed in U.S. Pat. No. 4,760,745, for example, is a four solenoidal coil design which is inherently larger and is, therefore, typically more expensive and less suited for automotive application than the other types of magnetostrictive torque sensors. The other sensors may be miniaturized and are less expensive, but are limited by the random anisotropic variations in magnetic permeability of the iron and steel materials used in production crankshafts and driveshafts. These variations are inherent in the material and distort any measured induced magnetic field changes thereby resulting in inaccuracies and prohibiting the instantaneous monitoring of the power variations for individual cylinder misfiring or firing events.

In U.S. Pat. No. 4,716,773 and SAE paper #870472, Nonomura et al. show a cross design (two coil) magnetostrictive stress detector utilizing a phase adder circuit which adds a signal derived from the input voltage of the exciting coil to the filtered output signal from the pickup coil. The added signal is derived by shifting the phase and altering the amplitude of the input voltage. By adding this derived signal to the output voltage in the appropriate manner, the resulting signal is linearized (i.e., the relationship between output voltage and stress is made more linear). As shown herein, one embodiment of the present invention accomplishes the same end by different means not requiring the amplitude regulator or phase shifter needed by Nonomura et al. Further, the present invention is not limited to cross design magnetostrictive sensors. As will be seen the present invention has still other advantages, such as correction of overmodulation, not shown by Nonomura et al.

Applicants are currently unaware of any system for roughness or misfire detection which is completely satisfactory. Moreover, Applicants are unaware of any system which may satisfy more stringent environmental regulations, such as those pending in California.

The present invention may also be suited for a number of other uses. For example, during engine knock, the fuel in the cylinder ignites at an earlier point of the firing cycle and lasts for a much shorter period of time. When knock occurs, the combustion process is typically over near the point at which normal combustion would be just beginning. The torque pulse delivered during knock is therefore much shorter in width, different in magnitude, and located at a different location with respect to top dead center (TDC). Hence, comparison of signals such as those described herein to determine misfire or roughness can be used in similar fashion to determine knock.

Other uses according to the present invention include anti-lock braking wherein obtaining of peak braking torque is critical. By using the methodology shown herein, comparison of signals generated at the same or different points on a shaft\wheel system can result in a relative indication of torque, i.e., even though the actual value for torque may not be determined, it may be possible to determine when the maximum amount of torque is occurring. Feedback systems would then automatically seek the maximum signal, thereby maximizing braking torque, without actually having to determine the precise value of the torque. Similar logic holds for traction control systems wherein maximum traction torque is desired. Additionally, such comparisons of signals may be used in transmissions to facilitate smooth shifting without sudden torque shifts. Smoothness of torque transitions may be obtained, again without necessarily having to determine the actual value of the torque. Still another applications includes bearing failure monitoring in which the signals monitored should increase in magnitude as the bearing operation became rougher. Yet other applications includes machine tool monitoring, electric motors, generators, and any other devices wherein comparison of signals is at least partially dependent on torque may be useful.

SUMMARY OF THE INVENTION

It is therefore an object of the present invention to provide a method and apparatus that does not require actual load measurement to detect significant variations in load.

It is another object of the present invention to provide a method and apparatus for discerning variations in force that do not require accurate measurement of force.

It is yet another object of the present invention to provide a method and apparatus for discerning variations in stress that do not require accurate measurement of stress.

It is still another object of the present invention to provide a method and apparatus for discerning between steady operator applied brake pressure and pumping of the brake.

It is a further object of the present invention to provide a method and apparatus for detecting rapid variations in road induced suspension system force(s).

It is still another object of the present invention to provide a method and apparatus for providing accurate engine roughness or misfire detection using available magnetostrictive sensors which are compact and may be readily adapted for existing engines.

It is a further object of the present invention to provide a method and apparatus for providing accurate engine roughness or misfire detection nearly instantaneously and with minimal computational requirements.

It is still a further object of the present invention to provide a method and apparatus that does not require actual torque measurement and that may employ any type of torque sensor in a simple and direct manner.

These and other objects are provided according to the present invention, by various signal processing methods particularly adapted for implementation with one or more magnetostrictive sensors. In addition, another aspect of the present invention includes an apparatus and techniques for reducing the undesirable effects of electromagnetic interference (EMI) as may typically be caused by high voltage ignition wiring and the like in close proximity to the magnetostrictive sensor.

The present invention uses a signal dependent on the stress/strain state of a power transmitting shaft in the engine, such as the crankshaft, or connected to the engine, such as the drive shaft. Since stress/strain in a shaft is related to the torque transmitted by the shaft, this signal is a function of torque even though it might not of itself be a direct indicator of torque. This signal may be generated by strain gages mounted on the shaft, by optical or other electromagnetic wave measurement of strain in the shaft, by twist angle measurement of the shaft, by magnetostrictive means, or by any other means. This signal may be a direct and accurate indicator of torque, though it is more typically merely a signal which is partially a function of torque and partially dependent on other factors, such as temperature, shaft material anisotropies, etc. which vary independently of torque. Hence, the signal need not be a direct indication of torque, and the present invention need not incorporate direct torque sensing.

The invention may compare signals generated at different points of the cylinder firing order. For a signal which is an accurate indicator of torque, the torque may be measured when any given combustion chamber, typically a cylinder, is firing and then compared with the very next cylinder that fires. In other embodiments, any cylinder firing can be compared with any other(s). If a given cylinder is misfiring or not burning completely, its torque related signal will be significantly less than that of a properly firing cylinder. A torque related signal difference significantly greater than a given threshold value would indicate roughness; above another threshold, misfiring.

Many variations on this theme lie within the scope of the invention. For example, each cylinder's firing or non-firing event may be compared with more than one or an average of a plurality of other cylinder firing or non-firing events. It may also be compared with one or more or an average of a number of its own previous such events. Statistical comparisons may also be implemented using standard deviations or variances of torque related values.

In addition, each torque related signal can be taken at any given instant during or after the power stroke, or it can be an integrated value over all or some portion of the power stroke or even some portion after the power stroke. The first or any higher time derivative of the signal may be used as well.

Further, the two or more signals to be compared do not necessarily have to be from the same point or region of the firing stroke period. For example, the peak, or near peak torque point in the firing stroke is typically around 35° beyond top dead center (beyond TDC) of the crankshaft rotation in a four cycle engine. A signal related to the torque at this point may be compared with a torque-related signal at any other point in the stroke—typically experiencing a much lower torque, such as the 0° or 90° beyond TDC points of shaft rotation. As another example, the peak (or near peak) torque-related signal may be compared in similar manner with the mean torque signal for the entire stroke, or with the minimum (or near minimum) torque signal, or with an integrated, or other signal. This comparison can be done for each cylinder and calculated as a quantified value, that is, a difference or ratio or any other means for quantification. If this quantified value is less than or greater than a given threshold value, roughness or misfire is indicated.

This quantified value for each cylinder firing stroke may be further (or instead) compared with one or more other such value(s) for another cylinder, a plurality of other cylinders, an average (weighted or otherwise) of a plurality of other cylinders, one or more previous firing event(s) of the same cylinder, some average of previous firing events of the same cylinder, or any combination thereof. A significant disparity of the single event/single cylinder quantified value from one or more of these other possible quantified value(s) indicates roughness or misfire.

The present invention is simpler than approaches disclosed in the prior art and is also highly accurate and reduces computer memory requirements as well. For example, since the present invention compares two signals from two different cylinder events juxtaposed, or nearly juxtaposed, in time, errors from differences in temperature, shaft speed, engine load, level of depression of the accelerator pedal, acceleration effects, etc. are virtually non-existent. The present invention requires no look-up table matrixed via temperature, speed, pedal depression, etc. to determine a reference signal to compare with the monitored signal. One signal from one firing event is simply compared with one or more other firing events which occur under almost identical driving conditions. A difference in the comparison indicates roughness or misfire.

The present invention may also use a magnetostrictive measurement sensor. Such sensors, though greatly advantageous from miniaturization and cost standpoints, have been limited for use in direct torque measurement because of their undesirable signal dependence on temperature, shaft material variations, and shaft speed. However, the present invention may readily use magnetostrictive sensors because the present invention merely compares two signals wherein a quantified value obtained from such a comparison will vary with cylinder pressure, but it will be virtually independent of temperature, shaft speed, and material variations. Hence, the present invention permits inaccurate signals from typical magnetostrictive sensors to be used to yield a truly accurate indication of roughness and, particularly, of the extreme roughness resulting from engine misfire.

Knock sensing may be carried out in similar fashion. Reduction in signal level over the region(s) of the shaft where the torque pulse normally occurs, and increase in signal level in the region(s) where knock occurs may lead to a ready indication of knock. Relative signal comparison at other locations along the drivetrain may be put to other uses as well. For example, torque smoothing may be facilitated in the transmission, and wheel torque maximization may be attained for optimum braking/traction, simply by utilizing signals from signals which are at least partially torque dependent. The invention may likewise be put to many other uses in many other machines and devices which incorporate torque driven shafts.

The present invention, therefore, comprises any embodiments wherein one signal related to stress/strain (and hence torque or force or other loading), wherein such signal may not be an accurate indication of stress/strain (and/or load), is compared with another signal also related to stress/strain, which such other signal may not be an accurate indication of such stress/strain (load), in order to discern variations in stress/strain (load). A magnetostrictive sensor may be employed to obtain the signals, but is not essential. The signals may typically be closely juxtaposed in time. Either signal may be a composite of other signals. Statistical comparison may be carried out and may use standard deviation or variance (or any estimation or expected value of either thereof or similar quantities) to distinguish degrees of variation, or estimates thereof, in stress/strain (load). The present invention, in its various embodiments, thereby solves each of the problems associated with prior art in a superior and wholly satisfactory manner.

BRIEF DESCRIPTION OF THE DRAWINGS

FIG. 14 is a schematic block diagram illustrating a method according to the present invention.

FIGS. 34A–34D are graphical illustrations of the output signal under zero torque conditions.

FIGS. 35A–35D are graphical illustrations of the output signal in response to applied torque.

DETAILED DESCRIPTION OF VARIOUS EMBODIMENTS OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, applicants provide these embodiments so that this disclosure will be thorough and complete, and will fully convey the scope of the invention to those skilled in the art.

Although the invention is primarily a stress variation detector and may therefore be applied to any type (force, torque, deflection, etc) of loading, torque shall be addressed first.

The invention may operate using an accurate and direct torque sensor, but more significantly, the invention does not require such a device. Rather than an accurate and direct torque signal, any signal may be used that is related to torque, as well as related to other factors, such as temperature, shaft material variations, shaft speed, shaft acceleration, accelerator depression level, etc. Since a true, accurate torque sensor does not currently exist meeting size and cost constraints of automobile design, the ensuing descriptions focus on the lattermost of these two cases, that is, the case in which no true torque signal independent of other factors is available. Since several magnetostrictive sensor designs exist which meet cost and design requirements, but that have signal accuracy problems, emphasis in the following description of various embodiments of the present invention will be on using a magnetostrictive sensor. It should be clearly understood that the invention is not limited to magnetostrictive sensors and that other sensors may be used as would be readily understood by those having skill in the art.

Although the description is directed for the most part to four cylinder and four stroke engines, the invention may be used with other combinations of cylinders and with two, or other stroke, engines as would be readily understood by those having skill in the art. Further, "ignition spark" and "timing" as used herein when discussing combustion in a cylinder, also refers equally to non-spark ignited engines, such as diesel engines, as would be readily understood by those having skill in the art. Still further, the invention may be used in any application where the herein described method and apparatus may be used to advantage.

Figure 1:
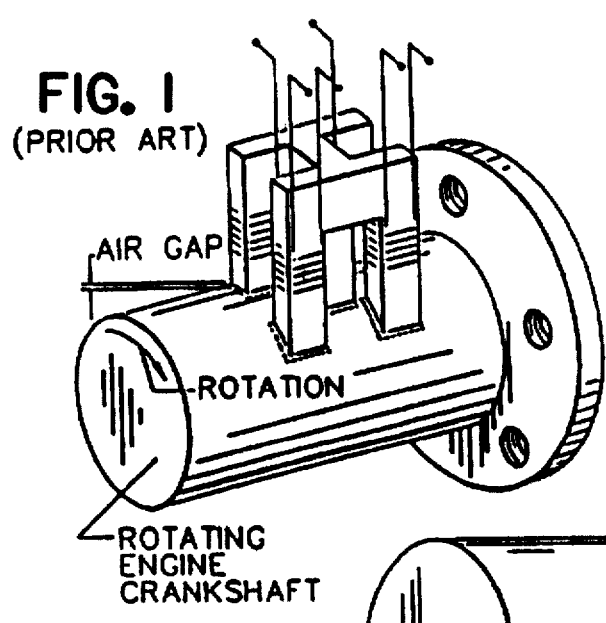
FIG. 1 is a front perspective view of a prior art magnetostrictive sensor design known as the "four branch" design.
Figure 2:
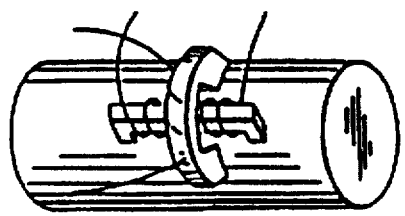
FIG. 2 is a side view of a prior art magnetostrictive sensor design known as the "cross" design.
Figure 18A:
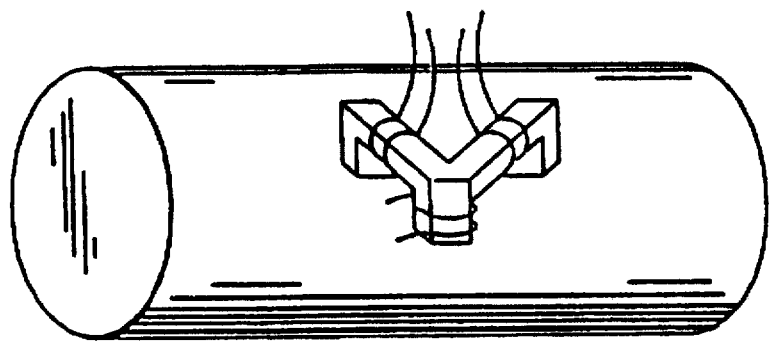
FIGS. 18A and 18B are dual branch magnetostrictive sensors as are known in the prior art.
Figure 18B:
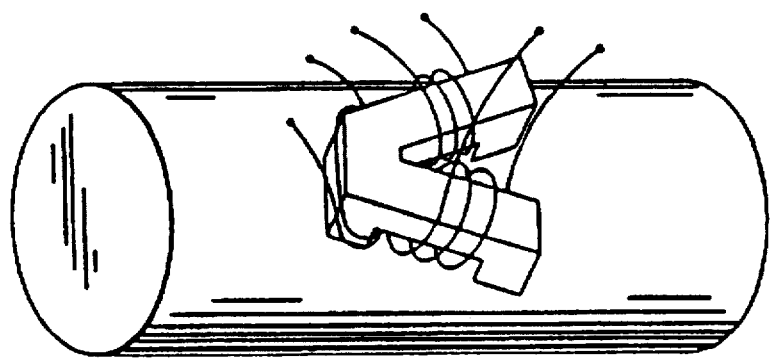

FIG. 1 shows a typical magnetostrictive sensor design as shown in U.S. Pat. Nos. 4,414,856 and 4,503,714 for example, and is commonly referred to as the "four branch" design. FIG. 2 shows an alternative design as shown in U.S. Pat. Nos. 2,912,642, 3,011,340, 4,589,290, and 4,939,937 for example, and is known as the "cross" design. FIG. 3 depicts yet another design known as the "single branch" or "C-core" design. Other designs exist, notably the solenoidal design as shown in U.S. Pat. No. 4,760,745 for example, and the "dual", or generically, "multiple branch" designs. FIGS. 18A and 18B illustrate a dual branch magnetostrictive sensor. These designs typically employ one or more primary, or excitation, coils to generate magnetic flux in the shaft. They also typically employ one or more secondary, or pick-up, coils that monitor the changes which may occur in the magnetic flux in the shaft. The coils are commonly wound around ferromagnetic cores. Changes in torque produce changes in the torsional stress on the shaft which causes strain in the shaft. Due to the principle of magnetostriction, the stress/strain changes produce changes in the magnetic flux in the shaft. These flux changes produce voltage changes in the secondary coil(s), and hence, the voltage level across the secondary coil(s) is related to the torque applied to the shaft.

In FIG. 2, for example, either of the coils shown may be the excitation coil and the other the pickup coil. Other designs exist with some modifications to this basic theme. For example, U.S. Pat. Nos. 4,939,937 and 5,144,846 show a magnetostrictive sensor in which the primary coil(s) and the secondary coil(s) are the same. The present invention shown herein is not limited in any way by the particular magnetostrictive sensor; rather, the present invention relates to use of any magnetostrictive sensor design, and any design limitations in ensuing discussions are shown solely for the purpose of simplifying the explanation.

Figure 4:
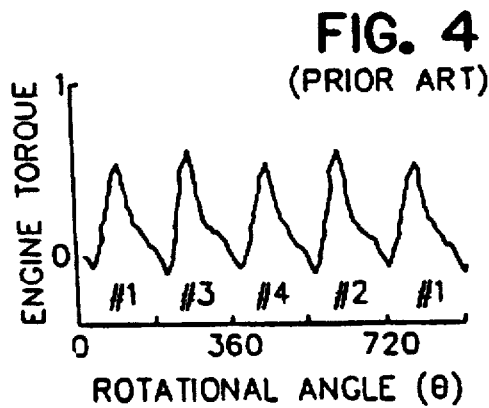
FIG. 4 is a prior art graph representing torque produced by a four cylinder internal combustion engine.

FIG. 4 is a typical measured output torque curve of a normally firing four cylinder engine as a function of shaft rotational angle from TDC. Note that as each cylinder fires, the torque rises, peaks, and then falls off. Each torque peak in FIG. 4 is labeled with the number of the firing cylinder causing the respective peak. Again for reasons of simplicity, these cylinder numbers and the firing order will be referred to in the following descriptions of the various embodiments of the present invention, but the various embodiments are not so limited.

Figure 5:
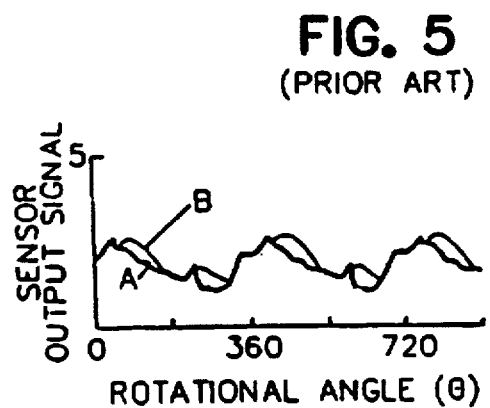
FIG. 5 is a prior art graph of typical magnetostrictive torque sensor signals.

FIG. 5 illustrates a typical signal output, such as voltage from a magnetostrictive sensor. Curve A represents the unloaded, or zero torque, rotating shaft measurement response. The erratic signal level is a result of random variations in the shaft magnetic permeability tensor at different locations on the shaft. The directions of the principal, maximum and minimum permeability, axes and the magnitudes of the principal permeabilities vary around the shaft circumference. As a result, the inductances seen by the primary coil and the secondary coil in the sensor change as the shaft turns. Hence, the output voltage from the secondary coil varies substantially with angular shaft displacement even for a constant torque, such as zero torque in the present case. Note that curve A is periodic, repeating itself every 360° of shaft rotation.

Curve B in FIG. 5 represents a response from the same magnetostrictive sensor as that of curve A, however, curve B is the signal measured for a transmitted torque such as that shown in FIG. 4. In other words, curve B is the sensor output signal when the shaft is transmitting torque delivered from a typical four cylinder engine. Note that the signal of curve B exceeds that of curve A whenever a cylinder fires.

It is relevant that the shape of curves A and B vary significantly from shaft to shaft; hence, magnetostrictive torque sensors do not, in general, lend themselves to mass production or calibration. This disadvantage alone makes them impractical for automotive application to directly measure true engine torque from a shaft. In addition, the signal level from the sensor varies with temperature, shaft RPM, and even simply drifts with time.

The method and apparatus according to the present invention overcomes the limitations of magnetostrictive sensors by comparing different signals generated by cylinder firings, or misfirings, at the same location on the shaft or by comparing relative changes in such signals at different locations. Comparison of an individual firing event signal, or its relative change, to one or more other signals from other typically normal firing events may indicate a roughness or misfire determination of the individual firing event. By comparing such events when the time interval between them is small in human terms, for example less than a second or so, the engine RPM, temperature, accelerator depression level, shaft acceleration, and temporal drift effects become negligible. Comparing relative changes over longer time scales to historical "marker" type relative changes may also yield similar results.

Specific descriptions of several embodiments for carrying out the aforementioned comparisons are described below.

The invention includes combinations of any number of the embodiments. For example, Embodiment 1 below can be used in conjunction with Embodiments 2 and 3. Any comparison of signals produced by different firing or non-firing events to determine roughness or misfire is but another embodiment of the present invention.

Embodiment 1

Figure 6A:
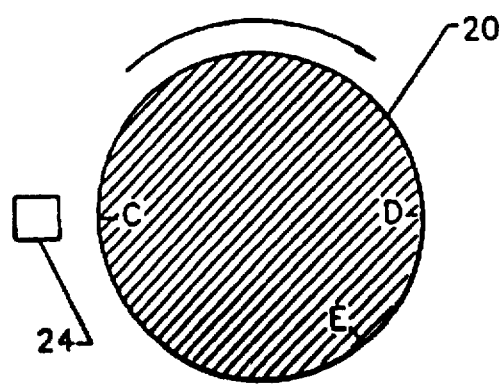
FIGS. 6A–6D are schematic diagrams depicting misfire or roughness sensing during rotation of an engine crankshaft in a method according to the present invention.
Figure 6B:
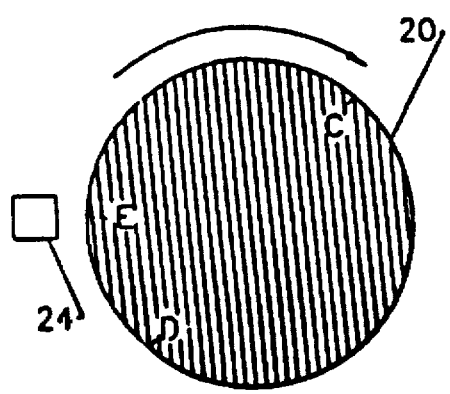
Figure 6C:
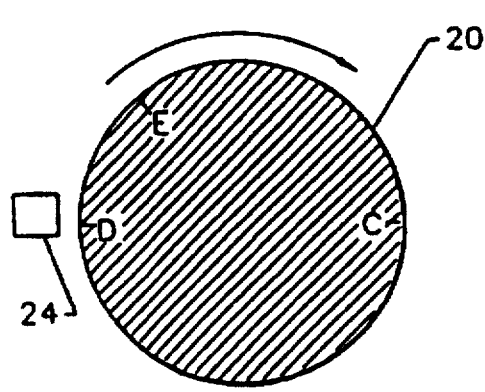
Figure 6D:
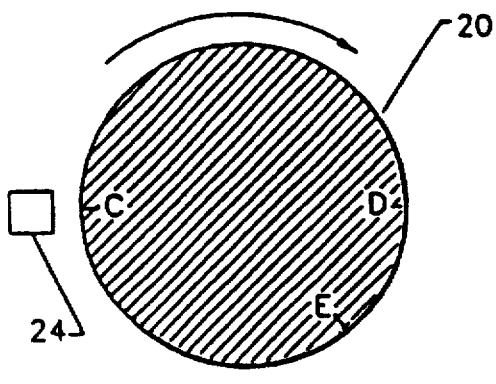

FIGS. 6A–6D show schematic diagrams of an end view of a shaft 20 and a sensor 24 whose signal is a function of shaft torsional stress/strain and possibly other factors, such as temperature, shaft material magnetic properties, and shaft speed. The sensor 24 may be a magnetostrictive sensor. FIGS. 6A–6D represent successively later points in time as the shaft rotates. In FIG. 6B, the shaft is shown rotated through an angle less than 180° from FIG. 6A. FIG. 6C shows the shaft rotated effectively 180° beyond its position in FIG. 6A; and in FIG. 6D the rotation has become a full 360°.

Point C in FIGS. 6A–6D denotes a point on the shaft circumference which is directly under the sensor 24 when cylinder and cylinder #4 firing should occur once each during 720° of rotation as shown in FIG. 4. Point C typically would pass under the sensor 24 when, or nearly when, peak torque is being generated as illustrated in FIG. 4. Point D denotes a point effectively 180° around the shaft from point C and hence represents the equivalent of point C for intended firings of cylinders #2 and #3. In this discussion, $S_{C1}$ and $S_{C4}$ will denote the respective output signals from the sensor 24 when cylinders 1 and 4 should be firing. $S_{D2}$ and $S_{D3}$ will denote comparable signals for cylinders 2 and 3. Hence, in general, assuming all four cylinders are delivering equal torque during their respective power strokes, $S_{C1}=S_{C4}$ which is not equal to $S_{D2}=S_{D3}$. The equal signs result because the same sensor 24 is measuring the same stress/strain state at the same location on the shaft, as is especially important for a magnetostrictive sensor 24. For a magnetostrictive sensor, the same permeability tensor yields effectively the same inductances for the coils of the sensor at the same temperature for effectively the same RPM and effectively at the same time. The unequal relationship results since, even though all other factors are the same, the location on the shaft is different for sensing cylinders #1 and #4 as opposed to #2 and #3, and hence, the coil inductances of the sensor 24 are not the same in almost all practical cases.

Since $S_{C1}=S_{C4}$ when cylinders #1 and #4 deliver equal torque, and $S_{C1}$ does not equal $S_{C4}$ when they do not, monitoring $S_{C1}$ and $S_{C4}$ provides a means whereby misfire or roughness may be detected. If either cylinder is firing normally, and the other is not, the abnormally firing cylinder will produce a lower signal than that of the other. As would be readily understood by those having skill in the art, any of a host of different electronic circuits and software programs may be used to compare the signals and provide a quantitative measure of the difference between $S_{C1}$ and $S_{C4}$. The first signal, $S_{C1}$, may be stored in computer memory for one revolution of the shaft, until the second signal, for example $S_{C4}$, is measured. These two signals may then be compared via subtraction, division, or any other means to obtain a quantified value indicative of the variation between them. For example, the quantified value may be defined as $Q_C=S_{C1}-S_{C4}$. Whenever this quantified value exceeds a predetermined threshold value, a predetermined level of roughness is indicated. Exceeding other threshold values indicates other levels of engine roughness and exceeding an extreme threshold value indicates cylinder misfire.

Figure 7:
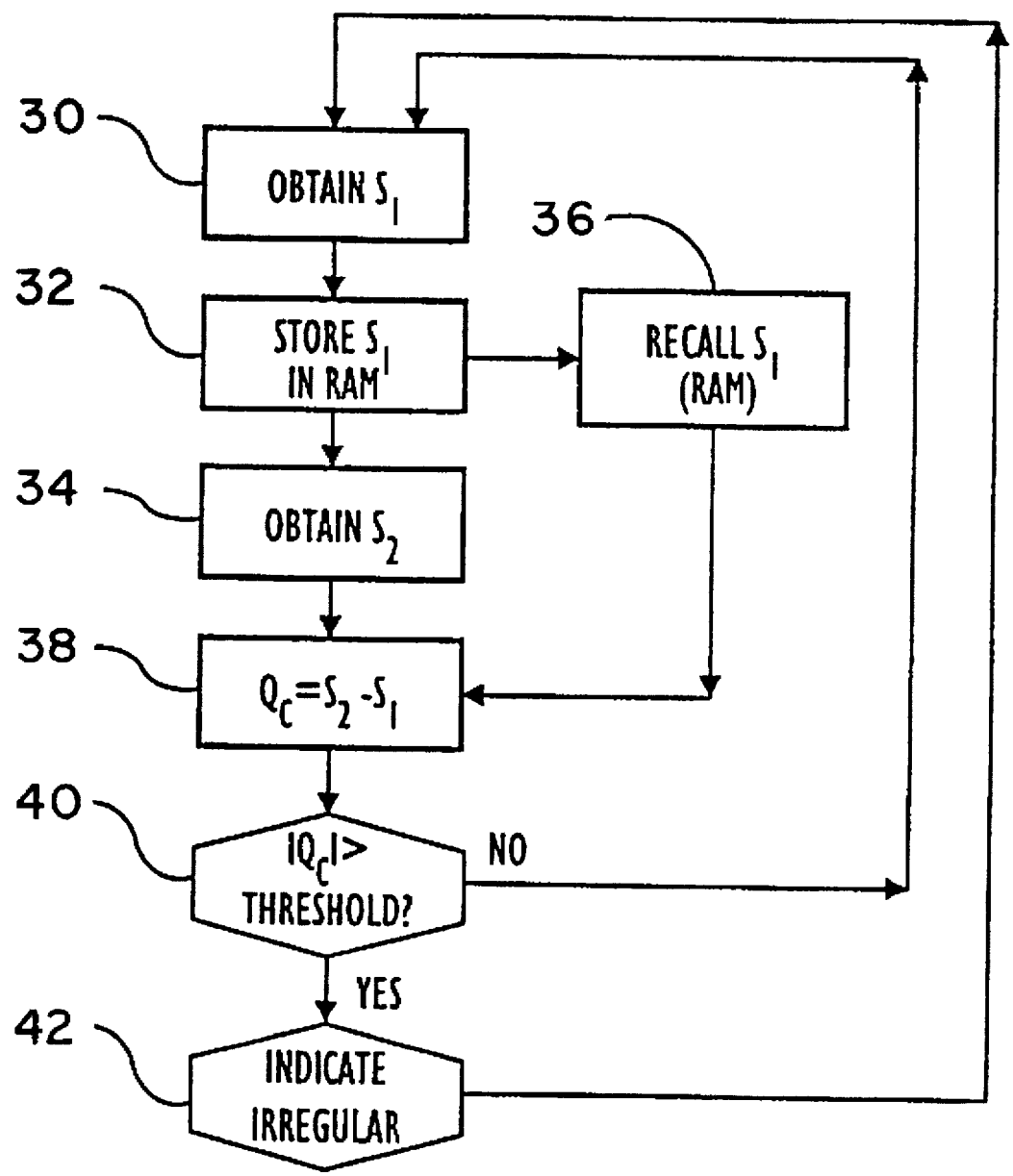
FIG. 7 is a flowchart illustrating a processing method according to the present invention.

FIG. 7 is a flowchart representing one of the ways to calculate the quantified value $Q_C$ and compare it to a threshold value to thereby indicate roughness or misfire. A first signal, $S_{C1}$, is obtained at Block 30 and stored in a random access memory (RAM) (Block 32). The second signal, $S_{C4}$ is then obtained at Block 34. The first signal, $S_{C1}$ is then recalled from RAM (Block 36) and subtracted from $S_{C4}$ to give a quantified value, $Q_C$ at Block 38. The absolute value of the quantified value, $Q_C$, is then compared to a predetermined threshold at Block 40. If the absolute value of the quantified value $Q_C$ does not exceed the predetermined threshold, the process repeats beginning at Block 30. If the absolute value of the quantified value $Q_C$ exceeds the threshold, the quantified value is then tested to be either positive or negative (Block 42). If the quantified value $Q_C$ is greater than zero, an indication that cylinder #1 has misfired is given (Block 46) and the process returns to the beginning at Block 30. If the quantified value $Q_C$ is less than zero, then an indication that cylinder #4 has misfired is given at Block 44 and the process then begins again at Block 30.

As would be readily understood by those having skill in the art, a similar process may be used with signals $S_{D2}$ and $S_{D3}$ to compare cylinders #2 and #3. By so doing, any roughness or misfire in any single cylinder may be readily detected.

Erratic roughness or misfiring in multiple cylinders may also be detected in all but the extreme case where cylinders #1 and #4, or #2 and #3, are both rough to the same degree or both misfiring 100% of the time. For intermittent misfiring of both cylinders #1 and #4 for example, in many cycles, one of the two cylinders would fire normally and misfire would then be readily detected. In any given cycle, the lesser of the two signals would represent the abnormally firing cylinder. Alternation of such indication between the two signals would signify multiple cylinder misfire. If 100% misfiring occurred in both cylinders, the engine would be barely operational, and need for repair would be evident. However, for cases where both cylinders misfire during any given measurement cycle, the variation of the invention shown in Embodiment 2 below may be used in conjunction with that described in Embodiment 1 to give precise information on multiple cylinder roughness or misfire.

Each of the aforementioned signals in this, or any embodiment, may be a difference between, or be a ratio of, the signal and any signal obtained by any other means. For example, a measurement may be used of a first signal, $S'_{C1}$, at location C during firing of cylinder #1 followed by measurement of a second signal, $S_E$, taken at a point E on the shaft part way between locations C and D as shown in FIG. 6B. This second signal $S_E$ might, for example, be near the 180° point in FIG. 4, though it may be anywhere. Then $S_{C1}$ would, in this example, equal $S'_{C1} - S_E$. A similar approach may yield signals $S_{D2}$, $S_{D3}$, and $S_{C4}$, and all four of the signals may then be used in the present, or any other embodiment, to detect roughness or misfire. Note that $S_E$ may be $S'_{D2}$ or $S'_{D3}$ where the latter two symbols represent respectively, the signals when location D is adjacent the sensor 24 during the #2 and #3 cylinder power strokes.

Further, each of the signals described above or in any other embodiments may be the raw signal output of sensor 24 or any processed version thereof. Particularly, any or all of the signals may have any background components due to inductive coupling, capacitive coupling, electronic biasing, or any other cause subtracted out, filtered out, eliminated via a bridge circuit, or removed by any other means. As would be readily understood by those having skill in the art, the signal may be amplified or phase shifted in any manner as well.

Each of the signals in this or any embodiment may be an instantaneous value, a value integrated over a portion of the shaft rotation, an average value over a portion of shaft rotation, a differentiated value, one or more Fourier components, or a filtered value of the corresponding raw or processed sensor signal. For integrated, averaged, Fourier components, and possibly filtered values, the locations C, D, and E discussed herein may be portions of the shaft rather than discrete points on the circumference. Further, each of the signals may be compared with one other signal, with more than one other signal, or with a combination of other signals, such as an average of a number of other signals for example. For some conditions and for some types of sensor and shaft combinations, any of the signals $S_{C1}$, $S_{D2}$, $S_{D3}$, and $S_{C4}$ may be compared to any of the other signals, to $S_E$, to an average, weighted or otherwise, of any number of the other signals, or to an average (weighted or otherwise) of any number of all the signals to obtain a quantified value indicative of roughness or misfire. Thus, any cylinder may be compared to any other, or to any combination of cylinders, rather than simply the comparisons of #1 to #4 and #2 to #3. Alternately, the signal generated in any cylinder power stroke may be compared directly to a single reference signal, $S_E$, with the quantified value obtained from such comparison used to determine roughness or misfire. In similar manner, each signal $S_{C1}$, $S_{D2}$, $S_{D3}$, or $S_{C4}$ may be compared with its own equivalent reference, $S_{E1}$, $S_{E2}$, $S_{E3}$, and $S_{E4}$ respectively, and the quantified value found from such comparison used to indicate roughness or misfire.

Preferably, the signals to be compared are those generated right after one another in time. Consider, for example, the $S_{C1}$ and $S_{C4}$ comparison described above and illustrated in one possible form in FIG. 7. With the engine operating at 1800 RPM, 15 power strokes of each cylinder would occur each second, that is, 15 $S_{C1}$ signals and 15 $S_{C4}$ signals would be generated each second. Any one or more of these 15 $S_{C1}$ signals may be compared with any one or more of the 15 $S_{C4}$ signals according to the present invention. Any one or more of such signals in other (larger) time intervals may also be compared as well. However, a particular $S_{C1}$ signal is preferably compared with the $S_{C4}$ signal immediately following or immediately preceding it.

The timing "trigger" for generating any of the aforementioned signals in this or any embodiment may be activated in a number of ways. As would readily be understood by those having skill in the art, such ways include: monitoring of the ignition system for high voltage or power surges to one or more spark plugs; cam shaft, crankshaft, flywheel, rod, drive shaft, or cylinder position sensing; cylinder pressure sensing; or any combination of the aforementioned ways.

Embodiment 2

A second embodiment of a method according to the present invention entails comparison of any given signal, such as $S_{C1}$ defined in Embodiment 1 above, with one or more earlier measurements of the same signal. For example, a signal such as $S_{C1}$ may be measured once and stored in memory for the duration of two shaft revolutions, that is, until cylinder #1 is in its next power stroke. The signal $S_{C1}$ generated at time=$t_1$ may then be compared with the next $S_{C1}$ signal taken at time=$t_2$ where the time difference $t_2-t_1$ equals the time between power strokes of cylinder #1. If cylinder #1 is firing normally and suddenly burns incompletely or misfires, the misfire will generate a signal $S_{C1}$ significantly less than the previous signal $S_{C1}$. Any comparison scheme, such as those delineated in the description in Embodiment 1 above may be used to obtain a quantified value indicative of the variation between these two signals.

When this quantified value exceeds a predetermined threshold, roughness or misfire is indicated. In this way, each cylinder may be monitored continuously for misfire.

The time designations used herein, and in any embodiment, for example $t_1$, $t_2$, etc., may represent periods of time in cases where signal $S_{C1}$ or any of its sibling signals is found by integration, averaging, Fourier analysis, filtering, etc. Further, wherever time designations are referred to herein, the designations coincide with specific locations or regions on the shaft 20. That is, the signal comparisons are typically intended to be made between signals taken at one or more particular locations on the shaft 20, since at different engine speeds, the times at which the signals are taken may be different though the corresponding location on the shaft would be the same.

Any signal may equally as well be compared with any one or more of its preceding values. For example, $S_{C1}$ @ time=$t_{10}$ may be compared with $S_{C1}$ @ $t_9$, and/or $S_{C1}$ @ $t_8$, and/or $S_{C1}$ @ $t_7$, etc. wherein the integer subscripts represent the successive occurrences of the power stroke of cylinder #1, for example. Further, $S_{C1}$ may be compared via any statistical means to its own prior values. As would be readily understood by those having skill in the art, other statistical treatment of the data generated may be used in order to detect cylinder roughness or misfire.

For example, a moving average, weighted or otherwise, of the past N number of measurements of $S_{C1}$ may be stored in a computer memory and the average used in comparison with a current value of $S_{C1}$. Similarly, a moving standard deviation of the past N number of measurements of $S_{C1}$ may be used and compared with a current value of $S_{C1}$. If the current value of $S_{C1}$ exceeds a certain number of standard deviations from the average, roughness or misfire may be indicated. The number of standard deviations used to indicate roughness or misfire may be determined by experiment and tailored to the requirements of the particular engine or auto maker. Typical values might be 4.5, 5, 5.5 depending on the accuracy desired and other factors. In addition, more than one such misfire indication might be required in any given number of firings before a misfire warning indication is given as described further below.

A preferred signal processing of this and other embodiments may be direct comparison of two individual signals, either from the same cylinder at different times or from two different cylinders. Nevertheless, the following statistical approach for indicating cylinder misfire has been shown in engine tests to be viable and is shown herein to illustrate one possible way of determining misfire.

The following is an example based upon engine tests of a four cylinder Chrysler 2.2 liter engine illustrating a method for signal processing according to the present invention. $S_{C1}$ is measured on N successive occurrences and the N values are stored in memory. Assume, for example, N=10. The mean value for $S_{C1}$, $MeanS_{C1}$, over the N=10 cycles is calculated and so is the standard deviation $\sigma$. A predetermined multiple of the standard deviation, which by way of example here may be 5.5, is calculated. On the N+1 occurrence (the 11th occurrence in this example) $S_{C1}$ is measured and $MeanS_{C1}$ is subtracted from it to yield $\Delta S_{C1}=S_{C1}-MeanS_{C1}$. $\Delta S_{C1}$ is then compared to $5.5\sigma$, and if it exceeds $5.5\sigma$, then misfire is indicated. If no misfire is indicated, the first of the N=10 values of $S_{C1}$ is dropped from memory, the 11th is added, and the mean and standard deviation for the 2nd through 11th occurrences are calculated. The 12th $S_{C1}$ is then measured, and $\Delta S_{C1}$ calculated and compared with 5.5 times the new standard deviation $\sigma$. If $\Delta S_{C1}$ exceeds $5.5\sigma$, then misfire is indicated. If $\Delta S_{C1}$ is not of sufficient magnitude to indicate misfire, the process is repeated—the 2nd measurement of $S_{C1}$ is dropped from memory, the 12th is added, and the process repeats for comparison with the 13th measurement of $S_{C1}$.

If $\Delta S_{C1}$ in this example exceeds $5.5\sigma$ for any measurement of $S_{C1}$, then that value of $S_{C1}$ would typically not be stored in memory as one of the N=10 $S_{C1}$ values. This is because it would markedly affect the moving average and the standard deviation which should be reflecting normal firings by a probable misfire value. In such case, the earliest value in memory would not be dropped, and the same N=10 $S_{C1}$ values may be retained for the subsequent measurement and comparison with the next value of $S_{C1}$. Alternatively, any value of $S_{C1}$ which leads to misfire indication may be stored and used to calculate the new average and standard deviation. Doing so would be somewhat simpler but may have some adverse effect on accuracy.

Avoiding false alarms is a major aim of car makers. Since even at a threshold of 5.5 standard deviations, a small number of false misfire signals may be produced, several modifications to the above described statistical processing may be performed to minimize the occurrence of false alarms. For example, obtaining a single signal $\Delta S_{C1}$ greater than 5.5 standard deviations may be used to set a possible misfire flag, but not to signal actual misfire. Upon occurrence of two such flags representing two $\Delta S_{C1}$ signals exceeding 5.5 standard deviations in a predetermined number of firings, for example 1,000 cylinder firings, the misfire warning indication may be given. If one flag occurs and a second does not occur for a predetermined number of firings, then the flag counter may be reset to zero. Requiring more than one $\Delta S_{C1}$ signal exceeding a predetermined threshold may decrease the number of false alarms by several orders of magnitude. As would be readily understood by those having skill in the art, other values may be used for thresholds, number of flags, number of cylinder firings to compute the moving average and standard deviation, and number of cylinder firings before the flag is reset to zero.

A further enhancement to improve accuracy and reduce the probability of false alarms is best illustrated by a specific example. If, as described above, 2 misfire flags occur in 1,000 firing events, another flag—a "major" misfire flag may be set rather than indicating misfire directly. Obtaining a predetermined number of major misfire flags over a predetermined time, or predetermined number of firings, or a predetermined mileage may then be required before a misfire warning is indicated. For example, 2 major flags may be required for every one million firing events. If one such major flag occurs and a second does not occur for the one million firing events, then the major flag count may be reset to zero. As a second example, 2 major flags may be required over the entire lifetime of a given vehicle. As would be readily understood by those having skill in the art other values may be used for the number of flags, major flags, and cycles, time, or mileage required for major flags before misfire indication is given.

As a computational aid, the variance $\sigma^2$ may be used instead of the standard deviation $\sigma$. This saves computer time since taking a square root as required to calculate the standard deviation is a fairly lengthy procedure in the time frame of computer processing. Using the example above, $\Delta S_{C1}$ may be squared and compared with $5.5^2\sigma^2$. Therefore, if $(\Delta S_{C1})^2 > (30.25)\sigma^2$, then a misfire flag is set. As a further computational aid, the N changing values of $S_{C1}$ stored in memory do not have to be summed each time an old $S_{C1}$ value is dropped and a new one added. Far fewer computational steps are required by keeping a value in memory which is the sum at any given time of the last N values of $S_{C1}$, then adding the new value of $S_{C1}$ to said sum, subtracting the earliest value of $S_{C1}$, and then storing the result as the new sum of the new set of N values of $S_{C1}$. This entails only two arithmetic operations rather than N, or 10 operations as in the example where N=10. The same procedure may be used with the variance. The current variance may be stored in another memory location, the new value of $(\Delta S_{C1})^2$ added to that memory location, the earliest value of $(\Delta S_{C1})^2$ subtracted from that memory location, and the resultant used as the new variance. This reduces the number of arithmetic operations considerably. In the example where N=10, ten summing and ten squaring operations are reduced to two summing and two squaring operations. As would be readily understood by those having skill in the art, any cylinder, not merely cylinder #1, may be treated in the manner shown herein.

Embodiment 2 may be combined with Embodiment 1 to form a method of roughness or misfire detection which includes comparison of any given cylinder firing or misfiring with that of any typically normally firing cylinder, as well as a comparison with its own previous typically normally firing event history. Accuracy in roughness or misfire determination may therefore be improved.

Embodiment 3

A third embodiment of the method according to the present invention comprises computation of the percentage of a signal scale, such as full scale of the signal level for each cylinder, and comparison of the percentage computation with similar computations performed for other cylinders.

By way of example, consider the wide variation in measured values for cylinder #1, $S_{C1}$, during the course of the engine lifetime. This variation is due to varying engine torque, varying shaft speed, signal drift with time, temperature variations, long term material property changes through aging, and perhaps other causes. In this example, the onboard computer may store high ($MaxS_{C1}$) and low ($MinS_{C1}$) values for $S_{C1}$ in memory. This may be done by continually updating the high and low values by comparing every $S_{C1}$ measurement to the extreme values in memory and replacing the latter whenever they are exceeded. This updating may be terminated at some point, perhaps some given time or some given mileage or some number of given firings after the first running of the engine, or it may go on indefinitely throughout the lifetime of the engine. Each measurement of $S_{C1}$ is then converted to a percentage or equivalently, a fraction, of the full scale variation, $\%S_{C1}$, according to the standard formula $\%S_{C1}=(S_{C1}-MinS_{C1})/(MaxS_{C1}-MinS_{C1})$. Similar computations are made for one or more of all other cylinders to obtain $\%S_{C1}$, $\%S_{D2}$, $\%S_{D3}$, and $\%S_{C4}$. Typically these values may be computed for every power stroke, and then each of these is compared with one or more or some combination of the others, such as averaging, weighted or otherwise.

For example, as cylinder #1 encounters its power stroke, the percentage of full scale value of cylinder #1, that is $\%S_{C1}$, is obtained and followed immediately by the obtaining of similar values for cylinders #3, #4, and #2. $\%S_{C1}$ may then be compared directly with $\%S_{D2}$ and a quantified value determined, such as $Q_{12}=\%S_{C1}-\%S_{D2}$ which is indicative of the variation between cylinders #1 and #2. Similar comparisons may be made between $\%S_{C1}$ and $\%S_{D3}$ and $\%S_{C4}$ to yield quantified values $Q_{13}$, $Q_{14}$; and, indeed, between any two cylinders with additional associated quantified values $Q_{23}$, $Q_{24}$, and $Q_{34}$. As in other embodiments, if the quantified value exceeds a predetermined threshold value, roughness or misfire is indicated. In this way any given cylinder power stroke may be compared with any other, or with any combination of others, in a manner that renders negligible the non-torque induced differences in signals generated from different locations on the shaft 20.

$\%S_{C1}$ or any of its sibling signals may also or instead be compared with some average, weighted or otherwise, of the percentage value from one or more other cylinders or with a predetermined constant value. By way of example, $\%S_{C1}$ may be compared with $\%S_{234}=(\%S_{D2}+\%S_{D3}+\%S_{C4})/3$ to obtain quantified value $Q_{1,234}=\%S_{C1}-\%S_{234}$. As a second example, $\%S_{C1}$ may be compared directly with a suitable predetermined constant value, K, to obtain a quantified value $Q_{1,K}=\%S_{C1}-K$. If $Q_{1,K}$ exceeds a predetermined threshold, roughness or misfire is indicated. As would be readily understood by those having skill in the art, many other schemes are possible for calculating percentage variation in a signal generated by the various cylinders and for comparing the various percentage variations.

For example, instead of defining $\%S_{C1}$ as the percentage of full scale signal as shown above, it may also be defined in a number of other effective ways, generically represented as $\%S_{C1}=(S_{C1}-{_M}S_{C1})/({_N}S_{C1}-{_P}S_{C1})$ where ${_M}S_{C1}$, ${_N}S_{C1}$, and ${_P}S_{C1}$ are any suitable values of zero; $S_E$; $S_{C1}$; $S_{D2}$; $S_{D3}$; $S_{C4}$; constant values; or any other suitable values. $S_{C1}$, $S_{D2}$, $S_{D3}$, and $S_{C4}$ values may be maximum, minimum or mean values. Similar logic applies to definitions for $\%S_{D2}$, $\%S_{D3}$, and $\%S_{C4}$.

Further, the method described in this particular embodiment may be used to provide a relative, not absolute, indication of engine torque for use in electronic engine control systems. To see how this can be done, consider the example discussed above in which $\%S_{C1}$ represents the percentage of full scale signal generated by cylinder #1 during its power stroke. By taking the $MaxS_{C1}$ and $MinS_{C1}$ signals stored in memory as permanently fixed at some point, that is, they are not continually updated throughout the lifetime of the engine, the $\%S_{C1}$ level thereby becomes proportional to the amount of torque produced during the cylinder #1 power stroke. Using the four $\%S_{C1}$, $\%S_{D2}$, $\%S_{D3}$, $\%S_{C4}$ values collectively a quantitative value may be obtained, such as by adding or averaging (weighted or otherwise), which is proportional to the mean engine torque being produced over a predetermined number of shaft rotations. This quantitative value may thereby be used as an input to electronic engine control systems in a very advantageous manner. In general this quantitative value will be a relative rather than absolute value of torque. That is, it will be a signal level relative to some maximum and some minimum generated by the engine at some prior time. Without knowledge of the exact magnitudes of the earlier maximum and minimum torques, the precise torque represented by the signal level at the present time cannot be known, and hence the signal level would only be a relative indicator of torque.

However, with some means for determining the actual values of torque when the earlier maximum and minimum values were generated, the signal level may then be calibrated and correlated directly with actual torque. In this case, the method described herein may yield an accurate torque indication. Even without this direct correlation, however, the relative torque indication may prove useful for engine control systems, diagnostics, and other practical applications.

Embodiment 4

Embodiment 4 incorporates the method steps discussed in Embodiment 3 to obtain a signal related to the degree of cylinder combustion, but makes a quantitative comparison between successive signals, at least two of which, are from the same cylinder rather than solely between different cylinders.

For example, the value of $\%S_{C1}$ as defined in Embodiment 3 above, obtained in one power stroke of cylinder #1 may be stored in memory. The very next measurement of $\%S_{C1}$ from the next power stroke of cylinder #1 may then be compared with it. Any significant deviation of one such signal measurement from the previous measurement indicates a sudden occurrence of roughness or misfire.

As described above in Embodiment 2, any measurement of $\%S_{C1}$ may be compared with any previous measurement of $\%S_{C1}$, $\%S_{D2}$, $\%S_{D3}$, $\%S_{C4}$, or with any combination of previous measurements, such as moving averages, standard deviations, or variances. Signals may represent instantaneous values, average values, integrated values, one or more Fourier component values, filtered values, or other suitable value. Further, the variations from the moving average of each of the signals $\%S_{C1}$, $\%S_{D2}$, $\%S_{D3}$, and $\%S_{C4}$ may be quantified by difference, ratio, % change, or any other means and then compared to one another or to a mean value of the variations from the moving averages of more than one cylinder and used as an indicator of roughness or misfire. As an example, this may be done by comparing a given signal variation from the average with a multiple of the standard deviation obtained from a composite of other signals. This is similar to the method of the example described in Embodiment 2, and it is further illustrated with the following specific example.

For two predetermined revolutions of the shaft 20, the four signals $\%S_{C1}$, $\%S_{D2}$, $\%S_{D3}$, and $\%S_{C4}$ are obtained, and an average (Mean%S) and standard deviation (%σ) are calculated from those four signals. The first signal on the next revolution of the shaft 28 is a new $\%S_{C1}$. Similar to the method of Embodiment 2, the difference between the new $\%S_{C1}$ and Mean%S is found, $\Delta\%S=\%S_{C1}-\text{Mean}\%S$. This difference $\Delta\%S$ is then compared with a multiple of the standard deviation to determine whether misfire should be indicated or a misfire flag set. For example, using 5.5 as the multiple, if $\Delta\%S>5.5(\%\sigma)$, then misfire, or a misfire flag, is indicated. If no misfire, or misfire flag, is indicated, then the first value of $\%S_{C1}$ is dropped from memory, the current value added, and a new average signal (Mean%S) and new standard deviation (%σ) are calculated. These are then used in similar manner with the next measurement of a cylinder event, $\%S_{D3}$, to check for misfire, or misfire flag, in the next cylinder, cylinder #3.

Other variations of this embodiment include taking more than a single prior cylinder event for each cylinder in calculating a moving average and a standard deviation. For example, 4 shaft revolutions and 2 signals from each cylinder may be taken rather than 2 shaft revolutions and 1 signal from each. Any number of prior events may be taken which yields accurate misfire indication. Further, all of the variations on this theme as described in Embodiment 2 are equally applicable in this embodiment. As examples, variance may be used instead of standard deviation and any number of flags or any values for other parameters may be employed. And as with Embodiments 1 and 2, Embodiments 3 and 4 may be combined to provide an indicator of roughness or misfire.

Embodiment 5

Figure 8A:
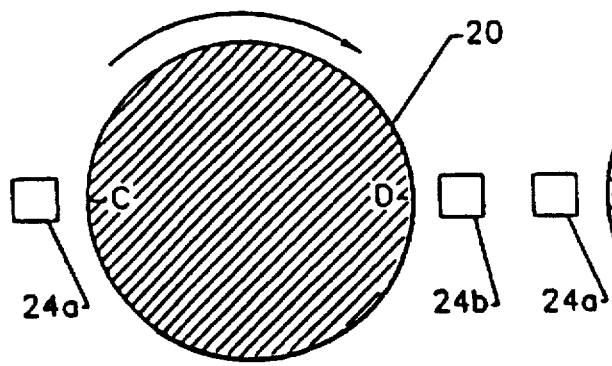
FIGS. 8A–8B are schematic diagrams depicting misfire or roughness sensing during rotation of an engine crankshaft in a method according to the present invention incorporating multiple sensors.
Figure 8B:
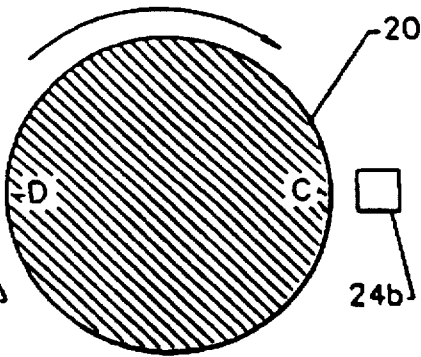

FIG. 8 illustrates the fifth embodiment of the invention in which two sensors 24 are spaced at effectively 180° apart from one another around the shaft 20. The signals from each sensor are combined, typically by adding. The resultant signal from the combination is used to compare the relative cylinder power strokes using methods described in previous embodiments. The symmetry of this embodiment is evidenced by comparing the shaft 20 to sensor 24 alignment in FIG. 8A when cylinder #1 is in its power stoke to that of FIG. 8B, half a shaft revolution later, when cylinder #3 is in its power stoke. By adding the signals from each of the two sensors 24, the effect on the resultant signal from variations in shaft material permeability tensor is effectively eliminated. Hence, cylinder #1 may be compared directly with cylinder #3.

This method of combining signals has several advantages including elimination of possible signal variations from shaft misalignment, wobble, vibration, or bending; doubling the signal strength; and permitting direct comparison of any single cylinder power stroke to any other, to any number of others, or to any combination of others, including averaging. Any given signal from any given cylinder may also be compared with the signal, or signals or combination of signals, from an earlier power stroke of the same cylinder in a manner similar to that described in Embodiments 2 and 4. Also, any of the methods described in any other embodiments having a single sensor 24, may be used in this embodiment as well.

As would be readily understood by those having skill in the art, for six cylinder engines, three sensors may be employed at equal spacings around the shaft and used in similar manner to that described herein for four cylinder engines. As would be also be readily understood by those having skill in the art, multiple sensors may be extended to engines of any number of cylinders. Four or more sensors may also be situated around the shaft at effectively equal angular spacings and their signals combined, compared, and utilized in the same manner as configurations employing fewer sensors.

Embodiment 6

Figure 9A:
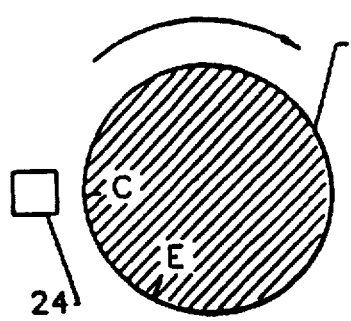
FIGS. 9A–9B are schematic diagrams depicting misfire or roughness sensing during rotation of an engine crankshaft in a method according to the present invention.
Figure 9B:
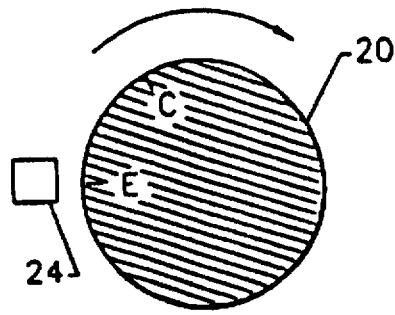

FIG. 9A shows location C under the sensor 24 with cylinder #1 in its power stroke. In FIG. 9B, location E on the shaft 20 is under the sensor 24. Location E may be anywhere on the shaft 20 though typically it is at a position on the shaft where the torsional strain produced in the shaft is considerably less than that at location C.

This embodiment uses $\%S_{C1}$, defined as the percentage or fraction that $S_{C1}$ represents of some signal scale, such as full scale as shown in Embodiment 3 above. That is, $\%S_{C1}=(S_{C1}-{}_MS_{C1})/({}_NS_{C1}-{}_PS_{C1})$ where ${}_MS_{C1}$, ${}_NS_{C1}$, and ${}_PS_{C1}$ are any suitable values of zero; $S_E$; $S_{C1}$; $S_{D2}$; $S_{D3}$; $S_{C4}$; constant values; or any other suitable values. $S_{C1}$, $S_{D2}$, $S_{D3}$, and $S_{C4}$ values may be maximum, minimum or mean values. Similar logic applies to definitions for $\%S_{D2}$, $\%S_{D3}$, and $\%S_{C4}$.

For simplicity of illustration, assume that ${}_MS_{C1}={}_PS_{C1}=\text{MinS}_{C1}$, and ${}_NS_{C1}=\text{MaxS}_{C1}$, where the symbols for maximum and minimum levels of $S_{C1}$ correspond to those of Embodiment 3, and where the measurement or determination of those maximum and minimum levels may be by any one of the methods described in Embodiment 3 or other methods as would be readily understood by those having skill in the art. In this illustration $\%S_{C1}$ typically ranges from zero to 1.0, and equals the percentage of the full scale signal range that $S_{C1}$ represents during any given firing or misfiring event of cylinder #1. $S_E$ and $\%S_E$ may be defined in parallel manner to $S_{C1}$ and $\%S_{C1}$. In the present illustration, $\%S_E$ would therefore represent the percentage of full scale signal that $S_E$ is at any given time.

$\%S_{C1}$ is then compared to $\%S_E$ in a manner similar to like comparisons made between signals in earlier embodiments. One such comparison method is simple subtraction wherein a quantified value $Q_{C1,E}=\%S_{C1}-\%S_E$ is obtained indicative of the difference in stress/strain/deflection level in the shaft 20 between measurements of $S_{C1}$ and $S_E$. For proper cylinder firing, $Q_{C1,E}$ would have a certain value or range of values. For misfire, $Q_{C1,E}$ would fall outside of such a range and be an indicator of lack of combustion in the cylinder.

Similar logic applies to the definitions and use of $\%S_{D2}$, $\%S_{D3}$, and $\%S_{C4}$; and to the obtaining of quantified values for each $Q_{D2,F}$, $Q_{D3,G}$, and $Q_{C4,H}$ where the F, G, and H refer to locations similar to E. Any of locations E, F, G, and H may be identical to any of the others. Hence, the methods shown herein above or below are equally as applicable to any cylinder in any engine not merely to cylinder #1.

Further, the present embodiment may be used in conjunction with or incorporating the logic of any combination of other embodiments. For example, $Q_{C1,E}$ for any given power stroke of cylinder #1 may be compared with the previous $Q_{C1,E}$ of the previous power stroke of cylinder #1, or to any previous $Q_{C1,E}$ from any previous power stroke, or to some combination, such as a moving average of previous power stroke $Q_{C1,E}$ values. In addition, $Q_{C1,E}$ may be further, or instead, compared with any one or more or combination of $Q_{C4,H}$, $Q_{D2,F}$, $Q_{D3,G}$ via any method, such as those methods described in Embodiment 3 for the comparison of $\%S_{C1}$ with $\%S_{D2}$, $\%S_{D3}$, or $\%S_{C4}$.

Since the signal at location E may be of limited range, a particular variation of this embodiment might compare $S_{C1}$ directly with $S_E$. One possible method for such comparison is subtraction, and note that with $_MS_{C1}=_PS_{C1}=0$, and $_NS_{C1}=1.0$, then $\%S_{C1}=S_{C1}$ and $\%S_E=S_E$. Hence, quantified value $Q_{C1,E}=S_{C1}-S_E$ in this case.

As in other embodiments, locations C and E in this embodiment may be regions rather than points on the shaft, and the signal may be other than of an instantaneous nature. For example, the signal may be an integrated value, a summed value of a number of instantaneous values, a filtered value, one or more Fourier component values, etc. Preferably location or region C passes under the sensor 24 during the power stroke of cylinder #1, as in other embodiments. As would be readily understood by those skilled in the art, this is not necessary if ramifications from the power stroke of cylinder #1 may be sensed by the sensor 24 during other strokes of cylinder #1.

As would be readily understood by those having skill in the art, other methods which compare a signal at C to one at E to determine roughness or misfire or relative contributions to engine torque are possible in this embodiment.

Embodiment 7

Figure 10A:
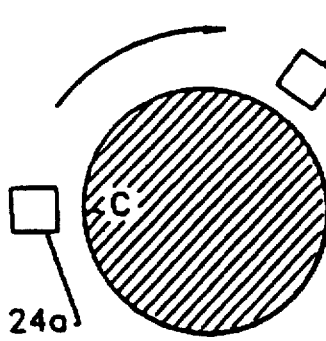
FIGS. 10A–10B are schematic diagrams depicting misfire or roughness sensing during rotation of an engine crankshaft in a method according to the present invention incorporating multiple sensors.
Figure 10B:
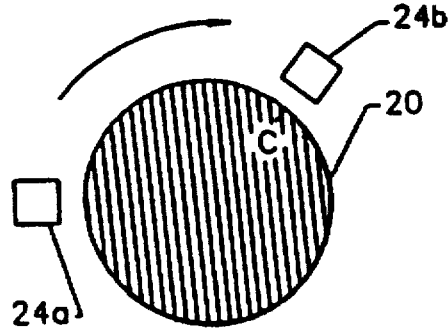

FIGS. 10A-10B show one possible configuration for Embodiment 7. In FIG. 10, two sensors 24a, 24b are situated at different locations around the shaft 20. In FIG. 10A, location C is under sensor 24a and the stress/strain/deflection of the shaft 20 is at or near its maximum level for the case of normal cylinder firing. In FIG. 10B, location C has moved under sensor 24b, and the stress/strain/deflection of the shaft 20 is at or near a minimum level or at the least, a level less than that of FIG. 10A.

The sensors 24a, 24b are effectively identical in function, that is, both sensors 24a, 24b will produce effectively equal signals responsive to measuring a predetermined location on the shaft experiencing an identical stress/strain state. Hence, any effective difference in signals from a predetermined shaft location is indicative of a difference in stress/strain/deflection in the shaft 20. Comparison of the signal from the first sensor 24a in FIG. 10A with that from the second sensor 24b in FIG. 10B yields a quantified value that may be related to the degree of combustion in any given cylinder. As provided in other embodiments, there are a number of ways to obtain this quantified value. The following is one example of determination of a suitable quantified value, and its use in indicating cylinder performance. As would be readily understood by those having skill in the art, the example is only illustrative.

To illustrate one mode for the embodiment, take $S_{Ca}$ as the signal generated by the first sensor 24a in FIG. 10A, and $S_{Cb}$ as the signal generated by the second sensor 24b in FIG. 10B. Assume a definition of the quantified value when cylinder #1 fires as $Q1_C=S_{Ca}-S_{Cb}$. Each time cylinder #1 fires, $Q1_C$ will have a certain value. When cylinder #4 fires one shaft revolution later, $Q4_C$ should have essentially the same value assuming both cylinders #1 and #4 fire normally. Any variation between $Q1_C$ and $Q4_C$ indicates a variation in combustion efficiency between the two cylinder power strokes. One means for determining this variation is by subtraction, and hence for $X_C=Q1_C-Q4_C$ (where $X_C$ is considered a "contrasted value", contrasting the two quantified values), any $X_C$ greater than a threshold value may indicate roughness or misfire in cylinder #1. Any negative value of $X_C$ below a threshold value may indicate roughness or misfire in cylinder #4. Similar arguments hold for cylinders #2 and #3.

Any given quantified value for any given power stroke may be compared with its own value on the previous power stroke of the same cylinder or with some combination, such as a moving average, of its own previous values to indicate the condition of cylinder functioning in the given power stroke. This follows in parallel with Embodiments 2 and 4.

In addition, the method of the present embodiment may be incorporated with that of Embodiment 3 to yield a percentage of full, or some other, scale quantified value in order to compare power stroke performance between any two or more cylinders. All of the methods outlined in other embodiments are directly applicable here.

For instance, $Q1_C$ may be defined in a number of effective ways, generically represented as $Q1_C=(S_{Ca}-_MS_{C1})/(_NS_{C1}-_PS_{C1})$ where $_MS_{C1}$, $_NS_{C1}$, and $_PS_{C1}$ are any suitable values of zero, or $S_{Cb}$ including $MaxS_{Cb}$, $MinS_{Cb}$, or mean values of $S_{Cb}$, or $S_{Ca}$ including $MaxS_{Ca}$, $MinS_{Ca}$, or mean values of $S_{Ca}$, or $S_{D2}$, or $S_{D3}$, or $S_{C4}$ where the latter three include, maximum, minimum, and mean values, or constant values, or any other suitable values. Similar logic applies to definitions of $Q2_D$, $Q3_D$, and $Q4_C$. Any of $Q1_C$, $Q2_D$, $Q3_D$, or $Q4_C$ may then be compared with any others or any combination of others, statistical or otherwise, to indicate cylinder power stroke performance of any cylinder.

Neither this embodiment nor any others is limited to any particular statistical treatment of the data generated in order to detect cylinder malfunction. As one of many possible such statistical approaches, this embodiment may be treated in a manner similar to that described in the statistical example of Embodiment 2 wherein moving averages and moving standard deviations are employed and roughness or misfire is indicated when a signal exceeds a certain number of standard deviations.

Further, the variations from the moving average or the moving standard deviation of each of the signals $S_{C1}$, $S_{D2}$, $S_{D3}$, and $S_{C4}$ (quantified by difference, ratio, % change, or any other means) may be compared to one another or to a mean value of the variations from the moving averages of more than one cylinder and used as an indicator of roughness or misfire as well.

The locations of the two sensors 24a, 24b are not constricted in any way to any particular regions of the shaft 20 as would be readily understood by those having skill in the art. Further, the points in the various cylinder strokes at which signals are measured and compared are not constrained in any way to the example shown in this embodiment, and other suitable measurement points are possible as would be readily understood by those having skill in the art. In other possible embodiments, more than two sensors may used in similar fashion as that shown in Embodiment 7 to the same end.

Embodiment 8

Figure 11A:
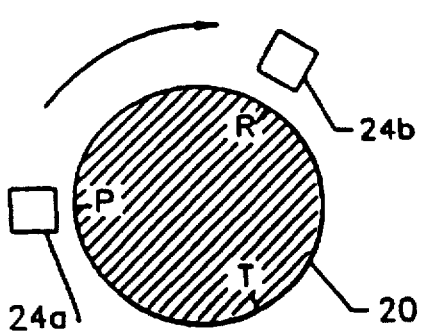
FIGS. 11A–11C are schematic diagrams depicting misfire or roughness sensing during rotation of an engine crankshaft in a method according to the present invention incorporating multiple sensors.
Figure 11B:
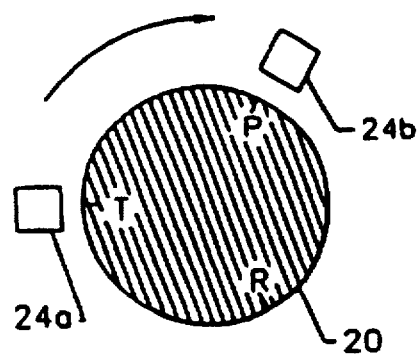
Figure 11C:
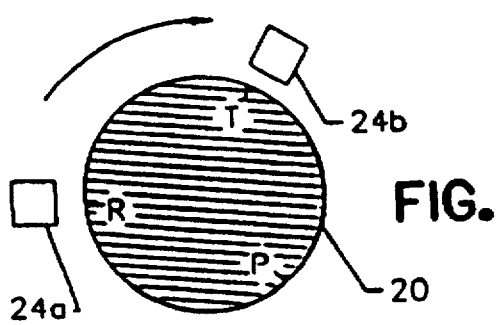

FIGS. 11A–11C show another embodiment of the invention which is applicable to six cylinder engines. In this embodiment two sensors 24a, 24b are used in a way which permits direct comparison of sensor signals between any two of the six cylinder power strokes.

To illustrate the embodiment, assume a firing order of cylinder numbers 1-2-3-4-5-6. In FIG. 11A, cylinder #1 is in its power stroke; in FIG. 11B, cylinder #2; in FIG. 11C, cylinder #3. Locations P, R, and T are used in similar fashion to the locations C, D, and E of other embodiments. The sequence shown is immediately followed by a similar one in which FIGS. 11A, 11B, and 11C may represent successive firings of cylinders 4, 5, and 6. For simplicity, the focus is on the 1-2-3 sequence and an extrapolation is then made to all six cylinders.

Sensors 24a, 24b are essentially identical in function. In other words, identical stress/strain states of shaft regions with identical properties will yield effectively identical signals in both sensors 24a, 24b. Hence, if the shaft 20 is carrying identical stress then the signal from the first sensor 24a when cylinder #1 is firing (FIG. 11A) is effectively identical to the signal for the second sensor 24b when cylinder #2 is firing (FIG. 11B.) Hence, representing the signal from the first sensor 24a when cylinder #1 is firing as $S_{1,P}$ and that from the second sensor 24b when cylinder #2 is firing as $S_{2,P}$, a comparison between firings of cylinders #1 and #2 may be made. A significant difference between the two signals indicates roughness. A greater difference indicates misfire.

As in other embodiments, the comparison between the two signals may be made in any number of ways, but for simplicity subtraction is illustrated. Hence a quantified value $Q_{12,P}=S_{1,P}-S_{2,P}$ is obtained which compares the successive firings, or any predetermined non-successive firings, of cylinders #1 and #2. As in other embodiments, any significantly non-zero value of $Q_{12,P}$ indicates roughness. A significantly larger variation from zero indicates misfire. In similar fashion, from FIGS. 11B and 11C it is shown that a similar quantified value $Q_{23,T}=S_{2,T}-S_{3,T}$ may be obtained and cylinder #2 compared with #3. Continuing such logic for FIGS. 11C and 11A, cylinders #3 and #1 may also be compared via quantified value $Q_{31,R}$.

Extrapolating, cylinders #1 to #4 may be compared in a similar manner, since both cylinders fire when the shaft sensors are configured as shown in FIG. 11A. Quantified values $Q_{14,P}=S_{1,P}-S_{4,P}$ and $Q_{14,R}=S_{1,R}-S_{4,R}$ reflect this comparison. Hence, using the comparisons between #1 to #2 cylinders conjointly with the comparisons between #1 and #4 cylinders, cylinders #2 and #4 may be compared. Alternatively, quantified value $Q_{24,P}=S_{2,P}-S_{4,P}$ may be found directly to compare cylinder #2 to #4. Repeating this approach for all other cylinder combinations leads to direct comparison of any cylinder to any other. Therefore, any rough or misfiring cylinder may be immediately detected.

As would be readily understood by those having skill in the art, many variations exist on this theme and any other embodiments may be used along with this embodiment. For example, percentage range signals may be calculated and utilized in a manner similar to that described for other embodiments. So may comparisons of prior firings of the same cylinder or of moving averages of one or more cylinders. As another example, embodiments 7 and 8 may be used conjointly. Further, the method may be extended to engines of eight or any other number of cylinders. This embodiment may use any method or means which uses two or more sensors to allow direct comparison of any two cylinder firing or non-firing events to one another.

Embodiment 9

Figure 16:
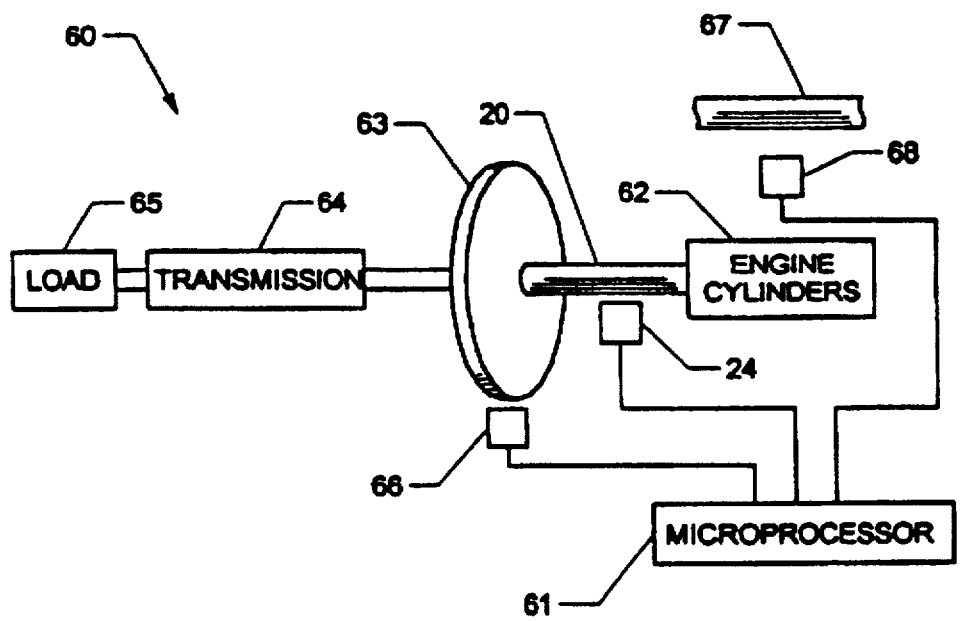
FIG. 16 is a schematic diagram of an apparatus for detecting misfire or roughness according to the present invention.

FIG. 16 shows a schematic diagram of an apparatus 60 for detecting engine misfire or roughness. A microprocessor 61 operating under stored program control may be used to process the signals generated from the sensor 24 which may typically be positioned adjacent a power transmitting member, such as a shaft 20, coupled to the engine cylinders 62. The cylinders are coupled to a flywheel 63 which in turn is usually coupled to a load 65, such as the driving wheels, via a transmission 64. A timing trigger sensor 66, such as a Hall effect or magnetic pickup sensor, may be used to generate timing signals for the microprocessor 61 based upon rotation of the flywheel 63. The particular cylinder which is intended to be firing may be identified by a camshaft position sensor 68 positioned adjacent to the engine camshaft 67.

Figure 12:
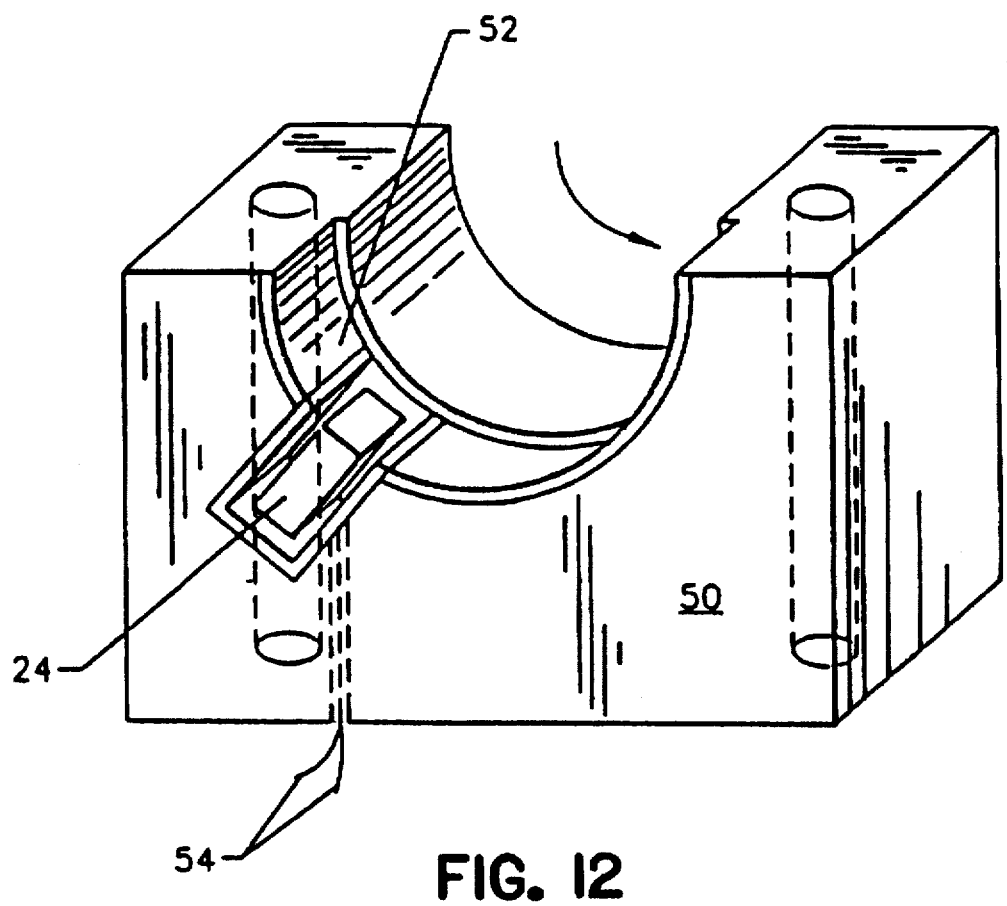
FIG. 12 is a front perspective cut-away view of a magnetostrictive sensor positioned in a crankshaft bearing according to the present invention.

While the sensor(s) 24 may be located anywhere circumferentially or longitudinally along the shaft 20, this embodiment relates to a specific location of the sensor(s) for automotive or other internal combustion engines containing a main bearing or other bearings. FIG. 12 shows one such configuration in which a section is cut out of the main bearing cap 50, and the sensor 24 is located inside the cutout section. If needed, a section is also cut out of the bearing sleeve 52 to permit the sensor 24 to be closer to the shaft. Sensor leads 54 are routed through any appropriate slots or holes in the bearing cap 50, and the sensor 24 itself may be in any suitable location or position within the bearing cap 50. Such a configuration has the advantage that no fundamental redesign of the engine or other engine compartment components and spacing is needed to facilitate implementation of the sensor 24 into the engine.

Figure 3A:
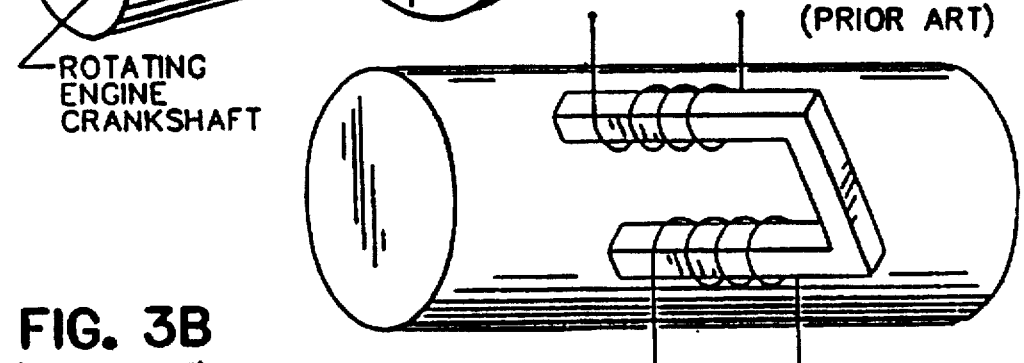
FIG. 3A is a side view of a prior art magnetostrictive sensor design known as the "single" branch or "C core" design.
Figure 3B:
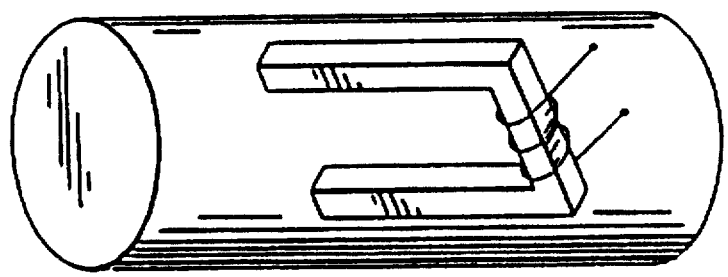
FIG. 3B is a prior art side view of the magnetostrictive design shown in FIG. 3A incorporating a single coil as both the driver and the pickup coil.

Embodiment 9 may use any type of sensor including magnetostrictive sensors of all types and is not limited to a particular type of magnetostrictive sensor. As would be readily understood by those having skill in the art, other sensors may also be used. Applicants have performed successful experimentation with the cross design sensor shown in FIG. 2 and installed in a bearing cap. Various sensor drive configurations, such as constant amplitude voltage, constant amplitude current, and constant amplitude flux (see U.S. Pat. No. 4,939,937) have been used at resonance, above resonance, and below resonance. In addition, the "single branch" magnetostrictive sensor designs shown in FIGS. 3A and 3B are suitable and may be used with any of the aforementioned drive and resonance or non-resonance conditions. Of course, any "multiple branch", solenoidal, or other design magnetostrictive sensor may be used in any of their respective various forms.

The sensor(s) 24 may also be installed in the engine block portion of the bearing or in any other bearing or at any other location along the crankshaft or driveshaft. For example, on typical automobile engines, the sensor(s) 24 may be placed on the front end opposite the drive shaft end of the engine. In such case, a shaft on the front end might be constructed of a less structurally torsion resistant member, such as a hollow shaft, since the loads are significantly less. Also, the location, longitudinally, circumferentially, and radially, of the cutout and sensor 24 in the bearing cap 50 or the bearing sleeve 52 (FIG. 12) may be anywhere suitable to proper operation of the sensor. Further, the engine block itself may be machined to allow placement of the sensor within it. This may comprise a hole in the block which extends down to a bearing and may include appropriate lips, flanges, screws, etc. to hold the sensor in place. Alternatively, it may entail positioning of such a hole such that the sensor is located elsewhere other than in a bearing. Such a placement of the sensor, entailing machining of an opening in the engine block may permit easier access to the sensor when repair and maintenance are required. The sensor mounting might, for example, be removed, serviced, and re-installed much like a spark plug. That is, the device might be unscrewed to remove it and simply screwed back in to re-install. Other options such as set screws or any other means of fastening are comprised by the invention. Positioning of the sensor may be done in many other ways. For example, part of the engine block may be removed near the flywheel and the sensor located in part or in whole therein. Other locations where similar type of machining may be suitable are contemplated by the invention.

Embodiment 10

In another embodiment according to the invention, signals generated by successive firing events may be subtracted and the value obtained from such subtraction used as a first signal. A second signal may then be obtained in a similar manner by subtracting two other signals generated by successive firing events. The second signal is then compared with the first signal to indicate roughness or misfire. For example, if $_{t1}S_{C1}$ is a signal generated by a firing event at time t1 from a given cylinder and $_{t2}S_{C1}$ is the signal generated by the very next firing event from the same cylinder at time t2, then $_1T_{C1}=_{t2}S_{C1}-_{t1}S_{C1}$ is the first signal described above. Similarly, the second signal is then $_2T_{C1}=_{t3}S_{C1}-_{t2}S_{C1}$. In general the nth such signal is $_nT_{C1}=_{m+1}S_{C1}-_mS_{C1}$. A quantified value comparing the second signal to the first via subtraction is then $Q_{TC}=_2T_{C1}-_1T_{C1}$ and in general the nth such quantified value is $_nQ_{TC}=_{n+1}T_{C1}-_nT_{C1}$. The signals represented herein as $T_{C1}$ parallel those designated by $S_{C1}$ in other embodiments and the invention comprises the use of the signals $T_{C1}$ in lieu of $S_{C1}$ in all other possible embodiments.

Alternatively, the quantified value $_nQ_{TC}$ may be defined by comparing the most recent value of $T_{C1}$ to an average, weighted or otherwise, of prior values of $T_{C1}$. For comparison via subtraction, the nth quantified value may then be defined as $$_nQ_{TC} = _{n+1}T_{C1} - (1/n)\sum_{i=1}^{n} {_iT_{C1}}.$$

Throughout all embodiments, $T_{C1}$, or in general, $_nT_{C1}$, may be used in lieu of $S_{C1}$ and $Q_{TC}$ or in general, $_nQ_{TC}$, in lieu of any quantified values. Similar logic applies to other cylinders and to comparisons between different cylinders as shown in discussions of other embodiments. This embodiment may serve to minimize the effect of undesirable variation in a signal during severe transient operating conditions and thereby enhance detection of misfire or roughness.

Embodiment 11

Yet another embodiment entails comparison of the standard deviations of different cylinders to one another. This can be accomplished by determining a mean and a standard deviation for the signal associated with each cylinder in a manner similar to that delineated in embodiment 2. These mean values and standard deviation values may be moving means and moving standard deviations. By way of example, assume N, the number of sample cylinder firing events taken in the moving statistical treatment of the signals, is equal to 10. Then after 10 firing events for the number 1 cylinder, the moving standard deviation calculated for that cylinder may be symbolized as $\sigma_{1,10}$. The moving mean after N=10 firing events may, in like fashion, be defined as $MeanS_{C1,10}$. Similarly, the moving standard deviations for the other three cylinders after 10 firing events may be symbolized as $\sigma_{2,10}$, $\sigma_{3,10}$, $\sigma_{4,10}$; and the moving means as $MeanS_{D2,10}$, $MeanS_{D3,10}$, $MeanS_{C4,10}$. The 11th signal from cylinder number 1, i.e., $_{11}S_{C1}$, may then be expressed as a certain relativity number, $n_{1,11}$, of the standard deviations $\sigma_{1,10}$. That is $n_{1,11}=(S_{C1,11}-MeanS_{C1,10})/\sigma_{1,10}=\Delta S_{C1,11}/\sigma_{1,10}$. In parallel fashion, similar relativity numbers $n_{2,11}$, $n_{3,11}$, and $n_{4,11}$ can be defined for the other three cylinders. Note that each of these numbers indicating number of standard deviations of the 11th signal from each cylinder is non-dimensional and indicates relative level of firing of the 11th cylinder firing event compared to previous firings. As would be obvious to those skilled in the art, four such non-dimensional relativity numbers indicating relative firing level may be calculated for each subsequent series of firings. In the present example then, $n_{1,12}$, $n_{2,12}$, $n_{3,12}$, and $n_{4,12}$ values may be found utilizing the 12th firing event for each cylinder along with the mean and standard deviations for the 2nd through 11th firings events for each cylinder. The process may then be repeated continually for the 13th through all subsequent firing events for all cylinders in a manner similar to that shown in embodiment 2.

The present embodiment has the advantage of permitting direct comparison(s) between any two or more different cylinder firing events. By way of illustration, in the present example $n_{1,11}$ could be compared directly with $n_{2,11}$ via subtraction or ratio-ing or any suitable means. If either of these relativity numbers exceeds the other by a certain threshold value, then a misfire flag and/or indication may be given. Similarly, $n_{1,11}$ may be compared in turn with $n_{3,11}$ and $n_{4,11}$.

Extending this principle, any firing event from any cylinder may be compared with any firing event from any number of other cylinders. The best mode of operation of this embodiment presently known to the inventors entails comparison of four relativity numbers from four different cylinders from successive firings, e.g., the successive 11th firings of cylinders 1,3,4, and 2. This has the benefit of reducing the effect of any possible signal changes due to transient behavior of the engine, e.g., very rapid speed or torque transients, since the signals from all four cylinders would reflect the effects of such a transient more or less equally. That is, the relativity numbers might each indicate a sudden change in value, perhaps on the order of several standard deviations, but since all four such numbers would change effectively to the same degree, the difference between relativity numbers would be minimal. The invention, however, is not limited to this mode of operation of this embodiment and any relativity numbers may be compared with any others either singularly or in any combination.

A given relativity number can be compared to each of the others in turn and to set criteria for misfire flag or indication. For example, assuming a criterion of 5.5 standard deviations variation between relativity numbers, then $n_{1,11}$ may be compared to $n_{2,11}$ as follows.

$$n_{1,11} - n_{2,11} = Q_{12,11}$$

where if $Q_{12,11} > 5.5$ a misfire flag is set for cylinder #1 and if $Q_{12,11} < -5.5$ a misfire flag is set for cylinder #2.

Similarly, comparisons with other cylinders may be made obtaining values for $Q_{13,11}$, $Q_{14,11}$, $Q_{23,11}$, $Q_{24,11}$, and $Q_{34,11}$. Criteria for actual misfire indication may vary, but as one example, obtaining any two $Q_{ij,11}$ values which set a misfire flag for a particular cylinder may be used directly for actual misfire indication. Alternatively, obtaining two such misfire flags may be used to set a major misfire flag wherein obtaining any set number, e.g., 2, of major misfire flags over a particular number of cylinder firing events, time, mileage, etc. would cause actual misfire indication to occur. Obviously, any values for $Q_{ij,11}$ other than +/-5.5 may be used as well as any number of misfire flags, major flags, etc.

In addition to, or instead of, the aforementioned methodology, any given relativity number $n_{k,11}$ may be compared to a combination such as an average, weighted or otherwise, of a plurality of relativity numbers. For example, if $n_{234,11} = (n_{2,11} + n_{3,11} + n_{4,11})/3$, then $n_{1,11}$ may be compared with $n_{234,11}$. As in all other methods and embodiments shown herein the comparison may be done in any suitable way. If said comparison is done via subtraction, and if the misfire flag threshold is taken in this example as 5.5, then $$n_{1,11} - n_{234,11} = Q_{1avg,11}$$

where if $Q_{1avg,11} > 5.5$ a misfire flag for cylinder #1 is set.

In similar manner $Q_{2avg,11}$, $Q_{3avg,11}$, and $Q_{4avg,11}$ may be found and treated in the same way to detect misfire of other cylinders. For the 12th firing sequence $Q_{kavg,12}$'s (where k=1,2,3,4) may be found and the process repeated. The process may then be repeated continually on each subsequent firing sequence.

As in other embodiments, variances may be used in lieu of standard deviations to facilitate more efficient computer utilization. In such case, each relativity number above may be replaced by its square, with appropriate changes in calculation of $Q_{ij,11}$, etc. and corresponding threshold values. Also, a given signal which triggers a misfire flag may be excluded from subsequent mean and standard deviation computations in order that such subsequent mean and standard deviation computations are more accurate reflections of proper cylinder firings. Absolute values of relativity numbers may be used in lieu of relativity numbers in any of the methods and treatments shown herein, and definitions of suitable relativity numbers other than those specifically shown herein are also contemplated by the invention. For example, instead of employing standard deviations in the denominator of the definition for relativity number, the mean may be used. In addition, the relativity numbers may be used to construct a torque nonuniformity vector and/or a torque nonuniformity index or metric, such as that shown by Ribbens for RPM sensing in SAE Paper No. 901768. Misfire indication and misfire cylinder identification may then be done in a manner similar to that shown by Ribbens. Where averages and standard deviations may be used, any other combination of values including weighted averages and weighted standard deviations may be used instead. Finally, as in all other embodiments, the methodology is not restricted solely to misfire detection but may be used for roughness indication or relative torque measurement for a variety of applications including engine control, traction control, braking, transmissions, steering, etc.

Embodiment 12

In some of the statistical treatments presented herein, it may be assumed that a series, e.g., N=10, of firing events occurs before comparison with a subsequent firing event, e.g., the 11th, may be made. In the event that misfire occurs in a particular cylinder, say the number 1 cylinder, immediately upon startup and occurs on every firing stroke for that cylinder, then no significant variation in signal level would be detected. To determine if misfire occurs, a signal obtained while the starter motor is operating prior to engine ignition may be used.

For example, for cylinder #1, the signal produced by the sensor 24 when only the starter motor is operational and when location C is under the sensor head may be designated as $S_{C1,0}$. A similar signal for cylinder #4 prior to ignition may be designated as $S_{C4,0}$. After combustion begins in the engine, and the starter motor is shut off, then the first suitable signals obtained for cylinders #1 and #4 may be respectively designated as $S_{C1,1}$ and $S_{C4,1}$. If cylinder #1 never really fires and cylinder #4 does fire then significant difference would exist between $S_{C4,0}$ and $S_{C4,1}$, whereas less difference would exist between $S_{C1,0}$ and $S_{C1,1}$. (Note that $S_{C1,0}$ and $S_{C4,0}$ will typically be virtually the same signal since both are taken when the shaft is in the same location prior to engine ignition. Hence they may be interchangeable in many applications.) Quantified values, symbolized by $Q_{1,0}$ and $Q_{4,0}$, may then be obtained for each cylinder comparing pre to post startup conditions. As one example, $Q_{1,0} = S_{C1,1} - S_{C1,0}$ and $Q_{4,0} = S_{C4,1} - S_{C4,0}$.

If $Q_{1,0}$ differs from $Q_{4,0}$ by a threshold value then misfiring of one of the cylinders may be indicated. Comparison of the quantified values may be done as in other embodiments, i.e., by any suitable means including subtraction, division, etc., and methodologies used for other embodiments are applicable here as well. For example, comparison by subtraction would indicate one cylinder to be misfiring if the sign of the resultant subtraction were positive and greater than the threshold magnitude, and the other cylinder to be misfiring if the resultant were negative and of comparable magnitude. Obviously, signals from subsequent firings of cylinders #1 and #4, e.g., $S_{C1,2}$ and $S_{C4,2}$, could be used with $S_{C1,0}$ and $S_{C4,0}$ to calculate subsequent quantified values and these subsequent quantified values could be used instead of, or in conjunction with, those shown above to indicate misfire. As but one example of this, difference between the initial quantified values $Q_{1,0}$ and $Q_{4,0}$ exceeding a certain threshold might only set a misfire flag, and one or more subsequent flags from subsequent differences between subsequent quantified values might be required for actual misfire indication.

The quantified values may be defined in a number of alternative ways. As but one example which serves to make the numbers non-dimensional, $Q_{1,0} = (S_{C1,1} - S_{C1,0})/S_{C1,0}$ and $Q_{4,0} = (S_{C4,1} - S_{C4,0})/S_{C4,0}$; $Q_{3,0} = (S_{C3,1} - S_{C3,0})/S_{C3,0}$ and $Q_{2,0} = (S_{C2,1} - S_{C2,0})/S_{C2,0}$. Note that since the quantified values as so defined are non-dimensional, any cylinder may be compared with any other in a manner similar to that described herein for cylinders #1 and #4. Any other suitable definitions for quantified values are also contemplated by the invention.

As with other embodiments, any applications shown herein with regard to cylinders #1 and #4 are equally applicable to cylinders #2 and #3 as well as to cylinders in engines with more than four cylinders.

Embodiment 13

Another embodiment entails use of other roughness/ misfire methods and/or apparatus in conjunction with the present invention. For example, a crankshaft speed fluctuation (CSF) method may be used along with the present invention. Such CSF methods are shown in U.S. Pat. Nos. 4,843,870 and 4,932,379, and SAE papers #900232, 890486, 890884 and 901768, the disclosures of which are each hereby incorporated herein by reference.

Each method may have an advantage to offer the other, either as a check on a misfire flag to determine actual misfire or as a more reliable indication under certain operating conditions. For example, the present invention has shown itself in lab testing to be superior to CSF at low load and high RPM conditions. CSF, on the other hand, may be a good means for certifying that continual repetitive misfire of a single cylinder beginning from startup is occurring. Using CSF in tandem with the present invention may provide a superior misfire detection system.

Software and hardware for both systems may be employed with one used as a verification of the other or either may be used on its own to detect the particular misfire conditions for which it is optimally suited. In similar fashion, any other method or apparatus for detecting misfire, including those discussed in the Background section of the present patent application, may be used in conjunction with the present invention.

Embodiment 14

A means for controlling the drive voltage of the sensor 24 may be used to further reduce transient effects. The sensor signal from a location E as shown in FIGS. 6 and 9 may be used to set the input drive voltage to the sensor 24. In this application location E typically does not experience much variation in stress/strain during engine operation. The sensor signal obtained whenever location E is under the sensor head would therefore not change much with varying degree of cylinder combustion, but it may change with speed and temperature. Assuming an increase in RPM increases the sensor signal from all locations, then the input voltage to the sensor could be controlled such that as the signal from location E, i.e., $S_E$, tends to increase, the drive voltage amplitude is caused to decrease in order to maintain $S_E$ at constant amplitude. Hence $S_{C_1}$ may remain unchanged from RPM variations but will change with variations in cylinder #1 combustion. Similar logic holds for variations induced in $S_E$ and $S_{C_1}$ from temperature. The signal $S_{C_1}$ would therefore depend primarily on the actual degree of combustion in cylinder #1 and minimally on speed, temperature, etc.

The circuit used with this embodiment may be operated near resonance in order to compound the positive effects of both operation at resonance as well as the method of this embodiment. This embodiment may, however, be operated below or above resonance as well. Also, an average value of $S_E$, i.e., Mean$S_E$, may be used in lieu of $S_E$ such that the drive voltage is controlled via an average of a plurality of $S_E$ values. Further, wherever any signal level such as $S_E$ or $S_{C_1}$ are used in the discussion of the present embodiment, percent of scale values for such signals, such as %$S_E$ and %$S_{C_1}$, as defined in embodiments 3,4, and 6, may be substituted. As with all other embodiments, methods presented herein are applicable to any cylinders in any type of internal combustion engine.

Embodiment 15

Another means to correct for transient effects comprises division of $S_{C_1}$ by $S_E$ to obtain a resultant signal and use of said resultant signal in lieu of $S_{C_1}$. $S_{C_1}$ and $S_E$ are both affected similarly by changes in speed, temperature, etc., but only $S_{C_1}$ has significant dependence on torque produced by combustion in the cylinder. Hence, the resultant signal will reflect torque variations from firing/misfiring with minimal dependence on transients.

The same consequence may be achieved by determining, on each measure of $S_E$, the percentage of some scale, e.g., full scale, that the signal $S_E$ attains. $S_{C_1}$ may then be multiplied by this percentage to obtain a resultant signal dependent on degree of cylinder combustion, but minimally dependent on transients. For example, if $S_E$ changes in value to 95% of its prior value (or some combination of a plurality of prior values such as a mean, high-low range, etc.), this change would be due primarily to transient operating conditions since $S_E$ is relatively unaffected by torque. Multiplication of $S_{C_1}$ by 0.95 would therefore yield a resultant signal whose value is virtually independent of transients. Said resultant signal may then be used in lieu of $S_{C_1}$ in any of the methodologies comprised by this patent application.

Percent of scale signal may be used for any signal discussed herein, as may any other methodology comprised by the invention such as operation at resonance, etc.

Embodiment 16

Figure 17:
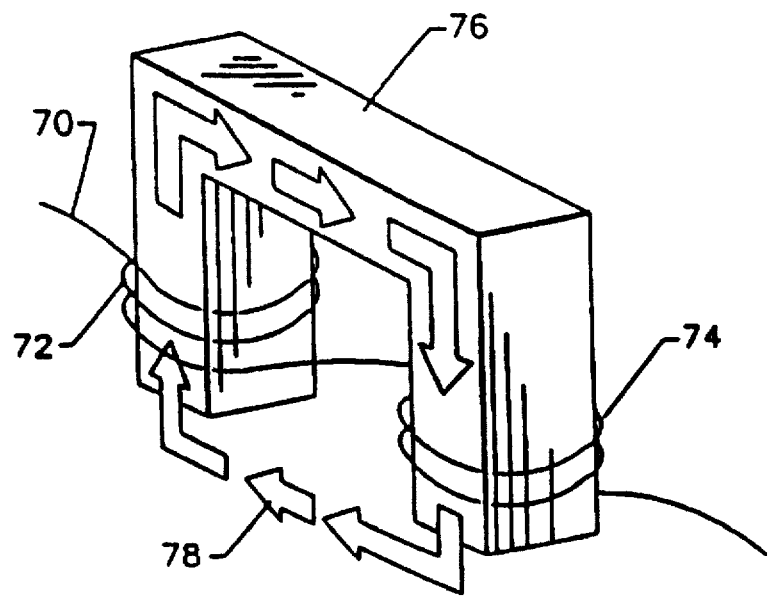
FIG. 17 is a perspective view of a single branch, C-core magnetostrictive sensor for reducing electromagnetic interference.

Electromagnetic interference (EMI) from external sources may be a problem in some applications. FIG. 17 illustrates an embodiment of the invention which reduces EMI problems. Although FIG. 17 shows a single core arrangement, it is also applicable to multiple core sensor designs such as that shown in FIG. 2. In such multiple core designs each core may be similar to that shown in FIG. 17. That is, the core/coil arrangement of FIG. 17 may serve either as a driver or pickup. In addition, the concept revealed in the present embodiment may be used with any type of sensor design, including those shown in FIGS. 1, 2, 3, 18 as well as solenoidal or other type designs.

In FIG. 17, the wire lead 70 forms two coils 72 and 74 connected in series with each coil wound around the core 76. The direction of orientation of the two coils 72, 74 is such that one coil is wound clockwise looking from above while the other coil is wound counterclockwise looking from the same direction.

From the perspective of the magnetic flux flowing through the core represented by the arrows 78, however, both coils appear to be wound in the same direction, i.e., clockwise. Hence if drive current were supplied through the wire lead 70, then each coil 72 and 74 would serve to set up the flux 78 and each coil would, in fact, produce fluxes which are additive in effect. That is, both coils produce flux flowing in the same direction (clockwise around the core as seen in FIG. 17.) External magnetic fields such as radio waves, fields from spark plug firing, etc. would, however, pass through the entire apparatus with the entire field propagation direction effectively the same everywhere.

For example, plane electromagnetic waves propagating from above in FIG. 17 would pass through both coils 72 and 74 at the same time and with the same magnitude, frequency, etc. The effect on the voltage in coil 72 would be opposite the effect in coil 74 since, viewed from above, the two coils are wound in opposite directions. The voltages produced in coils 72 and 74 by the external field cancel one another leaving zero net voltage from external field causes. The additive effects from the input current into lead 70, however, do not cancel.

Identical logic holds when coils 72 and 74 are pickup coils whose voltages arise from the flux 78. The voltages produced in coils 72 and 74 from flux 78 are additive whereas the voltages from external fields are equal but opposite in each coil. Hence, EMI caused changes in pickup voltage are rendered negligible yet voltage dependence on the shaft stress state remains.

Obviously, more than 2 coils may be used to the same end, and other shapes of cores may be employed. The invention comprises any use of coils arranged such that effects from external electric and/or magnetic fields becoming self canceling.

Embodiment 17

Applicants have found through experimentation that use of multiple drive coils in parallel may result in better signal strength than use of a single drive coil even when the total number of windings are equal. (In this context, the terms "coil" and "single coil" may refer to two or more coils connected in series such as shown in Embodiment 16 above.) This may be due to decreased impedance seen by the drive voltage source in the multiple parallel coil case and hence a greater current flowing through each winding. The invention comprises any method or apparatus in which two or more coils are connected in parallel whether such coils are employed as drivers, pickups, or driver/pickup combination (s). This embodiment may be readily used in conjunction with Embodiment 16.

Embodiment 18

The invention may also include one or more tunable electronic filters, the frequency limits of which vary with shaft RPM. This will help to eliminate signal variations with speed. The reason for this may be seen with the aid of FIG. 5 which depicts the signal output from the sensor under two load conditions. Each signal in FIG. 5 has spatial Fourier components due to the spatial variation in magnetic permeability around the shaft. At a given RPM these spatial variations result in time variations in the output signal and a particular spectrum of Fourier components in time. For example, at twice the RPM value, the frequency in time of each of these Fourier components is doubled. Hence, for an electronic circuit with a filter with a fixed frequency cutoff (high, low, or bandpass), certain Fourier components associated with particular spatial variations in permeability will pass through the filter at one shaft speed but not at another shaft speed. The result is a processed signal which varies with shaft speed, since different components of that signal pass through the filter at different RPM's.

In the present invention, a tunable filter may be used, the band of which is tuned to the shaft RPM. In one case, this may entail a bandwidth and a midpoint of the bandwidth both of which vary directly with RPM. For example, if the filter has a bandwidth from 10 Hz to 100 Hz at 600 RPM, then at 1200 RPM it would have a bandwidth from 20 Hz to 200 Hz. With such a filter, the same Fourier components of a signal resulting from spatial variations such as those shown in FIG. 5 would pass through the filter regardless of shaft speed. The invention comprises use of a tunable filter as described herein for monitoring torque and torque variations in any torque transmitting member, and is not limited to internal combustion engines.

Construction of tunable filters as described herein is well known to those skilled in the art, and the invention is not limited to any particular design for such tunable filters. Also, the high pass end may simply be set to zero frequency, and hence remain constant at zero while the low pass end varies with the RPM. Conversely, the low pass end may be set to infinite frequency while the high pass end varies with RPM. Either of these designs is covered by the generic description in the above paragraphs, though they are special cases which may prove of practical value.

In practice, the high pass end may be set to a constant value slightly above zero, and the band pass filter may still function effectively as a tunable band pass filter. Conversely, the low pass end may be set to a suitable constant high frequency value, and the filter may still function effectively as a tunable band pass filter. These variations, and any others which function effectively as tunable band pass filters are covered by the invention.

Experimental results with tunable filters such as those described herein have proven that they do, in fact, reduce and virtually eliminate signal dependence on RPM. Signal shape in the vertical direction, as shown on a oscilloscope, remains unchanged as RPM changes, even while the horizontal (time axis) direction shrinks (higher RPM) or expands (lower RPM).

Embodiment 19

In other embodiments of the invention, estimates of the mean, standard deviation, and/or variance may be used in lieu of actual values. As an example, the standard deviation may be estimated by averaging the absolute values of the variation from the mean over a series of observations. For example, if $\Delta_i$ is the variation of a given signal from the mean signal, then the estimate of the standard deviation would be:

$$\delta_{estim} = \frac{(\pi/2)^{1/2} \sum_{i=1}^{n} |\Delta_i|}{n}$$

This estimate may then be used in any embodiment of the invention which comprises use of standard deviation.

Embodiment 20

In addition, expectation values for statistical quantities such as mean, standard deviation, and variance may be determined and used in lieu of actual such quantities. This may ameliorate transient effects on the signals due to transmission shifting, speed changes, load, etc.

For example, past values of the signal from a given cylinder may be used to calculate an expected value of the signal on the next measurement. This expected value may be used instead of the mean to determine variation of the signal from what is expected. This variation may then be used to determine how many standard deviations (or how many estimated standard deviations) the latest signal comprises.

As an illustrative example, assume $S_j$ is the jth signal from a given cylinder, $\hat{S}_j$ is the expected value of the jth signal, and $\hat{S}_{j+1}$ is the expected value of the j+1th signal. Using the relation $\hat{S}_{j+1}=0.3S_j+0.7\hat{S}_j$ iteratively yields an expected value for each firing event signal which is based on past firing event signals. The coefficients 0.3 and 0.7 used above are only for illustration and in actuality the optimal coefficients to be used may be determined by experiment.

The difference between the actual signal and the expected signal, symbolized by may then be found, as, $\hat{\Delta}_{j+1}$ $\hat{\Delta}_{j+1}=S_{j+1}-\hat{S}_{j+1}$ This value may then be compared directly with a threshold to determine misfire as in other embodiments. It may also be divided by a moving standard deviation (or estimate of the standard deviation) to get a ratio representing the number of standard deviations of the j+1 signal, and this ratio may then be compared to a threshold value in like fashion. Similarly, $\hat{\Delta}_{j+1}$ may be used in place of the difference between $S_{j+1}$ and the mean (or estimate of the mean) in any embodiment.

Many variations on this theme exist which would be obvious to those skilled in the art. For example, the iterative relation used to determine the expected value of the signal might instead be of higher order, such that the difference between the latest signal and the next signal is estimated via extrapolation. Further, the expected value of the signal for a given cylinder, although shown herein as determined solely from past values from that same cylinder (autocorrelation) may also be found using cross correlation with the other cylinders. During transients, all cylinders experience similar signal changes, e.g., for increasing speed and normal firing, the signals from all cylinders tend to increase. Hence, a cross-correlation between cylinders experiencing normal firing exists. The iterative scheme for determining $\hat{S}_{j+1}$, the expected signal value of one cylinder, may therefore include terms which reflect the past signal levels of other cylinders as well.

Similar logic holds for expectation values of quantities other than the signal itself, such as standard deviation, variance, etc. Estimated values, such as that shown in Embodiment 19, may also be used for any of the quantities above.

Embodiment 21

The invention also comprises using the mean value (weighted or not) of differences between successive signals. For example, if $\delta_{j+1}$ if is the difference between the j+1 and jth signals, i.e., $\delta_{j+1}=S_{j+1}-S_j$ then the mean value of the absolute values of that difference is $$\delta_{j+1,mean/abs} = \frac{\sum_{i=j-n+1}^{j} |\delta_i|}{n}$$

If the next value $\delta_{j+2}$ is greater than a certain threshold, then a misfire flag may be set. Alternatively, if the ratio of $\delta j+_2$ to $\delta_{j+1\ mean/abs}$ exceeds a certain threshold, e.g., 5.5, then a misfire flag may be set. This embodiment may ameliorate transient signal effects, since changes between successive signals due to transients are reflected in the differences between successive signals and effectively anticipated in the next occurring signal. Relativity numbers may be defined and used in like fashion as found in other embodiments to cross compare between different cylinders.

Actual, rather than absolute values, may be used as well in any of the above. In addition, the expected value of the next occurring $\delta_{j+2}$ may be determined in a manner such as that shown in embodiment 20 and used to anticipate the value of the next occurring signal. That next occurring signal may then be corrected appropriately before it is used to determine misfire and before it is used in the determination of the moving standard deviation.

Embodiment 22

To determine a repetitive misfire condition, comparison of the difference between high and low values to a mean over a sequence of signal events may be used. For example, in the prior embodiment, if $\delta_H$, $\delta_L$, and $\delta_{mean}$ are the high, low, and mean values respectively of the differences between signals over a given sequence, then $\delta_{mean/abs}=0$ or $\delta_{mean/abs}=\delta_H-\delta_L$ may indicate steady repetitive misfiring. Similarly, if the standard deviation (or its estimate or expected value) is approximately zero, then steady repetitive misfiring may also be determined. This is because normal firings produce torque pulses which vary due to slightly different amounts of fuel and air, turbulent mixing variations in the cylinder, and other factors. Misfires, on the other hand, produce zero torque with little variation.

Embodiment 23

The invention also comprises comparison of a given signal directly with its predecessor, and then interpreting that comparison in terms of a standard deviation (or variance, or estimate of standard deviation, etc.). By way of illustration, if $S_{j+1}$ is compared to $S_j$ via subtraction to obtain $\delta_{j+1}$ (see definition above), then $\delta_{j+1}$ may be divided by the moving standard deviation over the previous n (e.g., n=10) signals to obtain a ratio. That ratio may then be compared to a threshold value, e.g., 5.5, to determine whether to set a misfire flag or not.

Embodiment 24

In prior embodiments, signal processing methods typically employed past data from a particular cylinder (signal) to determine if misfire occurs. This is accomplished through the calculation of an expected value (or mean), via a moving average of prior observations, and the calculation of a scaling value (standard deviation) via a moving standard deviation (or estimate of the standard deviation). The observed signal is then changed to a standardized value or "relativity number" as:

(observed value−expected value)/(standard deviation)

If this relativity number (or its absolute value) is greater than a threshold value (such as 5.5 in prior examples), then a misfire flag may be set.

In the present embodiment, not only the past data from a given cylinder is used to determine misfire in that cylinder, but in addition, past data from other cylinders is used as well. This additional data from other cylinders may be used for determining the expected value (predicted value) and/or the moving standard deviation or estimated moving standard deviation. Doing this improves the estimated expected next signal from each cylinder. By increasing predictive accuracy, the estimated standard deviation may be lowered, thereby rendering anomalous events such as misfire more apparent.

This approach was suggested by the inventors' test experience with prior embodiments where it was noted that the non-steady-state conditions systematically produced expected signals which were over or under the subsequent signal level depending on whether the engine was experiencing acceleration or deceleration. This pattern of over or under prediction for expected signals existed for all cylinders at the same time, and indicated a correlation between errors of prediction in all cylinders. There was therefore, not only correlated errors of prediction in the same cylinder (autocorrelation), but also correlation between errors of prediction in different cylinders (cross-correlation). By incorporating these cross-correlation factors into the estimation process two benefits may be realized: i) reduced false misfire indications, and 2) greater misfire predictive accuracy due to increased signal-to-noise ratio. The estimation/ prediction method presented in the following includes cross-correlation between cylinders and represents only one particular example for incorporating such cross-correlation. The present invention is not limited to the particular example(s) shown herein and comprises any suitable predictive methods encompassing cross-correlation. The following illustrates one application of the ideas presented Let $S_{k,j}$=jth signal (raw) from the kth cylinder, (for example, k=1, . . . ,4). For a four cylinder engine, data comes in the following sequence: $S_{1,1}$, $S_{3,1}$, $S_{4,1}$, $S_{2,1}$, $S_{1,1}$, $S_{3,2}$, . . . After enough data has been received to set initial values, e.g., the initial predicted next values $\hat{S}_{k,j}$ (e.g., $\hat{S}_{k,11}$) may be found by $$\hat{S}_{k,11} = \sum_{i=1}^{10} \frac{S_{k,i}}{10} \quad k=1,\ldots 4$$

The summation and averaging range may be over any number of events other than 10, even including one (i.e., no summation.)

Subsequent expected values may then be as described in embodiment 20, namely $$\hat{S}_{k,j+1} = \alpha S_{k,j} + (1-\alpha)\hat{S}_{k,j}$$

In the example of embodiment 20, α=0.2 has been found most suitable although other values may be used. As in earlier embodiments (see embodiment 20) a deviation between the expected raw signal and the actual raw signal for each cylinder may then be calculated as follows:

$$\hat{\Delta}_{k,j+1} = S_{k,j+1} - \hat{S}_{k,j+1} \text{ where } k=1,\ldots 4$$

There then exists a stream of the raw data signal $$S_{1,11}, S_{3,11}, S_{4,11}, S_{2,11}, S_{1,12}, S_{3,12}, S_{4,12}, \ldots$$

and a raw deviation being observed in sequence $$\hat{\Delta}_{1,22}, \hat{\Delta}_{3,11}, \hat{\Delta}_{4,11}, \hat{\Delta}_{2,11}, \hat{\Delta}_{1,12}, \hat{\Delta}_{3,12}, \hat{\Delta}_{4,12}, \ldots$$

As shown in embodiment 20 and others, any given $\hat{\Delta}_{k,j}$ may be compared directly with some raw threshold value. More likely, it may be divided by a moving (actual or estimated) average of the raw deviation to obtain a 10 relativity number. The relativity number may then be compared to a threshold (e.g., 5.5 in earlier examples.) However, this does not take advantage of the correlation between the $\hat{\Delta}_{k,j}$'s In the present embodiment, the deviation for any given cylinder is predicted on the basis of prior observed $\hat{\Delta}_{k,j}$'s. In general, the prior $\hat{\Delta}_{k,j}$'s will be from more than one cylinder since that results in greater accuracy, although that is not essential. The model presented in the following is only one possible model, being one 20 that has been found in practice to work well. The invention is not limited to the following model and comprises any means for cross-correlation between cylinders including use of $\hat{\Delta}_{k,j}$'s.

In the example, starred quantities (e.g., $\Delta_{1,j+1}$) represent predicted or expected deviations. The particular model shown herein was found using least squares techniques and is represented symbolically as $$\Delta_{1,j+1} = a\hat{\Delta}_{1,j} + b\hat{\Delta}_{4,j} + c\hat{\Delta}_{2,j}$$

$$\Delta_{3,j+1} = a\hat{\Delta}_{3,j} + b\hat{\Delta}_{2,j} + c\hat{\Delta}_{1,j}$$

$$\Delta_{4,j+1} = a\hat{\Delta}_{4,j} + b\hat{\Delta}_{1,j} + c\hat{\Delta}_{3,j}$$

$$\Delta_{2,j+1} = a\hat{\Delta}_{2,j} + b\hat{\Delta}_{3,j} + c\hat{\Delta}_{4,j}$$

From experimentation, it was found that highest correlations for a given cylinder firing existed between the immediate prior firing of that cylinder, the firing of the cylinder immediately preceding that cylinder, and the prior firing of the "sister" cylinder (i.e., the other cylinder which fires when the sensor head is over the same location on the shaft.) Hence, these particular firings are used in the above equations to estimate the expected deviation of the present firing. Use of other firing events in the manner prescribed herein in lieu of, or in addition to, those shown herein is covered by the invention. In one round of experiments performed by the inventors, values of a=0.36, b=0.36, and c=0.20 were found to produce accurate misfire detection.

In the above equations, "a" is the coefficient of the deviation of the prior firing of the same cylinder. "b" is the coefficient of the deviation of the prior firing of the sister, or "paired" cylinder (1 to 4 and 3 to 2 for a four cylinder engine.) "c" is the coefficient of the deviation of the prior firing of 5 the opposite pair cylinder (i.e., the cylinder firing immediately preceding the one being predicted.) A raw difference between the expected deviation and the actual deviation may then be defined as $$R_{k,j} = \hat{\Delta}_{k,j} - \Delta_{k,j} \quad k=1,\ldots 4$$

An expected standard deviation $\hat{\sigma}_{k,j+1}$ may then be found as follows For the first n=10 events, $$\hat{\sigma}_{k,11} = 1.253 \sum_{i=1}^{10} |\Delta_{k,i}|/10 \quad k=1,\ldots 4$$

$$\hat{\sigma}_{k,j+1} = 1.253\beta|R_{k,j}| + (1-\beta)\hat{\sigma}_{k,j}$$

where $1.253 = (\pi/2)^{1/2}$ and is the appropriate multiplying factor to convert the differences shown into units of standard deviation. β is a factor 15 between 0 and 1 comparable to α as used in embodiment 20, and is best found by experimentation. Values of β between 0 and 0.2 are typical. Although 10 is used as the summation number above (for i=1 through 10), any suitable number, including one, may be used.

The relativity number $\hat{n}_{k,j}$ to be compared to a given threshold number (e.g., 5.5 in prior examples) may then be found by $$\hat{n}_{k,j}=1.253 R_{k,j}/\hat{\sigma}_{k,j}$$

This relativity number may then be employed as other relativity numbers are used in other embodiments. That is, if exceeds a certain magnitude, then a misfire flag may be set. Cross comparisons between relativity numbers may be made such as those described in other embodiments (see embodiment 11.)

An alternative relativity number may be used, defined as the ratio of the actual to the expected deviation, i.e., $$n_{k,j}=\hat{\Delta}_{k,j}/\tilde{\Delta}_{k,j}$$

This relativity number may be used in similar manner to that discussed for other relativity numbers. It may be compared to a threshold such as 5.5, for example, to set a misfire flag. Its inverse may be used as well.

All comments of a generic nature made in other embodiments apply equally as well here. For example, higher order expectation calculations may be made.

Embodiment 25

Another useful processing method is shown below. For the first n=10 events, the mean variation is
A new form of the expected variation thereafter is then $$\tilde{\Delta}_{k,11} = \sum_{i=1}^{10} |\hat{\Delta}_{k,i}/10|$$

$$\tilde{\Delta}_{k,j+1} = \gamma|\hat{\Delta}_{k,j}| + (1-\gamma)\,\tilde{\Delta}_{k,j}$$

As in all examples, the summation above may be over any number other than 10, including one.

A new relativity number which is the ratio of the actual deviation to the above expected deviation may then be found as $$\hat{n}_{k,j+1}=\hat{\Delta}_{k,j+1}/\tilde{\Delta}_{k,j+1}$$

This relativity number may then be used by comparison with a threshold such as 5.5 or some other number as shown previously. It may instead, however, be used along with other such relativity numbers from other cylinders, to calculate expected relativity numbers in a fashion similar to that shown above. That is, $$n_{1,j+1}=d\hat{n}_{1,j}+e\hat{n}_{4,j}+f\hat{n}_{2,j}$$

$$n_{3,j+1}=d\hat{n}_{3,j}+e\hat{n}_{2,j}+f\hat{n}_{1,j}$$

$$n_{4,j+1}=d\hat{n}_{4,j}+e\hat{n}_{1,j}+f\hat{n}_{3,j}$$

$$n_{2,j+1}=d\hat{n}_{2,j}+e\hat{n}_{3,j}+f\hat{n}_{4,j}$$

where d,e,f correspond to a,b,c above and may take whatever values produce suitable results. Actual relativity numbers may then be compared with expected relativity numbers via subtraction or division and the result compared to a threshold. For actual relativity 15 numbers much different than the expected, misfire may be indicated. In this way cross-correlation between cylinders may be taken advantage of to yield better accuracy.

Embodiment 26

Figure 26:
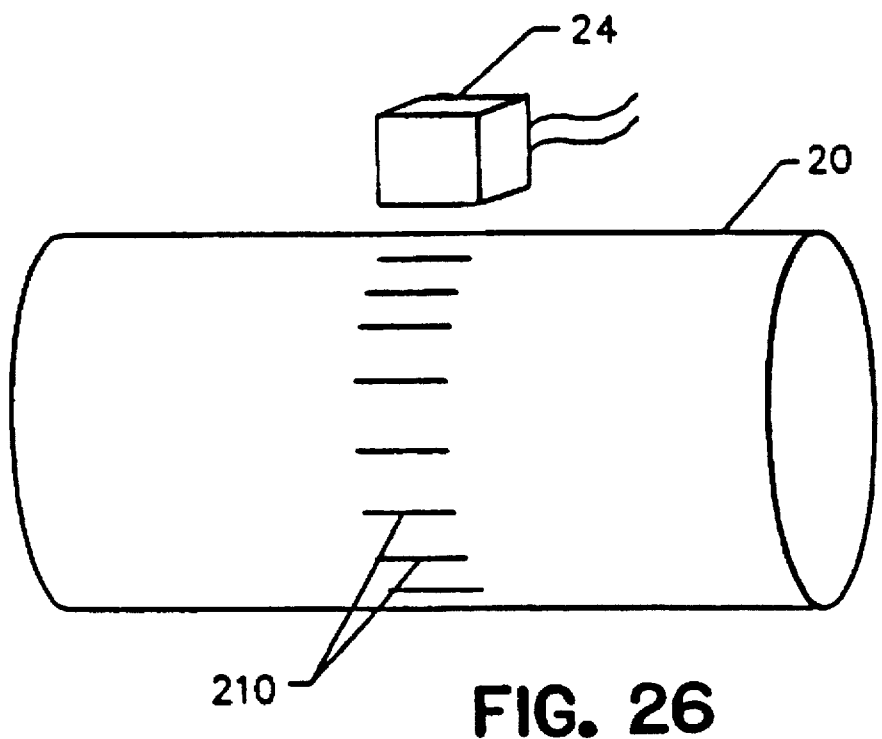
FIG. 26 schematically illustrates use of a magnetostrictive sensor for the additional function of monitoring shaft position.

The sensor could also be used as a position sensor with some modification to the shaft and/or the sensor. For example, cutting of grooves (210 in FIG. 26) or implementing of raised portions on the shaft 20 would cause significant changes in the output signal, since the inductance would change significantly each time such a groove 210 or protuberance (which may also be represented by one of elements 210 in FIG. 26) passed by the sensor. With known distances between grooves 210 (or protuberances), it would be a simple matter for those skilled in the art to correlate shaft rotational position with signal spikes. The grooves 210 (henceforth "grooves" will also apply to "protuberances") may be equally spaced to make it simpler to determine position, although this is not necessary. One groove may be larger or smaller than other grooves and used as a "marker" for a certain location on the shaft. In an internal combustion engine this location may be TDC, for instance. Rotational velocity may be readily determined by those skilled in the art by noting time between signal pulses caused by the grooves 210.

Position sensing as described herein may be done with any of the standard types of magnetostrictive sensors described hereinbefore or elsewhere in the literature. Sensing of stress in the shaft 20 may be done as usual with the signal pulses from the grooves 210 ignored when the rest of the signal is processed in any suitable way to monitor stress and/or torque.

Figure 27:
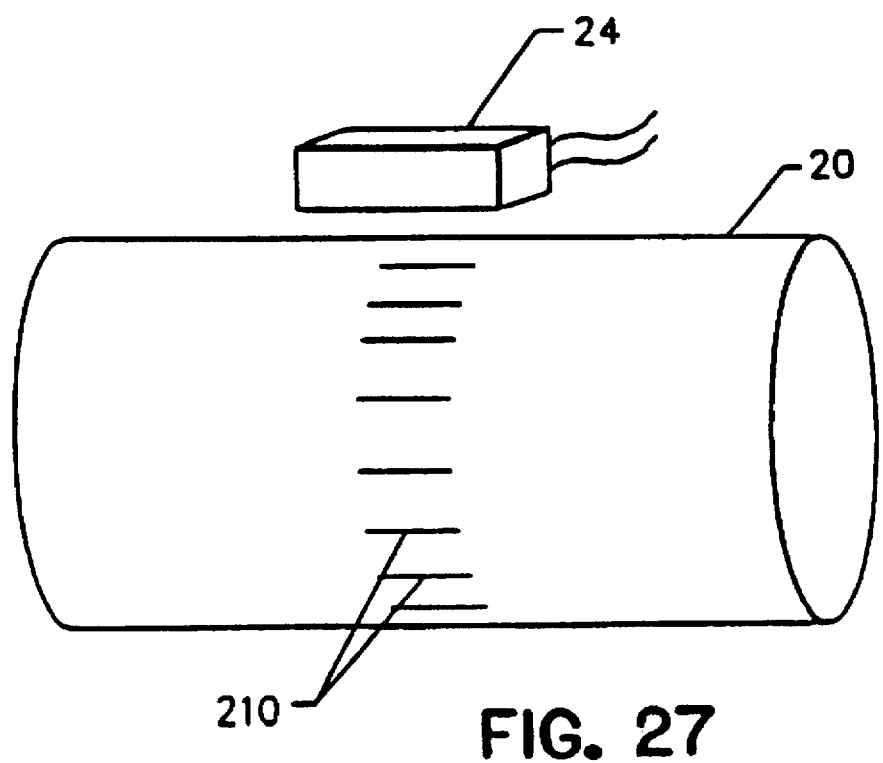
FIG. 27 shows another method for monitoring position and stress with a magnetostrictive sensor.
Figure 28:
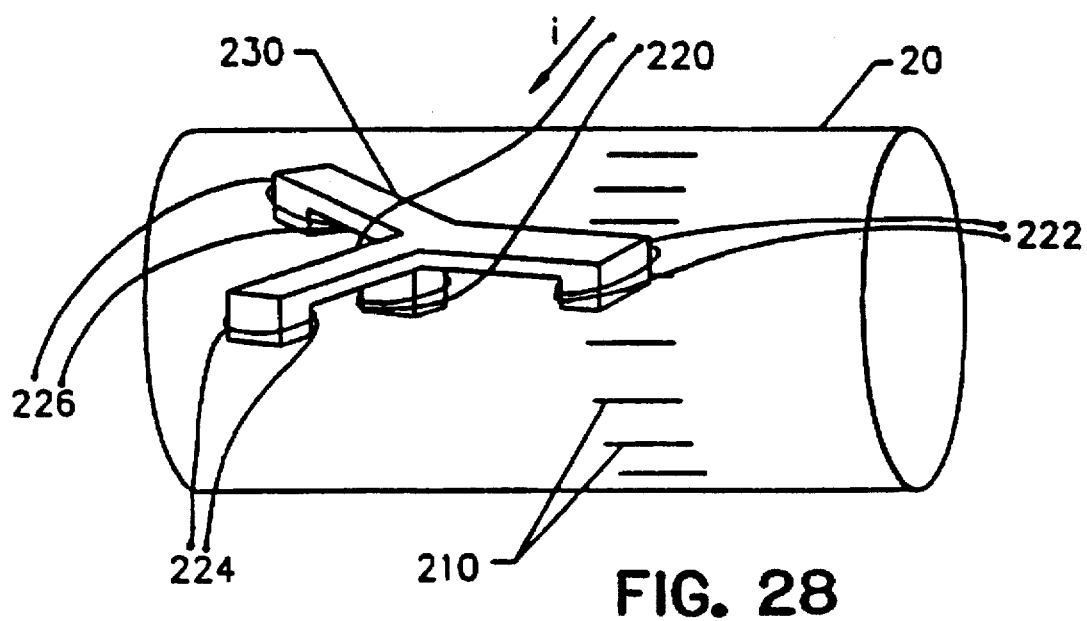
FIG. 28 shows one specific configuration for the generic embodiment shown in FIG. 27.

Alternatively, additional element(s) may be added to the sensor. (See FIGS. 27 and 28.) In the generic device of FIG. 27 position is monitored over the region of the shaft 20 which passes under the sensor head 24 containing grooves The region of the shaft 20 which passes under the sensor head 24, but which is effectively smooth and does not contain grooves, may then be used to monitor stress. FIG. 28 shows a specific configuration 230 of this generic device employing a two branch magnetostrictive sensor (left side of element 230) conjoined with another leg (right side of element 230). The two branch magnetostrictive sensor portion of element 230 measure 10 stress in the traditional way, whereas the single branch on the right side measures position using the inductance changes produced by grooves 210. Wire 220 inputs the driver current to the central leg of element 230 which in turn produces flux that flows through both branches of the left side as well as through the single branch on the right side. Pickup leads 222 may be connected to a voltmeter or other device to measure voltage changes across (or current changes in if the circuit is not open) the two leads 222. Signal spikes may indicate grooves and hence shaft position. Outputs 224 and 226 are the traditional outputs of a two branch magnetostrictive sensor.

Many other possible configurations will be understood by one skilled in the art. Any other types of magnetostrictive sensor may be used with or without additional branches for position sensing. In addition, the position sensing may be done on a flywheel or other torque disk while the magnetostrictive sensing is done on the shaft or the flywheel/disk. Further, two different driver coils on two different cores may be used inside the same sensor housing. One driver may be for magnetostrictive sensing; the other for position. Both driver coils may also be driven in parallel from a constant amplitude voltage source; or both driven in series by a constant amplitude current source. Further, any means for producing signal pulses other than grooves or protuberances may be used and the word groove as used herein may also be interpreted as any such means.

Also, since the voltage delivered as each groove 210 passes under the sensor is, by Faraday's Law, proportional to the time derivative of the inductance, i.e., dL/dt, a faster speed means higher voltage pulses. The voltage level from the pulse may then be used directly to indicate RPM in addition to, or in lieu of, position measurement.

A Preferred Mode of the Invention

Tests have been conducted by applicants using a magnetostrictive sensor 24 installed in the main bearing cap 50 of a test cell engine. The bearing cap 50 was made of stainless steel although in alternate configurations it could be of ceramic, or other non-ferromagnetic material. It may also be made of any typical ferromagnetic material used by automakers for bearing caps, such as cast iron or steel or any other material. Signal strength due to straying of magnetic fields might be reduced somewhat by placing the sensor in a ferromagnetic bearing cap 50.

The sensor 24 used in the test was a cross design magnetostrictive sensor (FIG. 2) driven at several different frequencies ranging from about 40 KHz to about 80 KHz, although other driving frequencies may be used. The drive circuit includes a capacitor (not shown) which along with the inductive nature of the coil and the resistance in the circuit, gives the drive circuit a natural resonant frequency. In one set of tests, the circuit was driven by a constant amplitude voltage at a frequency an or close to the natural frequency of the circuit—about 50 Khz in the test. This natural frequency may be varied and may be chosen as desired by varying the resistance, capacitance, and inductance of the circuit as would be readily understood by those having skill in the art. Driving at or near resonance has the advantage of maximizing current $i_p$, magnetic flux, and sensor output sensitivity and minimizing power and drive voltage level requirements since the imaginary component of the impedance may be minimized or even eliminated.

The inventors have shown in tests, however, that driving in certain frequency ranges somewhat above and below resonance can have other significant advantages, while still maintaining some of the benefit of a small imaginary component of impedance. It was found that, for the particular configuration of the test, operation at about 40 KHz, and also at about 80 KHz, resulted in a signal which was virtually independent of changes in air gap. When used in conjunction with the speed dependent tunable filter described elsewhere herein, the signal was virtually independent of RPM. In addition, initial road testing also implied signal independence from bumps on the road when operated at the 80 KHz frequency. Further, the frequency ranges of operation where these beneficial effects are observed is not extremely narrow, and other frequencies near the 40 KHz and 80 KHz frequencies may also be suitable. Because of the almost magical properties of these frequencies, the inventors have named them "M" frequencies. Obviously, different designs have different M frequencies, and the concept of finding and operating at such frequencies whatever they may be is comprised by the invention.

Operating in the higher M frequency range, i.e., above resonance, has been found to have advantages in addition to the independence from road torque variations described above. As frequency increases above resonance, the current in the circuit decreases. However, the voltage across the inductor is directly proportional to the current and the frequency, and the system dynamics are such that as frequency increases, the voltage across the inductor stays approximately constant. This results in two more major advantages. Firstly, the M frequency range is fairly wide. Hence, choice of a given driver frequency may be suitable for a wide range of mass produced shafts even though those shafts might each have somewhat different permeabilities. Secondly, at frequencies above resonance, the current in the circuit (for constant voltage drive) decreases with increasing frequency. Hence, much smaller wire sizes may be employed in the coil(s) with little sacrifice in signal. This results in an improved design since less volume is needed for the coils and the wire cost is less as well. Further testing above resonance suggests that operation in a particular region of the higher M frequency range may result in signal independence from RPM even without use of a speed dependent tunable filter.

It is also possible to drive at an M frequency with constant amplitude current $i_p$ with the capacitor in parallel rather than series and obtain similar benefits.

As an alternative, a single branch magnetostrictive sensor (FIGS. 3A and 3B) may be used. For example, the sensor shown in FIG. 3A with a pickup coil, driver coil and a drive circuit similar to that described in the previous paragraph may be used. That is, an RCL circuit may be used, operated at or near resonance. A sensor as shown in FIG. 3B may also be used wherein the single coil serves as both a driver and a pickup coil. For this sensor, either constant amplitude driving voltage is used and the change in current used to indicate changes in stress/strain state of the shaft 20, or constant amplitude current is used and the change in voltage is used to indicate changes in stress/strain of the shaft 20. As yet another alternative, a dual branch magnetostrictive sensor may be used such as that shown in FIG. 18. As would be readily understood by those having skill in the art, a single branch, double branch, four branch, cross, or other type magnetostrictive sensor may be used at, near, or off resonance. Since the effect of minimization of RPM and gap dependence has been found to vary with driving frequency, the optimal frequency for a given design may be determined and used.

The inventors have also experimented with varying numbers of windings on coils and have determined that an optimum number of windings exists for any given design. For example, in tests on a C core with a constant voltage driver, a resonant driving circuit, and for winding turns varying between 25 and 200, the optimum number of windings was approximately 100. This was due to several factors. The first is the somewhat counter-intuitive result that, at constant voltage drive, the output signal (from an open circuit pickup coil on the core) increased with a lower number of drive coil windings. (Many prior researchers appear to assume the contrary, i.e., that output would increase with a higher number of drive coil windings.) If this were the only factor to consider, then the lower the number of windings, the better results one might expect. At very low winding numbers (e.g., 25), however, the output voltage levels off and even decreases to some degree. A more significant limitation to a low winding number consists of the marked increase in current in the circuit at such low numbers of windings. Hence, a trade-off between signal strength and amount of current exists. The invention comprises any method which determines an optimal number of coil windings for any particular magnetostrictive sensor design employing the concepts delineated herein.

The sensor used in the test had cores constructed out of laminated ferromagnetic material as may typically be used for such applications. An alternative material is ferrite, also typically used in such applications. The sensor housing was made of plastic in one series of tests and of ceramic (Macor) in another series. Other suitable materials for housing, cores, wiring, etc. may be used as would be readily understood by those having skill in the art.

FIG. 14 illustrates the mode of signal processing employed in the tests. A raw analog signal W is generated by the magnetostrictive sensor in the test configuration. That signal W may then be amplified by an amplifier 110 to yield an amplified signal X. Note that both signals W and X are high frequency oscillations, about 50 Khz in this example, the outermost bounds of which form an envelope N. The amplified signal X is then rectified, such as full wave rectified, by rectifier 112 to yield the rectified signal Y. The rectified signal Y is then passed through a low pass filter 114 which is designed to cut out the high frequency (around 50 KHz) components of rectified signal Y and leave the signal Z whose shape parallels the envelope N. Signal Z is then passed through a high pass filter 116 which is designed so that it is little more than a DC eliminator. That is, high pass filter 116 lets any frequency components typically greater than around 0.01 Hz through to yield final analog signal F. Final analog signal F is effectively signal Z with the DC component removed, that is, the average value of analog signal F is zero. As would be readily understood by those having skill in the art, a single band pass filter with high and low frequency limits respectively set to those of high pass filter 116 and low pass filter 114 may be used in lieu of the separate high pass filter 116 and lowpass filter 114.

Figure 15:
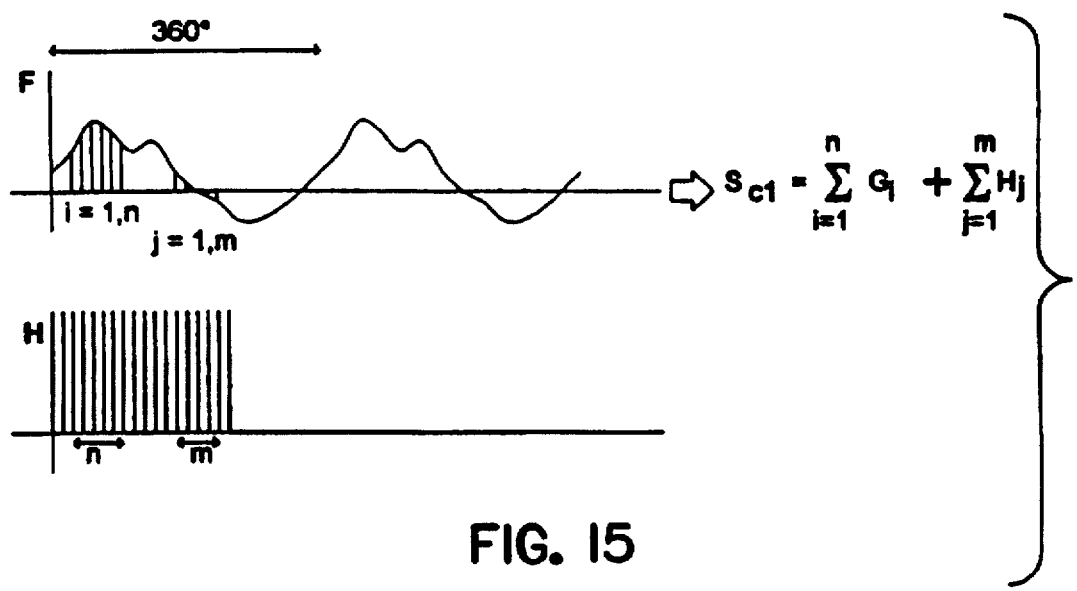
FIG. 15 is a graph of signals generated in a method according to the present invention.

FIG. 15 helps illustrate the digitization method employed in the test to sample the final analog signal F and produce a suitable digital signal. In the test, a cam shaft sensor was used to indicate position of the distributor cam shaft and hence indicate which cylinder was in its power stroke. In addition, a flywheel sensor was used to detect the particular location on the shaft 20 passing under the sensor 24. (See FIGS. 6–11). The flywheel sensor was a Hall effect sensor which produced a signal spike H each time a flywheel tooth passed the Hall effect sensor as shown in the plot of H over the angular location of the crankshaft as shown in FIG. 15. The final analog signal F was then sampled each time a pulse was received from the Hall effect sensor. In processing the resulting digital signals $G_i$ it was determined that greater accuracy resulted from sampling from two regions on the shaft represented by $G_i$ and $G_j$ corresponding to the torque peaks shown in FIG. 13. The first torque peak, which for any given cylinder power stroke typically occurs in the first half of the power stroke, is due to the pressure developed during combustion in the cylinder. The second torque peak is due to inertial factors and is the indirect result of the same combustion event.

In the test, n samples of F, that is, $G_i$ where i=1,n, were taken corresponding to the region of the first torque peak, and m samples of F, that is, $G_j$ where j=1,m, were taken corresponding to the region of the second torque peak. Since, in the test, cylinder #1 was the cylinder intentionally being misfired, the signal of interest is designated in this example as $S_{C1}$, and the signal $S_{C1}$ corresponds to the signal designated $S_{C1}$ in all previous discussion of other embodiments. $S_{C1}$ was found simply by adding all values of $G_i$ and $G_j$. That is $$\sum_{i=1}^{n} G_i + \sum_{j=1}^{m} G_j = S_{C1}$$

In similar fashion, $S_{D2}$, $S_{D3}$, $S_{C4}$ signals were found for the other cylinders. These four signals $S_{C1}$, $S_{D2}$, $S_{D3}$, and $S_{C4}$ may then be processed in any of the manners discussed in the embodiments described herein or in any other manner to monitor and determine a number of engine parameters. Attention in the tests was on misfire detection although knock detection, relative torque indication, and other uses for the invention are possible. In the particular tests and signal processing referenced herein, Embodiment 2 consisting of comparing $S_{C1}$ to a moving average and moving standard deviation of a series of prior $S_{C1}$ signals has been investigated and found to accurately detect misfire.

The summation points corresponding above to the spikes on the graph of H versus the location on the shaft 20 may be expanded to include additional points lying between the spikes shown in FIG. 15. Accuracy may be improved by so doing and the summation may then become a good approximation of an analog integration of the final analog signal F.

Analog integration over the regions of the shaft where the torque peaks or even over larger regions, including the region corresponding to the entire power stroke, may be done instead of the sum of digital values $G_i$ and $G_j$ as shown above. This may be carried out with appropriate circuits including one or more capacitors in order to integrate the final analog signal F. Suitable methods for spatial integration include: (1) switched capacitor integrator/filter, (2) discretely varying resistors employed in a bank of different resistors to modify the time constant of an integrator circuit to suit the RPM, and (3) employing a field effect transistor as a voltage variable resistor in an integrator circuit. In such an application, $$\int F ds = S_{C1}$$

where the integration is carried out over a suitable region of the shaft 20 and the differential quantity "ds" in the integrand represents an infinitesimal region on the shaft 20.

Alternately, the integration may be performed over time rather than shaft location. The resultant of the integration would then typically be modified to correct for differences in the speed of the shaft 20. For example, if the shaft 20 were moving at one speed for one integration and a second speed, twice that of the first, for a second integration, then for consistency in comparison, the integration of the second case would have to occur for half of the time of the first. In addition appropriate starting and ending times of the integration would have to be adjusted to account for the variation in shaft speed. The flywheel sensor may also be used to advantage in such case, by determining shaft speed and triggering the initial and final starting points for the integration.

When integration is performed over time and even though the time periods of integration are adjusted to correspond to the same shaft locations, the final result of the integration must be modified further to account for the variation in the length of time over which the integration is carried out. Hence if in the second case above, the RPM is twice that of the first case, then the integral in the second case was carried out over half of the time. Hence the integral in the second case must be multiplied by two in order to compare it to that of the first case. A simple way to carry out this adjustment entails multiplying the result of each integration by the RPM of the shaft or equivalently dividing by a time inversely proportional to the RPM, such as the time between spikes generated by the flywheel sensor or the time of integration. Mathematically, this can be expressed as $$(RPM) \int F dt = S_{C1}$$

or alternatively, as $$(1/T) \int F dt = S_{C1}.$$

Spatial Integration/Summation

Practical methods and means for carrying out spatial integration either actual or effective integration which are comprised by the present invention may be shown with the aid of with any embodiment.

Figure 19:
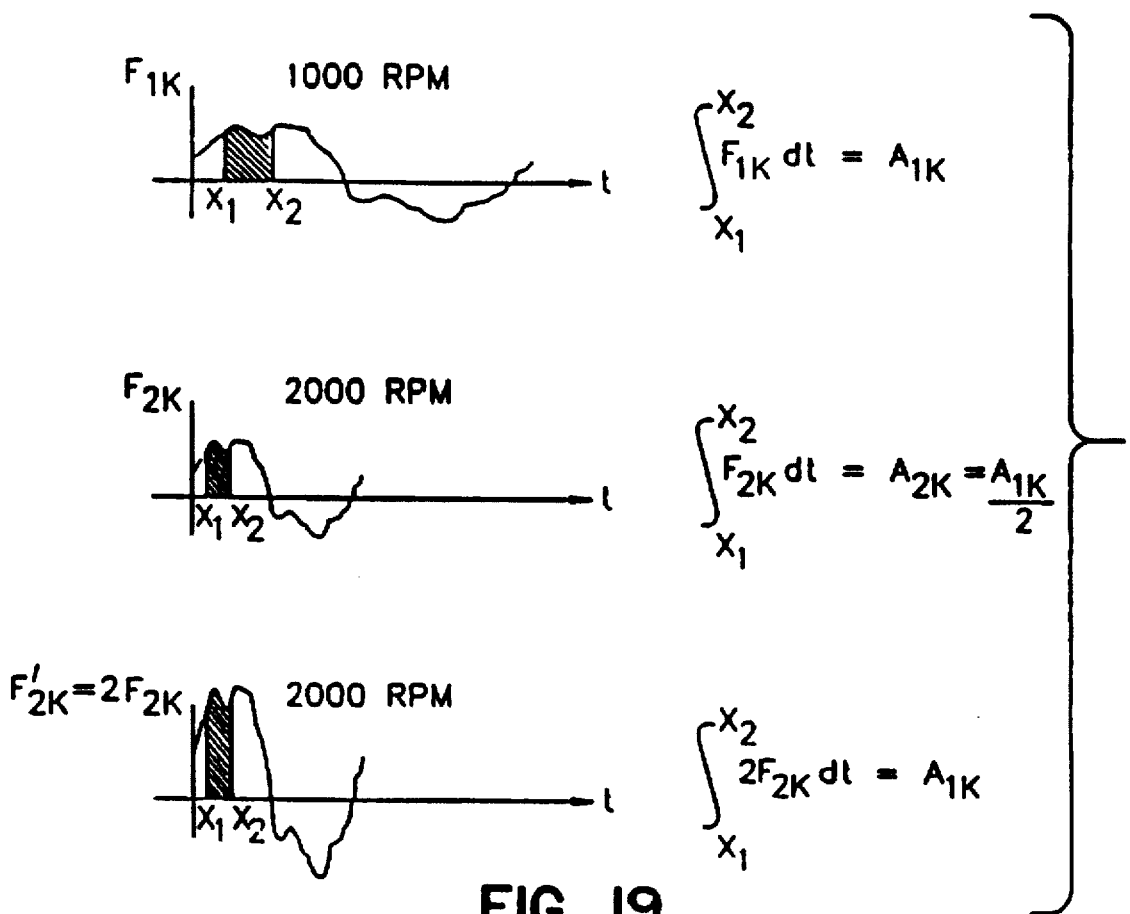
FIG. 19 graphically illustrates the signal F of FIGS. 14 and 15 at different RPM and amplified.

In FIG. 19, $F_{1K}$ represents the signal F shown in FIG. 14 when the shaft speed is 1000 RPM. $F_{2K}$ represents the signal F when the shaft speed is 2000 RPM. Note that because the shaft speed is twice as much at 2000 RPM, the signals from given points on the shaft (i.e., $X_1$, $X_2$, or other points) occur at half of the distance on the time axis on the $F_{2K}$ curve as on the $F_{1K}$ curve (assuming that the origins on both curves represent the same physical point on the shaft.) Yet the height of the $F_{2K}$ curve at any given physical point on the shaft is the same as it is on the $F_{1K}$ curve. Hence, any integration between two points on the shaft, e.g., $x_1$ and $x_2$, (see shaded areas) will result in one half the total value for $F_{2K}$ as it will for $F_{1K}$. That is, if $A_{1K}$ is the region of integration shown shaded in the $F_{1K}$ curve of FIG. 19, and $A_{2K}$ is the region of integration shown shaded in the $F_{2K}$ curve, then $A_{1K}=2A_{2K}$. In general, therefore, any integrated value of F varies with the RPM of the shaft.

If, in the example shown, the signal $F_{2K}$ were amplified to twice its original value, i.e., $F'_{2K}$, then the integration between the same two points (see shaded area of $F'_{2K}$ curve) would equal $A_{1K}$, the integration of $F_{1K}$ between the same two points. If the amplification were variable and linearly proportional to the RPM, the value of the integration between points $x_1$ and $X_2$ may be the same at any speed. (This assumes, of course, that the shape of F signal curve changes with RPM only in the time axis direction and not in the vertical direction. The tunable band pass filter hereinbefore described performs this function in certain embodiments of the present invention.)

Figure 20:
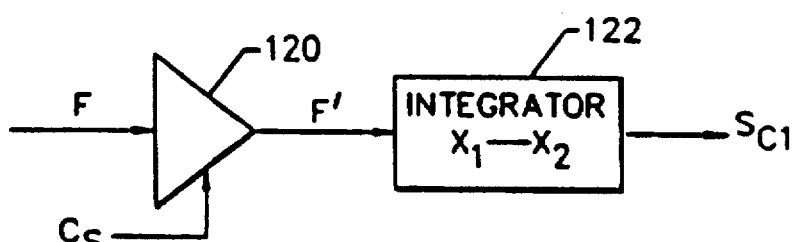
FIG. 20 is a schematic block diagram of one means for obtaining an integration of F independent of RPM.

FIG. 20 is a schematic diagram showing one means for amplifying F such that the resultant signal $S_{C1}$ is speed independent. Amplifier 120 amplifies stress related signal F at the signal input thereof and is controlled by the control signal $C_S$ at the control input thereof, where said control signal is a function of the shaft RPM. The control is such that the amplitude of F', the output from amplifier 120, may increase linearly with RPM. Integrator 122 then integrates F' over a desired region of integration and outputs the integrated signal $S_{C1}$, which may be RPM independent. The signals F, $C_X$, F', and, $S_{C1}$ may be currents, voltages, or any suitable physical signal. In practical application, amplifier 120 may be an operational transconductance amplifier (OTA), F' may be a current, and integrator 122 may include a capacitor, but these are not essential for the working of the invention.

Figure 21:
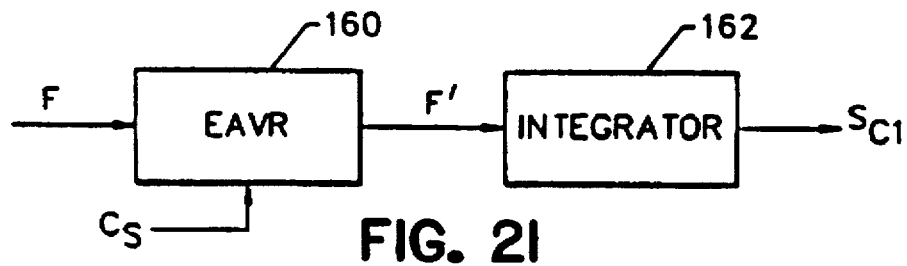
FIG. 21 is a schematic block diagram of a generic means for obtaining integration of F independent of RPM.

FIG. 21 shows a generic means for maintaining the signal $S_{C1}$ constant, or effectively constant, with changing speed. Element 160, is an effective or actual variable resistance (EAVR) used with integrator 162. FIG. 20 actually illustrates a specific configuration of FIG. 21, wherein the EAVR 160 is an effective variable resistor in the form of an amplifier. Integrator 162 may typically include one or more capacitors such that the configuration of FIG. 21 is an RC circuit (if 160 is an actual resistor) or an effective RC circuit (if 160 is an effective resistor.) The control input $C_S$ effects a change in the actual or effective resistance of 160 with RPM such that the time constant of the RC circuit changes with RPM. This changing of the time constant can be controlled such that $S_{C1}$, the integrated value of the signal input F, remains effectively constant with changing RPM. As the time of integration becomes shorter at higher RPM, the time constant is constrained to a smaller value such that the integration with respect to time occurs faster (in practice, the same charge accumulates on the capacitor in less time). The resultant signal may then be effectively independent of RPM.

Although the invention comprises use of any suitable quantities such as voltage or current for any of the quantities involved, in practice, F is typically a voltage, F' a current, and $S_{C1}$ a voltage.

Figure 22:
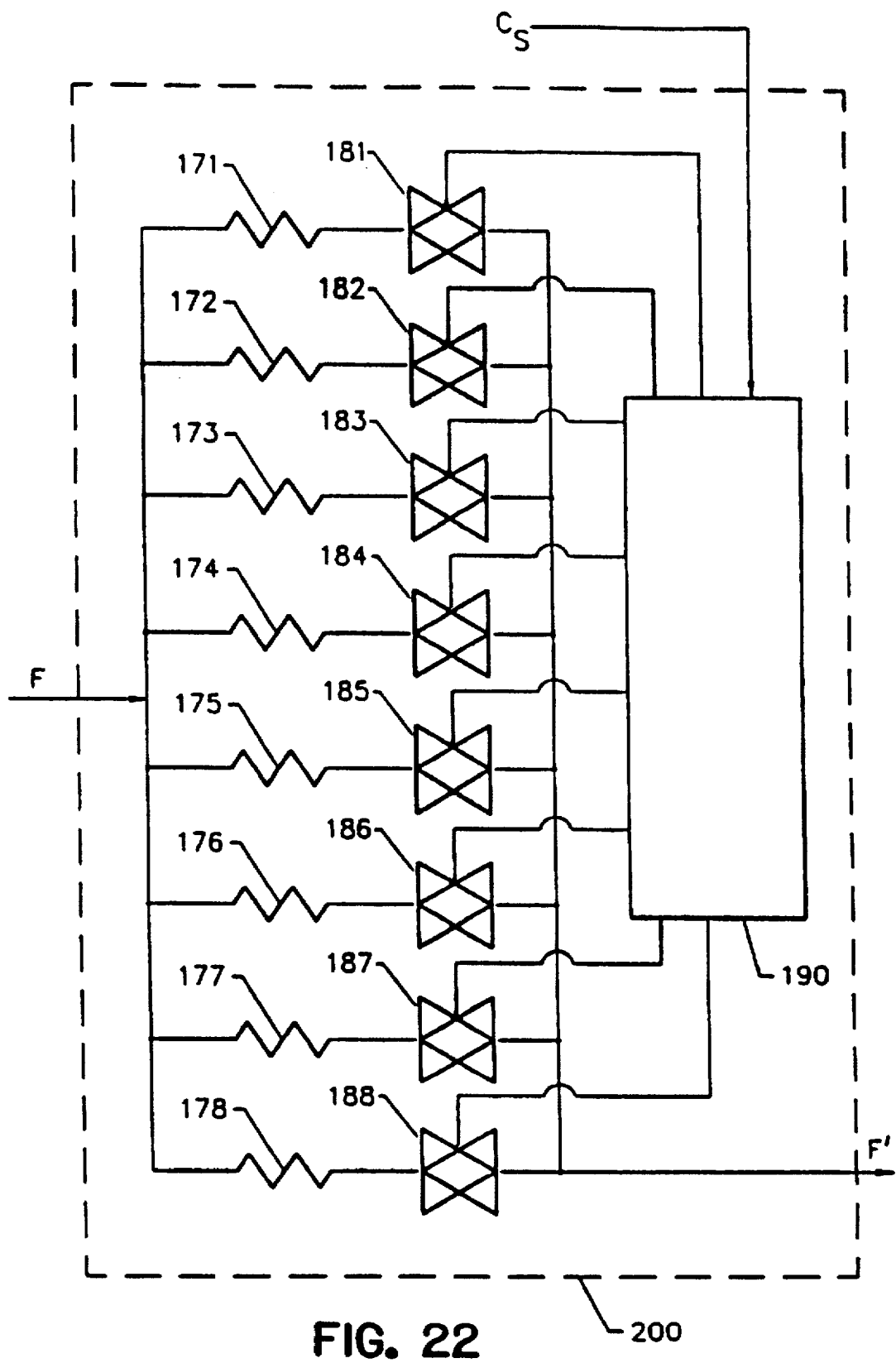
FIG. 22 is a schematic block diagram of one specific means for implementing the generic configuration of FIG. 21.

FIG. 22 shows one specific configuration for the generic approach of FIG. 21 wherein EAVR 160 is an actual variable resistor 200. Elements 171 through 178 are standard resistors, wherein each may be of a different ohmic value. Elements through 188 are switches controlled by the controller 198. The numbers of resistor elements and switch elements affect resolution accuracy, but use of any number of each which provides acceptable accuracy is comprised by the invention. For purposes of illustration eight of each are shown in FIG. 22. The controller 190, which may be a programmable array logic (PAL) controller, opens and closes the appropriate switches 181 through 188 in response to the RPM dependent control input $C_S$. By opening and closing different switches the total resistance of the resistor bank may be made to vary over a wide range in small discrete steps. Judicious control of the switches, therefore, may cause the total resistance of the resistor bank to vary such that the time constant of the RC circuit shown in FIG. 21 varies with RPM in the appropriate manner to maintain the output $S_{C1}$ effectively independent of shaft speed. In this application, F may be a voltage signal, F' a current signal, and $S_{C1}$ a voltage signal, but that is not necessary for the functioning of the invention.

Figure 23:
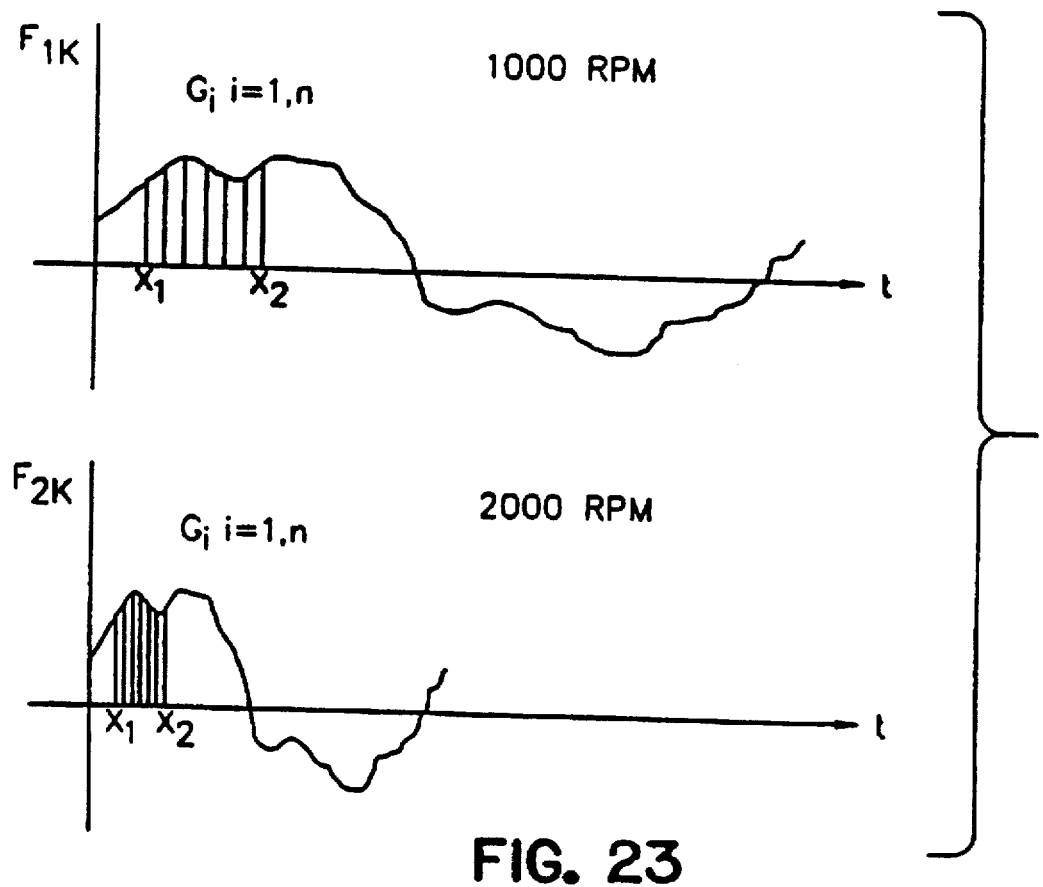
FIG. 23 graphically illustrates two curves of signal F at two different RPM and illustrates discrete sampling of the continuous signal F.

FIG. 23 depicts the discrete sampling method described hereinbefore and shown in FIG. 15, but FIG. 23 additionally illustrates the effect on the signal when the RPM level is doubled. When analog-to-digital (A/D) conversions (the $G_1$) are made corresponding to discrete points or portions on the surface of the shaft, and the resulting fixed number of digital signals $G_1$ are added to obtain $S_{C1}$, there is no dependence of $S_{C1}$ on RPM. When this summation is done via computer, however, the computational load can be severe. To ameliorate that problem, the present invention comprises a method, shown schematically in FIGS. 24 and 25, to perform the discretization and summation via analog circuitry. This method is effectively a spatial integration which is independent of RPM.

Figure 24:
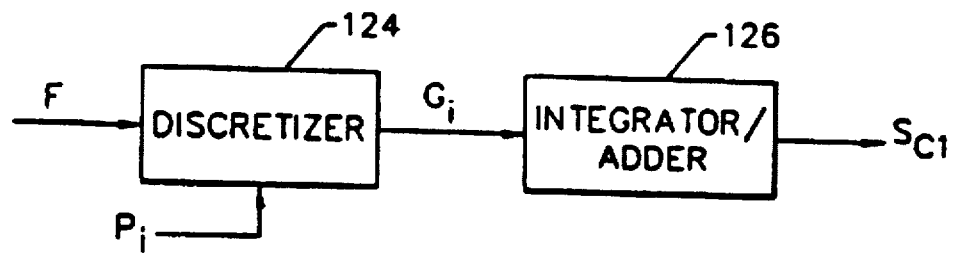
FIG. 24 is a schematic block diagram of a generic means for obtaining an integrated/added signal from the discrete signals shown in FIG. 23.

FIG. 24 represents a generic means for carrying out this effective spatial integration. Element 124 discretizes the input signal F according to control inputs $P_1$ where said control inputs may typically be shaft position and/or speed indicators. The integrator/adder 126 then sums the signals to produce the effectively RPM independent output $S_{C1}$. Any means which accomplishes this is comprised by the invention, but a particularly useful specific configuration of the generic method of FIG. 24 is shown in FIG. 25.

Figure 25:
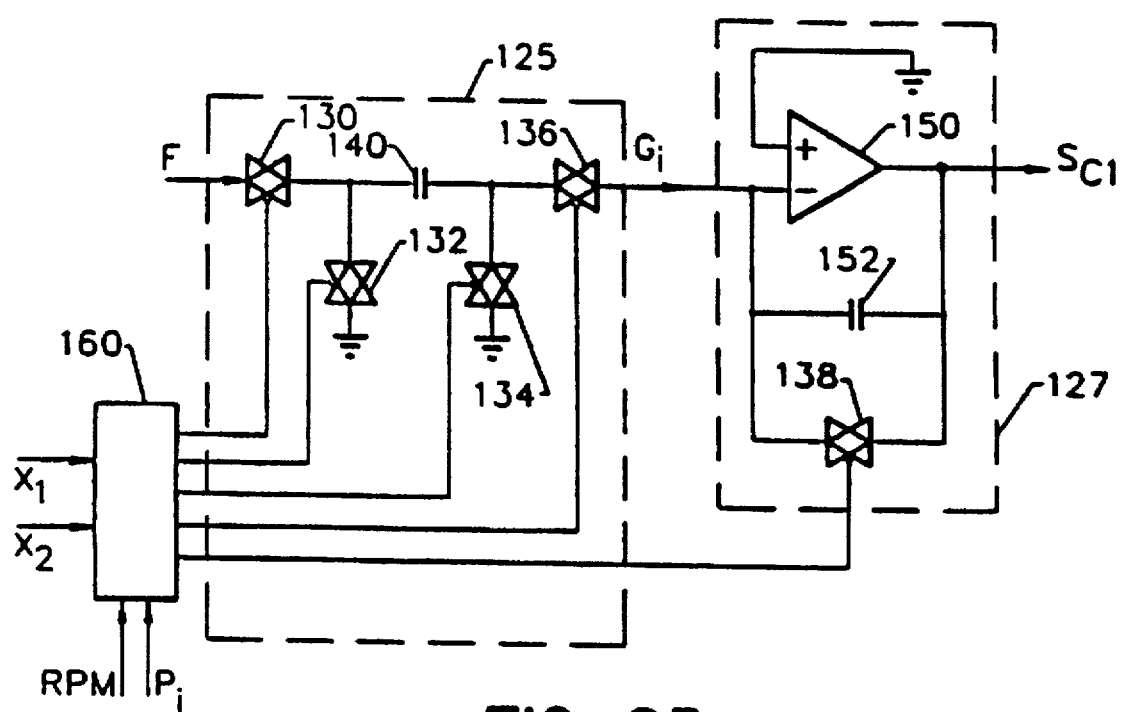
FIG. 25 is a schematic diagram of a specific means for discretizing the signal F and summing to obtain a signal independent of RPM.

The circuitry shown in FIG. 25 has been tested and found by the inventors in practice to function extremely well. The four switches, 130, 132, 134, 136 and the first capacitor 140 (or other first charge storing means) comprise a switched capacitor circuit 125 which is a specific configuration of the generic discretizer 124 of FIG. 24. The amp 150, the second capacitor 152 (or other second charge storing means), and the switch 138 comprise the adder circuit 127 which is a specific configuration of adder 126 in FIG. 24. Element 160 is a controller, typically, but not necessarily, a PAL controller, which controls the switches in a prescribed way depending on inputs such as beginning and ending points $x_1$, and $x_2$ of the summation, RPM, and specified discretization points within the region of summation.

At any point in time current from signal F attempts to enter discretizer 125. When the $x_1$, point on the shaft passes under the sensor head (in practice this may be a flywheel tooth that is sensed by an appropriate sensor which sends a signal pulse to the PAL controller 160), switches 130 and 134 close, and switches 132 and 136 open. The capacitance of capacitor 140 is such that capacitor 140 becomes saturated almost instantaneously at the voltage level of signal F. At an appropriate time interval later (typically, but not necessarily, half of the time between pulses), switches 130 and 134 then open, and switches 132 and 136 close, thereby sending the charge which accumulated on the right side of capacitor 140 into capacitor 152. The charge on the left side of capacitor 140 is simultaneously drained to ground. With the next pulse signal, switches 130 and 134 close and switches 132 and 136 open, and the process repeats. During the next and subsequent discharges of capacitor 140, the charges sent to capacitor 152 accumulate and build up thereby increasing the voltage on capacitor 152 with each new discharge of capacitor 140. The buildup of charge on capacitor 152 may begin at a suitable point near the beginning of the firing stroke of a given cylinder (signaled by $x_1$) and end near the end of said firing stroke (signaled by x2). Switch 138 is open during the buildup of charge on capacitor 152, but as soon as the end of the interval to be integrated (summed) is reached, the voltage across capacitor 152 is taken as signal $S_{C1}$. Switch 138 then closes long enough for capacitor 152 to discharge before the process repeats again for the next firing event.

In practice, greater accuracy has been obtained by summing over two regions of a given firing event. The first such interval occurs from near the beginning of the firing stroke to near the middle. The second occurs from just after the middle to near the end. Experimentation can determine the precise optimal regions. In the configuration of FIG. 25 shown herein, switch 136 may merely remain open during the "dead" space between the two intervals of interest and the charge on capacitor 152 may be maintained (by keeping switch 138 open.) These and all other controls may be performed readily by controller 138 and the appropriate inputs $x_1$, $X_2$, and $P_1$.

Also, RPM may actually be calculated within controller 160 or elsewhere using the position signals $x_1$, $x_2$, and $P_1$ without actually requiring separate input of RPM. Further, element 126 of FIG. 24 may be a DSP (digital signal processor) or application specific integrated circuit (ASIC) chip or any other suitable element. Element 124 may be a sample and hold circuit which delivers $G_1$ to element 126. The configuration of FIG. 25 is a switched capacitor circuit.

In actual application of the configuration shown in FIG. 25, the inventors have used a phase locked loop to provide eight signals per flywheel tooth, such that the eight signals are effectively equally spaced spatially between successive flywheel tooth signals. An RPM signal is used as an input to the phase locked loop to make the appropriate temporal spacing adjustments in the eight signals such that the spacing between them corresponds to effectively equal angular increments of the shaft position. These eight signals per flywheel tooth signal event are then used by the PAL (or other suitable controller) as triggers for the opening and closing of the appropriate switches 130, 132, 134, 136, 138 in the manner shown previously. In this example, each pattern of switch openings and closings is therefore triggered eight times per flywheel tooth signal event rather than the single time described previously. This results in greater accuracy in the final signal $S_{C1}$.

Any number of signals per flywheel tooth event other than eight may be incorporated and is covered by the invention. Further, any circuitry performing the same function whether it is a phase locked loop or not is covered by the invention as well. Also, use of a phase locked loop or other circuitry to provide further signals which augment a signal from a flywheel tooth such as described herein may be used in any other embodiment or configuration of the invention. For those skilled in the art, use and construction of phase locked loops as described herein is straightforward.

The inventors have found in actual experimentation that the configuration herein described not only reduces computer computational time by a factor of as much as five or ten, but improves the misfire standard deviation signals by approximately 50% as well. This appears to be due to the increased accuracy in obtaining the $S_{C1}$ signals for good firings, such that the raw standard deviation signals for good firings obtained are lower. That is, less inaccuracy enters into the baseline data, so the spread of the baseline data is less. Hence, a given misfire is a greater number of standard deviations from the mean.

I-Channel Detection

The output signals of magnetostrictive sensing systems include both signal components that are in phase with the drive voltage of the magnetostrictive sensor and components that are out of phase with the drive voltage of the magnetostrictive sensor. As a matter of convention only, the component of the output signal that is in phase with the drive voltage is referred to as the I-channel component, and the component of the output signal that is out of phase with the drive voltage is referred to as the Q-channel component.

Figure 29:
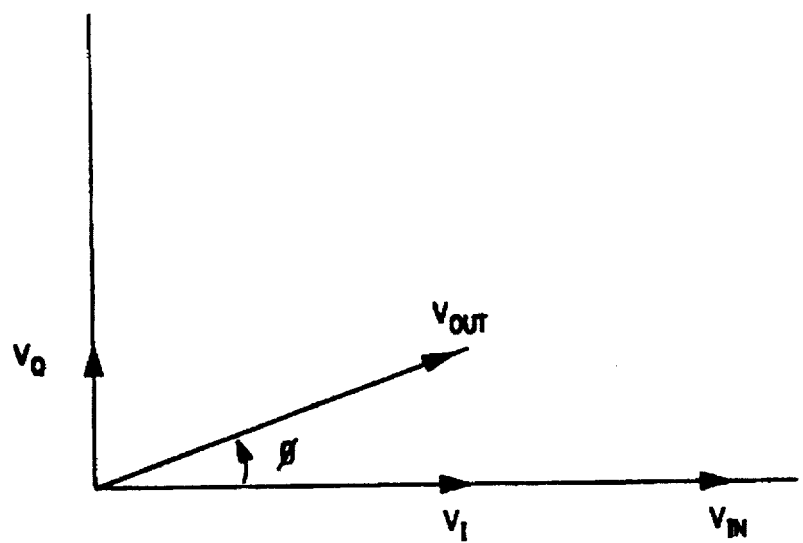
FIG. 29 is a graphical illustration of the relationship between the output voltage signal, the I-channel component of the output voltage, the out-of-phase component, the signal phase and the input voltage.

FIG. 29 shows the relationship between the input voltage ($V_{IN}$), the output voltage signal ($V_{OUT}$), the in-phase or "I channel" component ($V_I$) of the output voltage, the out-of-phase (quadrature or "Q channel") component ($V_Q$), and the phase $\psi$ between $V_{IN}$ and $V_{OUT}$. Mathematically, $V_I = V_{OUT}\cos\psi$ and $V_Q = V_{OUT}\sin\psi$. Although voltages are shown in FIG. 29, the invention is equally applicable using current as the circuit parameters of interest. For example, output current may be used rather than output voltage with associated I and Q channel components of current. Similarly, input current may be substituted for input voltage. The invention utilizes input and output signals (which may be any appropriate signals) and the phase/magnitude components of those signals.

In prior art work on magnetostrictive sensing, researchers have focused primarily on the amplitude of the output voltage $V_{OUT}$. The present invention, on the other hand, detects one or more phase component(s) of that output voltage. The phase component(s) are the I channel component, the Q channel component, the phase, the magnitude, or any combination thereof.

Figure 30:
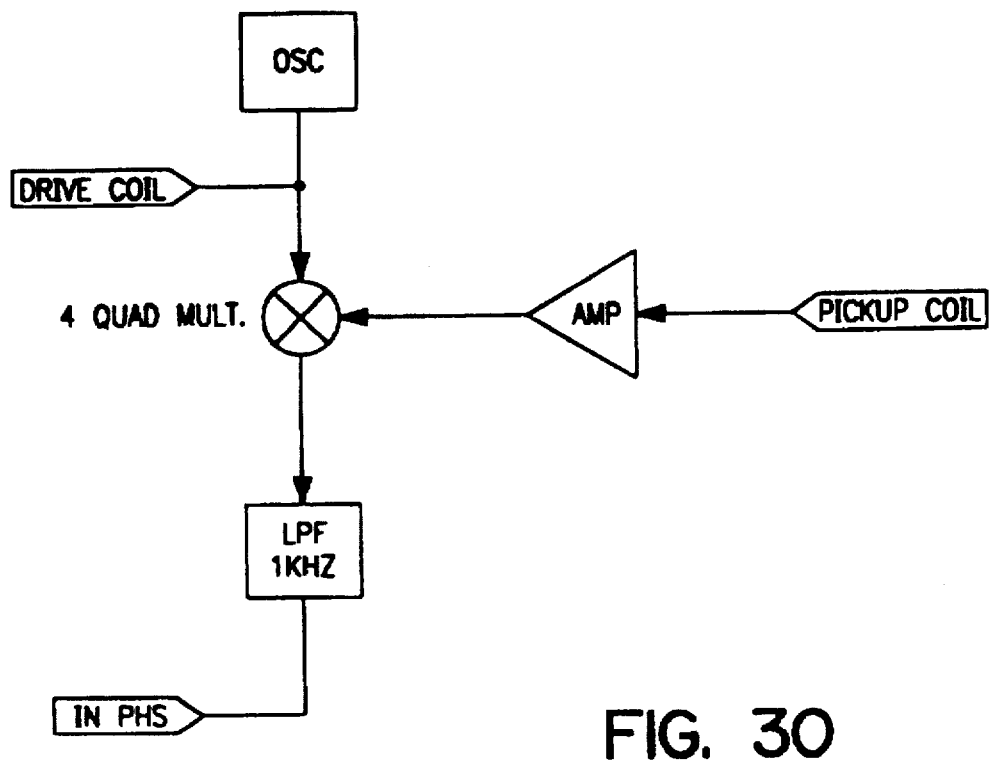
FIG. 30 is a schematic diagram of a magnetostrictive misfire detection system utilizing I-channel detection to establish an engine misfire condition.

In the embodiment illustrated in FIG. 30, the voltage from the pickup coil, $V_{OUT}$ is amplified (the amplifier is not an essential element of the invention) and sent to a four quadrant multiplier (though any means to detect phase or phase components may be used). The multiplier compares the $V_{OUT}$ signal to the $V_{IN}$ signal and outputs the I channel component signal $V_I$ (shown as "IN PHS" in FIG. 30). The low pass filter (LPF) in FIG. 30 helps detection capability but is not a necessary part of the invention. Typical practical drive frequencies supplied by the oscillator are in the range of 20 to 100 kHz, but no particular drive frequency is necessitated by the invention.

Detection of variation in stress (or torque) is then carried out using the in-phase component of the sensor output signal. It may also be carried out using the quadrature component rather than the in-phase component, in which case the output from multiplier would be $V_Q$. For simplicity, however, the following discussion will assume the output is $V_I$.

For the particular application of misfire, knock, and roughness detection shown elsewhere herein, the signals processed as "S" (e.g., $S_{C1}$,) would then simply be $V_I$ rather than the amplitude of the output voltage (as is typical in prior art).

The advantages found in testing by the inventors for I (or Q channel) detection are considerable. These include:

(1) detection without the cost or complexity of full wave rectification or AC coupling (see FIGS. 14A–14E);

(2) an output signal which is a more linear function of torque; and (3) elimination of overmodulation problems inherent in magnitude detection.

Figure 31:
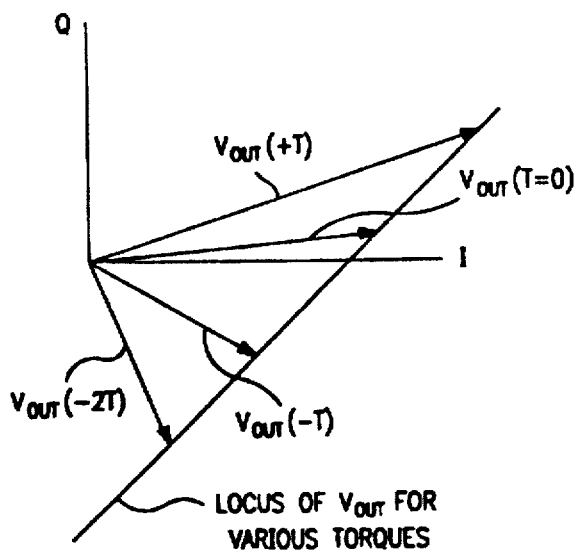
FIG. 31 is a phaser diagram of the output voltage.
Figure 32:
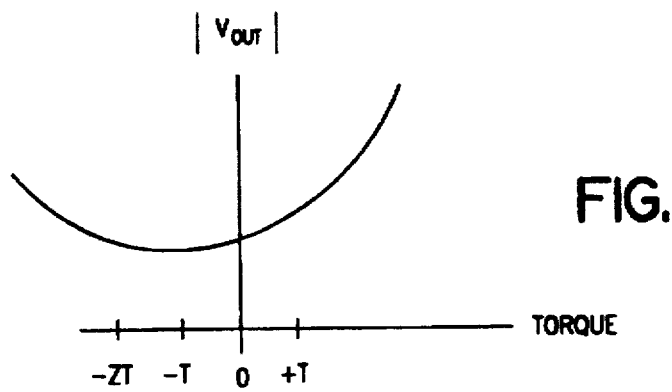
FIG. 32 is a graphical diagram of the magnitude of the output voltage in response to applied torque.
Figure 33:
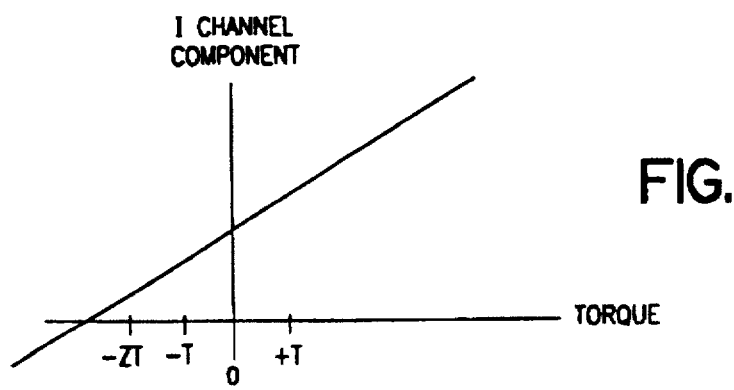
FIG. 33 is a graphical diagram of the I-channel component of the output voltage in response to applied torque.

The second of the advantages listed above can be explained with the aid of FIGS. 31, 32, and 33. The change in $V_{OUT}$ is not completely in phase with $V_{OUT}$ for zero torque, and the variation in $V_{OUT}$ for different values of torque T may be represented as shown in the phasor diagram of FIG. 31. As torque decreases (FIG. 32), the magnitude of $V_{OUT}$ decreases to a lower limit and then begins to increase once again as torque continues to decrease. As shown in FIG. 32, the relationship between $|V_{OUT}|$ and torque generated by such behavior is decidedly non-linear.

The I channel component of $V_{OUT}$, in contradistinction to the magnitude of $V_{OUT}$ has a more linear relationship with torque (FIG. 33). This can readily be seen by noting from FIG. 31 that the projection of $V_{OUT}$ onto the horizontal (I channel) axis varies linearly with changes in torque.

The third advantage listed above relates to signal overmodulation and may be understood with the aid of FIGS. 34A to 34D, and 35A to 35D which represent zero applied torque, and non-zero applied torque conditions, respectively. These figures depict the method of full wave rectification and filtering of the sensor output signal discussed previously with the aid of FIGS. 14B to 14E. FIGS. 34A–D and 35A–D differ from the earlier figures, however, in that they display an overmodulation region due to particularly extreme (yet fairly common) variations in permeability anisotropy as the torque transmitting element rotates.

The high frequency drive (commonly 20 to 100 kHz in practice) results in a high frequency output, the magnitude of which at any particular point in time corresponding to a point on the circumference of the shaft is determined by the magnetic permeability at that point on the shaft. To extract the envelope of those magnitudes, the signal is full wave rectified, passed through a low pass filter to leave the envelope, and then AC coupled to eliminate the DC bias.

In testing, however, signal variations such as those of FIGS. 34A–D have been found. In these cases, a region of the envelope (the "overmodulation" region) actually passes below the horizontal axis. Due to the inherent nature of full wave rectification, this results in a complete loss of information in the overmodulation region.

Now this occurs can be seen by considering the effect on the output signal of an increase in torque, shown in FIGS. 35A–D. As torque increases, the upper boundary of the unrectified AC signal envelope moves upward, including the region where the upper boundary passes below the time axis (the overmodulation region). The lower boundary moves downward, of course, by the same amount. Note that the effect on the signal after rectification is a decrease in signal level in the overmodulation region, even though the signal level elsewhere increases.

Obvious problems arise from this condition since though torque increases, some region(s) of the shaft may exhibit a decrease in signal level while other regions exhibit an increase. For this reason, it is highly desirable to use a signal processing method which is not adversely affected by this phenomenon such as I channel detection without rectification. I channel detection without rectification is inherently impervious to overmodulation effects, since no full wave rectification is necessary (as it is with magnitude detection.) I channel detection monitors the in-phase component of the output signal around the circumference of the shaft, and if overmodulation exists in a certain region, the I channel signal from that region will nevertheless change in the same manner as the I channel signal from any other region of the shaft. The in-phase Component will decrease with a decrease in torque, and will increase with an increase in torque, even in those regions (as shown in FIGS. 34A–D and 35A–D) where the signal envelope crosses the horizontal axis. I channel detection, therefore, solves the problem of overmodulation in an extremely elegant and efficient way.

Though any means to detect phase or phase components can be employed, the quadrant multiplier mentioned above may be a four quadrant multiplier, a two quadrant multiplier, or any other means to accomplish I and/or Q channel detection. Further, the Signals obtained may be instantaneous values or integrated values, and may be used as any of the signals referred to in other embodiments elsewhere herein. Current or voltage or any appropriate signal value may be utilized, and use of the 1, Q, and/or other phase related values of such signal values is comprised by the invention.

A phase detector may also be used to obtain the phase $\psi$ between the input and output signals. The I and/or Q channel components could then be obtained simply (see mathematical relations shown above) given knowledge of the phase $\psi$.

As a further application of the concepts discussed herein, the phase and magnitude of the output signal may be measured directly before and after torque is varied, and the resultant change in output signal (both phase and magnitude) determined thereby. This may be done by subtracting the phasor value of the signal before and after the torque variation. By so doing, it is therefore possible to detect the actual change in signal, both in terms of phase and magnitude of that change. The magnitude (or conversely the phase) of the signal change can then be correlated with torque. As can be seen from FIG. 31, this variation in the change in the base signal with torque is more linear than the variation in the magnitude of the base signal itself.

Also, as in all other embodiments and all other aspects of the invention discussed herein, the invention is primarily a magnetostrictive stress (or stress variation) sensing system which may be used to detect torque (or torque variations), but which may also be used to detect stress (or stress variations) without necessarily detecting torque (or torque variations). That is, the phrases "torque", "torque sensing", and the like used anywhere herein may be replaced with the phrases "stress", "stress sensing", and the like, with the invention being used to monitor stress (or stress variations).

The invention may also be used to monitor force by detecting the stress produced by that force. Further, since strain is related to stress, it may also function as a strain or deflection sensing system as well. Hence, the invention in any of its embodiments is essentially a device or method for detecting stress and/or variations thereof, and it may ultimately be used as any one of a force, torque, deflection (displacement), strain, or (purely) stress sensing system depending on the particular application to which it is applied.

As in other embodiments shown herein, the magnetostrictive sensor type is not restricted to any one design, but may be a cross, four branch, two branch, solenoidal, or any other design type.

FORCE VARIATION DETECTION EMBODIMENTS

Stress/strain variation detection has many applications, and as noted elsewhere herein, the present invention is not limited to the applications shown. Although prior discussion has laid emphasis on detection of torque variations, including summaries of extensive data taken by applicants, throughout their work the inventors have considered their invention to be primarily a stress/strain variation detector, capable of detecting variations in any external loading, such as force, deflection, or torque, which causes variations in stress/strain.

Torque itself, is in reality, simply a force (or forces) which acts through a distance. Hence torque variation detection is, in reality, force variation detection, and all of the embodiments presented herein described in the language of torque variation are effectively, equivalently, and equally as well, also embodiments for force variation. Misfire itself is actually a variation (reduction) of force from the piston transmitted through the connecting rod which causes torque variation in a crankshaft. Although for marketing reasons, most experimental work done to date by applicants has emphasized torque variation detection, the methodology used is in essence, a stress/strain variation detection methodology, and hence is not limited to variations in any particular type of external load such as torque.

In essence, any methodology presented herein in any embodiment may be employed for detecting force or other loading variations. For example, in embodiment 2, $S_{c1}@t_1$ may comprise a first signal and $S_{c1}@t_2$ may comprise a second signal, wherein both signals are dependent, at least partially, on an external force (such as a brake pedal force, or road induced force, or engine misfire induced force) rather than dependent on engine torque. All of the discussions in embodiment 2 or any other embodiment which relate to specific signals produced by torque are therefore equivalently applicable to force (or other loading). For reasons of efficiency, those other embodiments will not be reiterated here. Some additional comments follow, however, which may aid in understanding of the invention.

For force variation detection, signals such as $S_C$ and $S_D$ may typically (though not necessarily) occur at the same, rather than different, locations of the load carrying member.

Wherever the word "torque" is used herein, the word "force" may be substituted. Depending on context, the words "deflection" or "stress" or "strain" may be substituted for "torque" as well. Further, wherever the words "shaft" or "torque carrying member" the words "load carrying member" may be substituted. "Torsional stress" may be replaced with "stress" or "shear stress" or "bending stress" or "normal stress" or other appropriate wording as would be obvious to those skilled in the art. Any other wording substitutions which would be obvious to those skilled in the art may be made as well. In the case of a magnetostrictive sensor, it is actually the stress/strain to which the signal is (at least in part) related. It is inconsequential whether the stress/strain originated from a torque or a force load.

Figure 36:
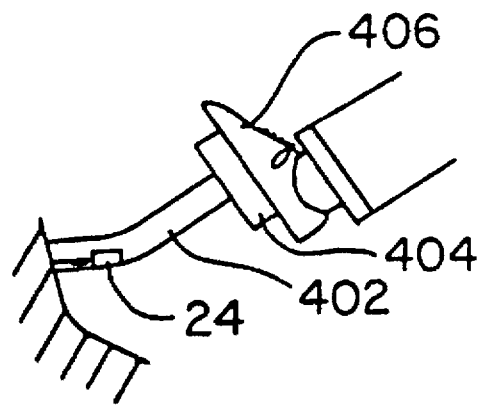
FIG. 36 shows a typical application of brake force variation detection according to the present invention.

FIG. 36 depicts one possible application for detection of varying force on an automotive vehicle brake pedal. As discussed in the "Background of the Invention" section herein, pumping (varying force) on the pedal by the operator results in poor performance by anti-lock braking (ABS) systems. By using the invention shown herein, such pumping may be readily detected (even though the exact amount of force applied may not be accurately measurable) and the computer controlling the ABS system may be alerted. The system could then take corrective measure to adjust for the pumping action, and thereby minimize stopping time.

In FIG. 36 a magnetostrictive sensor 24 is mounted directly onto the brake pedal. Direct mounting is not necessary (i.e., the sensor 24 may be adjacent the load carrying brake pedal shaft 402 with an air gap in between). Any suitable magnetostrictive sensor design may be used, such as, but not limited to, a cross, C core, branch, or solenoidal design.

When force is applied by the operator's foot 406 to the brake pedal foot surface 404, the force is transmitted via internal stresses in the brake pedal shaft 402. The magnetostrictive sensor 24 responds by producing a signal related to stress (e.g., bending, shear or normal stress) in a manner described extensively elsewhere herein. As force applied by the operator varies, the signal(s) produced by the sensor 24 vary as well. However, due to factors such as temperature and magnetic permeability variation, it is typically not possible to correlate the signal(s) directly with force (particularly for a mass-produced system). The methods described herein in any of the embodiments may, however, be applied to discern significant variation in applied force.

For example the analog signal from the sensor 24 at one point in time may be taken (e.g., discretized) and compared to the signal at another point in time using any of the methods described herein. Any number of such signals could be taken and compared in any variety of mathematical ways. Simple subtraction is one way; ratioing, another. If the result of the comparison produced by such operations exceed certain thresholds, then brake pumping may be indicated. The degree of such differences (ratios) may be used to indicate the degree of force variation occurring. Many more complex mathematical methods exist as well, some of which are described in other embodiments herein, and all and any such methods are comprised by the invention.

The invention comprises any method or apparatus which compares signals taken from a magnetostrictive sensor [or parts of an analog signal to other parts(s) of the analog signal] and uses such comparison to detect load variation, even though such signal may not be directly correlated with actual load.

As but one example, the standard deviation (actual or estimated) may used by itself to indicate pumping. The magnitude of the standard deviation will vary with the degree of pumping and could be used simply by itself to indicate either mere occurrence of, or the degree of, force variation. Alternatively, it could, of course, be used as part of a more complex mathematical relationship, such as, but not limited to, those discussed elsewhere herein. That is, the standard deviation, or any approximation thereof, could be used to derive a more sophisticated quantity (signal) and that quantity, since it would depend on force variation, may be used to detect force variation. Any other mathematical measure of variation, or estimate thereof, of the signal may be used as well. One such example is the variance (or any estimated or expected value thereof). Higher statistical moments than the second (variance is the second moment), or any modification thereof may be used as well. Further, any other value derived from two or more sensor signals which reflects variation in those signals may be used as well, and the invention is not limited to use of standard deviation, variance, or higher statistical moments. Further, variation in stress/load may be determined solely with reference to this standard deviation (or variance or other value). For example, a standard deviation value above a certain threshold would indicate a significant degree of load variation. Above another threshold might indicate a different degree of load variation. As discussed earlier, any of these values (such as standard deviation, estimates thereof, variance, etc) may typically be "moving" values.

The various embodiments explicitly describe other examples of mathematical treatments which, though described earlier in terms of misfire or roughness detection, may be directly used for force variation detection as well. In the mathematical treatments shown, minima of an analog signal may be sampled as well as maxima. These minima and maxima may then be used as any of the signals described in the mathematical treatments shown in the embodiments. For example, the minima may be treated as normal firing signals were treated in those embodiments, whereas the maxima may be treated similar to misfire events. When the two vary by any measure such as those described previously, force variation (pumping) may be indicated. For example, if a given maximum exceeds the minima by a particular multiple of the running, estimated or actual, standard deviation of any number of minima, a pumping indication may be given. Various particular multiples could correspond to various thresholds, and surpassing of the various thresholds would indicate different degrees of applied pedal force pumping.

The invention, in essence, comprises any method or means which compares different signals (or different parts of a continuous analog signal) which depend on stress, but which cannot necessarily be correlated accurately with stress, in order to detect variations in stress. Hence, without knowing the actual stress levels experienced by the structural member, valuable information can be gleaned from the signal itself. This concept comprises the essence of applicants' invention, and has been tested and proven to be of great value for automotive engine diagnostics. It has further practical value in additional applications such as, but not limited to, those shown herein.

Figure 37A:
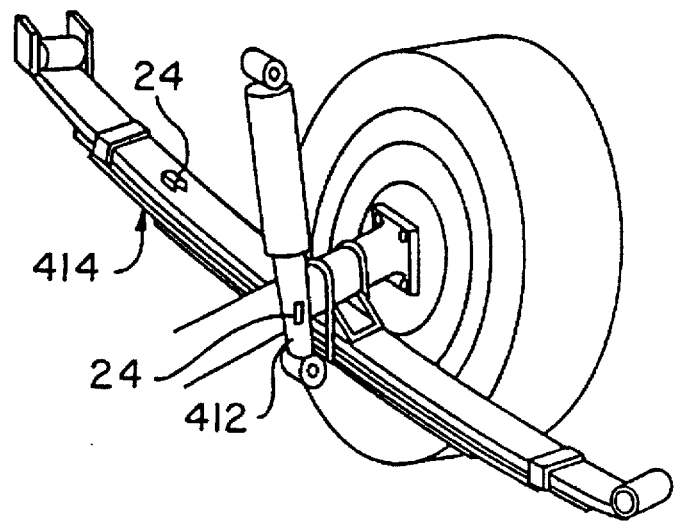
FIGS. 37A, 37B show typical applications of suspension system force variation detection according to the present invention.
Figure 37B:
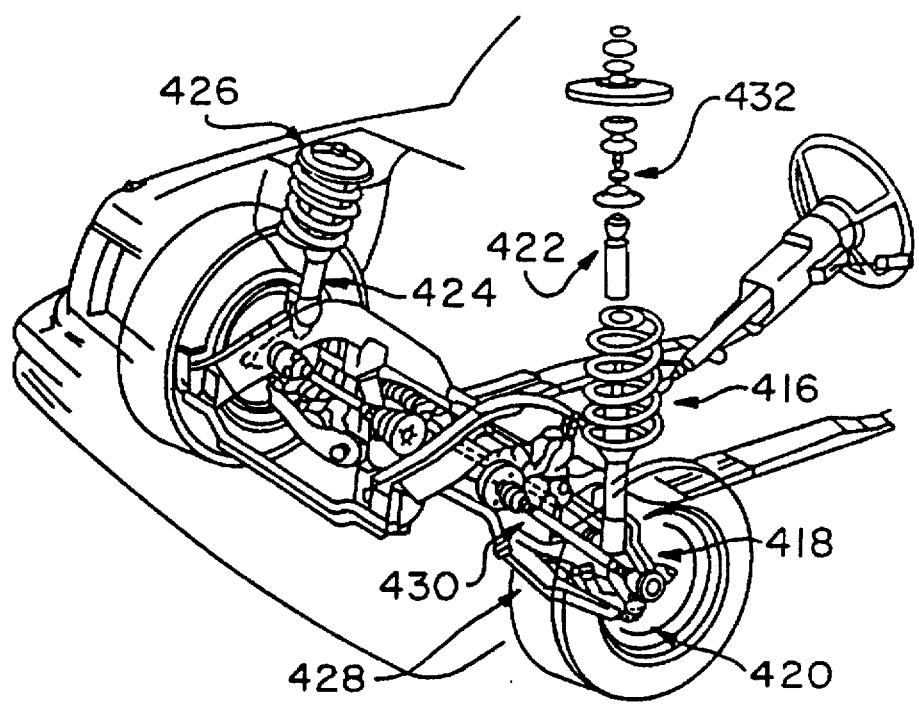

One of these applications comprises suspension system force variation detection. (See the "Background of Invention" section.) In such application, a magnetostrictive sensor 24 is mounted on some component which is near, on, or part of a mechanical portion of the suspension system. This is typically, but not necessarily either a strut/shock component 412 or a spring 414 as shown in FIG. 37A. It may also be any of the suspension system components shown in FIG. 37B, or any component in any other type of suspension system different from those shown in FIGS. 37A and 37B. (Although sensors may be shown in more than one location, typically only one location is required.) Sudden variations in strut force produced by rough roads are then detected by the sensor 24 in any of the manners described hereinbefore, since its signal is related to (though typically not directly correlated with) the force(s) transmitted through any of the components of the suspension system. Such sudden variations in suspension system forces can then be dynamically compensated for by the vehicle's electronically controlled suspension system. Any quantized value, such as any of those discussed in any embodiment herein, which were related to force or torque variation could be used to detect various degrees of road induced force variation. Depending on the degree of severity of the force variations, the degree of corrective response is modified to maximize the smooth ride of the passengers.

Any such suspension force variation detection method or means which comprises comparison of different signals (or different parts of an analog signal) which are dependent on, but not correlated accurately with force, are comprised by the present invention. The sensor 24 itself may be of any suitable magnetostrictive sensor design, including, but not limited to, a cross, C core, branch, or solenoidal design. It may be attached directly to any force carrying member in the vehicle, or it may merely be mounted close to such member, deriving its signal through an air gap between it and said member. It may also produce a signal which is related to any type of stress (bending, shear, normal, etc.)

Figure 38A:
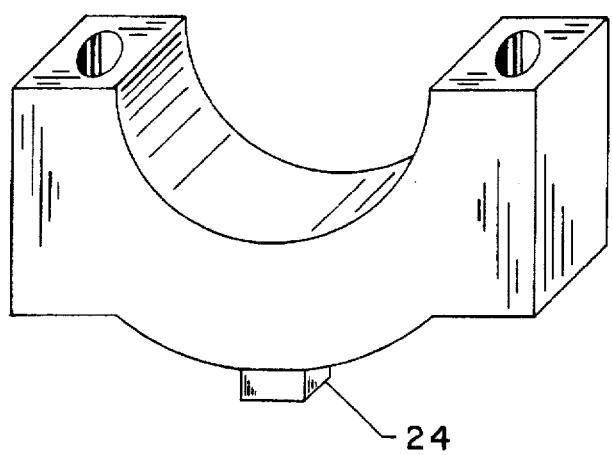
FIGS. 38A, 38B show embodiments of the present invention using force/stress variation detection to indicate misfire.
Figure 38B:
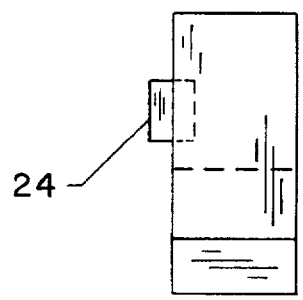

A still further application comprises misfire detection via force, rather than torque variation detection. One method for doing this is illustrated in FIG. 38 where a magnetostrictive sensor 24 is shown mounted close to, or on, an engine bearing cap 422. Engine firings cause the bearing cap to be stressed. Misfire is indicated by a reduced (variation) in signal for a given firing as shown in other embodiments herein for a sensor mounted adjacent the crankshaft. Any part or component of the engine through which some amount of force due to cylinder firing is transmitted may be employed, and it is not essential that a bearing or any part thereof be used. All of the embodiments hereinbefore described for misfire detection using torque variation are therefore directly applicable to using a sensor responsive to stress induced by force such as the sensor 24 of FIG. 38.

As noted earlier herein, the invention also comprises use of derivative(s) (in the calculus sense) of the raw sensor signal or any processed version thereof. For example, rapid variation in stress/load is reflected in a rapid variation in the (typically magnetostrictive) sensor signal. This means the time rate of change (the time derivative) of the signal is high during the period of rapid change in stress/load. Hence a first (or higher order) time derivative of the signal may be used to indicate significantly rapid variation in stress and/or load. In practical application, this time derivative signal may be used according to any of the methods hereinbefore described for any embodiment. As but one example, in embodiment 2, $S_{C_1}@T_1$ may compromise a first time derivative signal, and $S_{C_1}@T_2$ may comprise a second time derivative signal. Each of these signals may then be used in the manner described in embodiment 2 for using such signals to discern variation in stress/force/torque. For reasons of efficiency, all of the earlier embodiments shown herein will not be reiterated with explicit reference to use of time derivative signals. Such use is, nevertheless, certainly comprised by the invention. However, to further clarify the use of time derivative signals, one other example comprising such shall be shown as follows.

Typically, as described earlier with regard to magnetostrictive sensors, the exact value for stress (or load such as force or torque) cannot usually be determined with significant accuracy. Yet in spite of this, as uniquely accomplished by various embodiments of the present invention, it is possible to determine when significant variation in stress (load) occurs. The time rate of change of the signal, while not directly correlated with the precise rate of change of stress (load), may be used to flag extremely rapid variation in stress (load). For example, in some applications, signal change with load, temperature, time drift, etc. may vary by a factor on the order of two or three. However, for the variations in signal due to load changes of the same order (two to three times), the time rate of change of the signal may vary by ten to a hundred, or even more, times. Hence, rapid variations in load could be detected by extreme levels of the time derivative of the signal, even though the signal itself only changes modestly. For a base (not time derivative) signal which depends on load but is not correlated accurately with load, variations in load of significance may correspond to variations in the signal which are on the order of the inaccuracy of the signal.

As a concrete example, consider a signal which has an accuracy of +/−50% (inaccurate by any standard). That is, the correlation between signal and load may at any time, and for any given structural member, vary between −50% to +50% of being precisely accurate. In this example, the variations to be detected themselves may be on the order of 50% to 100% of the base signal level. Hence, the capability for discerning whether or not a particular load varied more than by a certain threshold would be marginal at best. However, by monitoring the time rate of change of the signal under the same conditions, the variation in said time rate of change may be on the order of a factor of ten (1,000%). This would occur, for example, if a 100% signal increase took place in the time period of 1 second. Hence, in the present example, according to the present invention, a rate of change of 200% in the time derivative of the signal could be used to indicate a particular level of severity of load variation. This would give a more accurate indication than by using instead the signal level itself.

An additional benefit accrues by use of the time rate of change of the signal in that variations due to factors other than load (i.e., temperature, drift with time, etc.) are usually very slow and would have time rates of change of very low order—perhaps on the order of only a few percentage points variation. Changes in time rate of change of the signal due to load variations, on the other hand, would be a great deal larger. Hence, in many applications (see prior discussions on misfire, torque, brake pedal, and suspension systems), the time rate of change of the signal would be the best indication of variations due to load alone, exclusive of other factors.

Further, in testing done by the inventors, it has been noted that background signal levels (i.e., zero load signal levels) in magnetostrictive sensors vary significantly from the structural member to another (and even at different points on the same member) due to naturally occurring variations in magnetic permeability. However, the changes in signal due to applied load vary less severely than the actual base signal itself. This is because the magnetostrictive constant of materials typically used for structural members varies less radically from member to member (and location to location on a given member) than the magnetic permeability. The time rate of change of the signal therefore is largely dependent on the magnetostrictive constant. The signal itself on the other hand is largely dependent on permeability and much less dependent on the magnetostrictive constant.

Therefore, load variations are more readily reflected in time rate of change of the signal. For example, a load variation could result in a signal change of 3% from the baseline signal at one location of a structural member, but could show a 150% change in the time derivative of the signal. The same load variation on a second structural member could result in an 4% change in signal, but a 170% change in the time derivative of the signal (note that permeability varies more severely than the magnetostrictive constant). Hence, in the present example, variation in load would be more readily and more consistently detected by using the time derivative of the signal rather than the signal itself.

Hence, according to the present invention, a threshold level for time rate of change of the signal may be established. This does not have to be in terms of percentages as shown above, but may be a specific signal level. For example, a specific threshold value in milli-volts per second could be established that corresponded to 100% (or any other suitable percentage) change in the time derivative of the signal. When the time derivative exceeds that threshold, significant variation in stress (load) would be indicated. Various thresholds may be used to indicate various degrees of load variation.

The threshold does not have to correspond specifically to any given percentage change in time derivative of the signal. In fact, in many cases the time derivative might be zero, or approximately zero, whenever load is not varying. Hence a percentage change would involve division by zero and is not necessarily meaningful. The percentage change discussion of time derivative of the signal above may therefore be interpreted not as a limitation of application of the methods shown herein, but merely as an illustration which facilitates explication of the present invention. For this and other reasons, the thresholds discussed herein may be absolute numbers or relative value (such as, but not limited to, percentage). They may be determined via calculation based on prior signal, or signal time derivative, levels, and would therefore be in accord with much of the discussion found earlier herein.

Figure 39A:
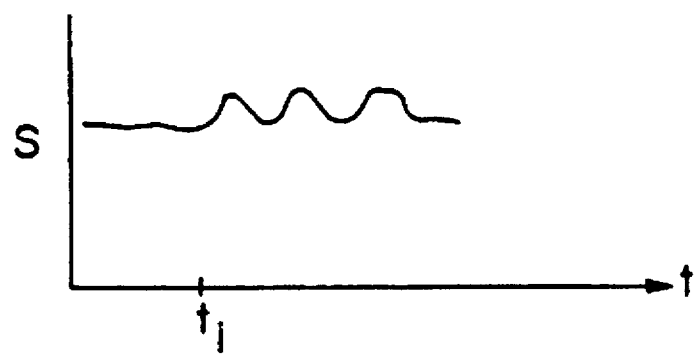
FIGS. 39A, 39B are graphical illustrations depicting typical behavior of the signal S which may be a voltage, a current, or any suitable signal and its time rate of change for an application such as detection of pumping of a brake pedal.
Figure 39B:
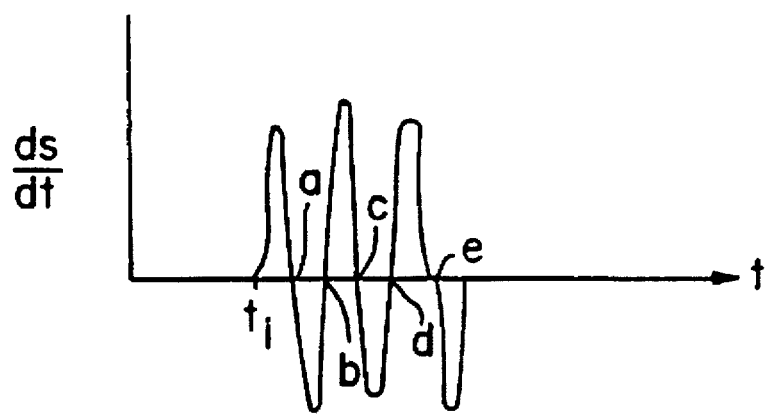

For an application such as detection of pumping of the brake pedal, FIGS. 39A and 39B depict typical behavior of the signal S and its time rate of change. At time $t_i$ pumping begins and in said figures, the signal, and its time derivative for three "pumps" are shown. The signal S may be a voltage, a current, or any suitable signal. In certain embodiments of the present invention, the peak points (local maxima) of the dS/dt signal curve (FIG. 39B) are used to indicate that "pumps" have occurred. These peaks can be compared to absolute threshold values (e.g., a certain milli-volt per second value) or to more relatively determined thresholds (e.g., a moving standard deviation or estimate thereof) according to any of the types of comparison procedures shown hereinbefore in order to determine that "pumping" has occurred. Such comparisons can be in any manner expressed or implied in any embodiment herein. For example, comparison may be done by subtraction, ratioing, or any other suitable means. Similarly, minima values may be used equally as well instead of, or in addition to, use of maxima. For example, the three minima "valleys" in FIG. 39B may be used to augment the maxima detection scheme, or used in lieu of said scheme, via comparison methods such as those described elsewhere herein. That is the minima may be compared to a moving standard deviation or similar quantities or it may be compared to an absolute standard. When the comparison yields a value (e.g., a difference or a ratio) which exceeds some chosen threshold, then pumping may be indicated. Although emphasis in the foregoing has been laid upon the time derivative of the signal S (i.e., dS/dt), the signal S itself (or any suitable signal derived from, or related to, it) may equally be used.

One embodiment in which both minima and maxima are used comprises subtracting one (e.g. a maximum) from the other (e.g., a minimum). This would obviously enhance the ability to make correct calls, since the relevant quantity used in detection would effectively be twice as great, e.g., $\Delta$(dS/dt)=dS/dt$_{max}$–dS/dt$_{min}$ is effectively twice dS/dt$_{max}$. The quantity $\Delta$(dS/dt) may then be used as the "signal" in any of the manners described elsewhere for using said signal to detect load variation.

Although the present discussion centers on application to brake pedal pumping detection, it is equally applicable to any other application as well, such as, but not limited to, suspension system loads, torque variations, and misfire detection.

In another embodiment, the "zero crossing" points (labeled "a" through "e" in FIG. 39B) may be detected and used to indicate pumping (or other load variation in other applications). For example, if a given number of zero crossings are detected in a certain period of time, pumping may be indicated. Zero crossings may, of course, be defined in the sense that the signal must exceed the zero signal line (the horizontal axis in FIGS. 39A and 39B) in the plus and minus directions by a certain amount, before it is called a definite zero crossing. Doing so eliminates false signals when the operator's foot is off the brake and the signal merely drifts slightly off of its base line. For FIG. 39A, the "zero" crossing may be defined as crossing of the base signal line (non-zero in the figure) rather than the actual zero signal axis.

Additionally, maximal and/or minimal slope values in FIG. 39B may be used to detect pumping (or other load variation) as well. In other words the second time derivative of S may be used in similar fashion to the manner in which use of the first derivative of S is described hereinabove. Further, any order derivative may be used in such similar fashion.

Peak (maxima or minima) detection of an electronic signal, as well as zero crossing detection, are readily accomplished by those skilled in the art, and it is not necessary herein to elaborate on methods for accomplishing same. The present invention merely uses peak detected (and/or zero crossing detected) signals in a novel, unique, and useful way to detect load variations.

In addition, by detecting when the operator applies pressure to the brake pedal, the electronic ABS control system may be alerted, and braking action may be initiated automatically and immediately. This initiation could even occur prior to wheel slip. Quicker stopping and enhanced safety would result.

Advantages Over Prior Art

This invention may thus be seen to solve the problems delineated in the "Background of the Invention" section in a simple, novel, and practical manner. While the above descriptions contain many specific examples, these should not be construed as limitations on the scope of the invention, but merely as exemplifications of preferred embodiments. Those skilled in the art will envision many other possibilities that are within its scope. For example, any of the embodiments may use any type of sensor(s) of any shape, size, or materials. Further, wherever the term "shaft" is used, any load transmitting member is intended, and the member may be of any material, size, or shape and may even be a torque disk, such as shown in U.S. Pat. No. 4,697,460. The load transmitting member may be coated with any material, such as plasma sprayed material, amorphous bonded strips, thin films, etc. The surface of the member or any attachments to it, may be treated in any way including shot peening, cold rolling, hot rolling, scoring, knurling, grinding, mechanical or laser scribing, other laser treatment, sand blasting, chemical treatments, electromechanical treatments, electromagnetic treatments, etc. Further, the load transmitting member itself or any attachments to it may have been subjected to any type of treatment such as vibration shaking; shock; heat treatments; torsional or axial overstraining; magnetic treatments including degaussing, magnetic heating, inverse magnetostriction, and magnetostriction; or any other type of treatment.

For the misfire detection embodiments, any means may be used to determine which cylinder is or should be firing, such as a flywheel position/speed sensor, a cam shaft sensor, ignition system signaling (such as voltage or current sensing on spark plug wires, distributor, the spark plugs), optical sensor(s), cylinder pressure sensor(s), crankshaft position sensor(s), drive shaft position sensor(s), etc. Any of such cylinder firing stroke detecting means may be located anywhere suitable. Further, the load related signal sensor 24 may be located anywhere in suitable proximity to the load transmitting member. In internal combustion engines, this may be in a journal bearing sleeve, the engine block, a bearing cap; at any location along the crankshaft; just before, just after, or inside the transmission; next to the flywheel; along the driveshaft; or in any location along the power train. It may even be located next to a torque disk such as that described in U.S. Pat. No. 4,697,460.

Any of the signals may be either analog or digital, as may any signal processing or any integration, differentiation, or any difference, summation, subtraction, or division. Any measurement, comparison, or processing may be done via analog or digital means. When the term integration is used, it also meant to include a summation, weighted or otherwise, of values over some appropriate range or interval. Similarly when summation is used it is also meant to include integration. Further, any signal may be used directly, be amplified, or be transformed in any manner. Any signal may be an instantaneous value, an integrated value, an average value, weighted or otherwise, one or more Fourier components, a filtered value, a summation of other signal values, or any other suitable values representative of the state of stress/strain in the load transmitting member. As well, where any value derived from statistically processing a set of signals (e.g., mean, variance, or standard variation) is employed, estimated values may be used in lieu of the actual values. Expected values for such statistically processed values may be used as well. Further, any electronic means for detecting a signal from a sensor 24 or its peak, shape, integrated value, or any other type or form of the signal may be used.

Further, each of the signals described in any and all embodiments may be the raw signal output of sensor 24 or any processed version thereof. Particularly, any or all of the signals may have any or all background components due to inductive coupling, capacitive coupling, electronic biasing, or any other causes subtracted out, filtered out, eliminated via a bridge circuit, or removed by any other means. The signals may also be amplified or phase shifted in any manner as well. In addition the signals from various cylinders in any internal combustion engine embodiment may be used to construct a torque (or other load) nonuniformity vector and/or a load nonuniformity index or metric, such as that shown by Ribbens for RPM sensing of misfire in SAE Paper No. 901768. Such nonuniformity index (vector, metric) methodology may also be applied to force variation applications such as brake pedals and suspension systems.

Figure 13:
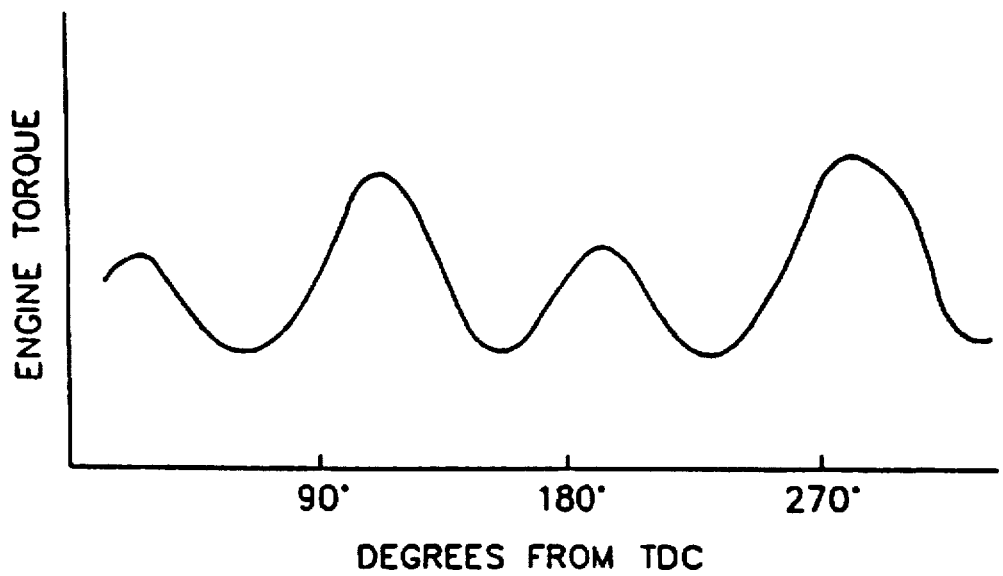
FIG. 13 is a graph illustrating a typical engine torque curve at high engine speed.

In addition, any sensor may have negative sensitivity rather than positive sensitivity as implied herein in discussions of the various embodiments. Hence, a signal representing an incomplete cylinder firing or a misfire would, for a positive signal to torque sensitivity, be of lesser strength than the signal from a complete firing. In contrast, the incomplete or misfire signal for negative signal to torque sensitivity would be greater than the signal from a complete firing, and in such case, misfire may, in some embodiments, be indicated when the signal became greater a particular threshold. As would be readily understood by those having skill in the art, either type sensor may be used, not only in misfire applications, but in all other possible applications as well.

Where the terms power stroke, firing event, or non-firing event are used, they may also refer to some time after the power stroke or firing/non-firing event when the effects are still felt in the shaft. This is true of force applications as well. As one example of this, consider the torque level shown in FIG. 12 as generated by a typical four cylinder engine at high RPM. Note that the shape of the torque curve is different from that of the low RPM case shown in FIG. 4. In particular, in the high RPM case, two, rather than one, local torque maxima are delivered per cylinder firing event. In FIG. 13, the first maximum torque point occurs shortly after the spark ignites; the second maximum torque point is the result of inertial forces related to piston deceleration. As shaft RPM increases, the effect of the second torque maximum becomes more and more pronounced. The methods according to the present invention, therefore, may be applicable to either torque peak, that is, signals may be obtained at or near either or both torque maxima and either or both of said signals may be used in any embodiment. The invention is, however, not restricted to the use of signals related to torque maxima, rather any suitable signals may be used. Signals generated by different cylinders or by the same cylinder at different times may be compared. All of the foregoing logic applies equally as well to force variation detection cases.

Though expressed for the most part herein as subtraction, any other suitable method or means for comparing signals, such as division, may be used as well, either instead of, or in addition to, subtraction. Further, many statistical methods or means which can be employed in any form for signal processing are within the scope of the invention. These include averaging (first statistical moment), moving averages, standard deviation (second statistical moment), moving standard deviation, higher statistical moments (moving or otherwise), autocorrelation, cross-correlation, etc. Different statistical methods may as well be combined. For example, in the methodologies shown in embodiments 2 and 4, a standard deviation value over a number (N) of events may be used, but instead of the mean value, only the Nth value is compared to the N+1 value. For example, for N=10, the standard deviation for 10 events is calculated, but the 11th firing event signal is then compared with the 10th signal (rather than with the mean signal over 10 events.) The number of standard deviations by which the 11th signal exceeds the 10th is then the quantified value which is compared with a specific threshold. This logic is naturally extendible to other embodiments and any such combination of different statistical methods is comprised by the invention.

Some embodiments, such as Embodiment 3 wherein the percentage of full, or other, scale signals are calculated, may lend themselves to engine control quite advantageously. In cases, such as the special case delineated in Embodiment 3, where maxima and minima signal levels may be correlated directly with known values of shaft torque (or other load), true torque (or other load) information may be supplied directly to the engine control system. In other cases, useful input to engine control systems may be provided by the relative signal strength values which reflect relative stress/strain/deflection levels in the shaft. Neural networks, fuzzy logic, or other aids may be used to process the information provided by the signal strength values. For example, any system of monitoring and control which recognizes the percentage of full scale being delivered during any given power stroke, or series of power strokes, may be enhanced in performance. For instance, if power for passing is needed, the control system may demand 100%, or nearly 100%, of the full scale signal for each cylinder without actually having determined the value of torque that 100% of the full scale signal corresponded to. If economy is needed, the control system may dictate the percentage of full scale appropriate to maximize gas mileage. Neural networks may be used to learn what percentage of full scale corresponds to the optimum economy or power for any given driving condition and demand that future system response "home in" on that percentage for that given condition.

The sensors may, in any given application, operate via the principle of magnetostriction. Other types of sensors which sense the stress/strain/deflection state of the load carrying member may be readily used according to the present invention. Emphasis in the specification has been placed on magnetostrictive type sensors since they offer many advantages over other types of sensors and since the embodiments described herein overcome the disadvantages of magnetostrictive sensors. In almost all applications torque (or other load such as force) is not being directly measured, and the sensor is not a torque (force or other load) sensor. However, a torque sensor may be used whether it is non-magnetostrictive or magnetostrictive.

For example, magnetostrictive sensors may be employed with any type of excitation including constant amplitude voltage, constant amplitude current, constant amplitude flux, direct current, direct voltage, direct flux, constant phase, etc. Further, the sensor may be of any type design and may perform signal detection in any possible way, such as described in SAE paper #890483.

In addition, the method and apparatus according to present invention may be used in any application where comparison of signals which vary with the stress/strain of a structural member may be used to advantage. Such applications may include engine knock detection, transmissions, electric steering, anti-lock and electric brakes, traction control systems, suspension systems, brake pedals, etc. For example, in traction control or braking systems, Embodiment 3 may be used at any number of points around an axle shaft circumference. The relative signal strength at each point may be calculated as a percentage of full, or some other, scale signal and employed with a feedback system which typically would vary brake application or engine torque, engine speed or engine power to optimize the signal strength to thereby optimize traction or braking torque. Other applications include machine tool monitoring, bearing failure sensing, electric motors, generators, and any apparatus wherein comparison of signals which are at least partially dependent on stress may be used to advantage.

For internal combustion engines, the method and apparatus according to the present invention may even be used to detect the angular position at which cylinder firing occurs, that is, the peak pulse point. This may be used to control and optimize ignition timing. Shaft RPM may also be determined, since angular distance between firings is known and the time between firings indicated by torque peaks may also be determined. Further, the invention comprises any use of magnetostrictive sensing in any manner to detect misfire, roughness, knock, or other torque variations as well as force variations in any practical application.

Any of the locations C, D, E, P, R, T or any others discussed or implied herein may be points or regions of the shaft 20. Although the descriptions herein primarily relate to a four cylinder, four stroke engines, any number of cylinders and any number of strokes may be used. Also, any of the embodiments may be used separately or in combination in any degree with any one, or more than one, of the others. Therefore, it is to be understood that the invention is not to be limited to the specific embodiments disclosed, and that modifications and other embodiments are intended to be included within the scope of the appended claims.

The cross design sensor of FIG. 2 may be used in any of the embodiments with the driver coil being on the inner core and the pickup coil being on the outer core. This particular configuration is comprised by the invention in addition to the more traditional cross design configuration where the excitation coil is the outermost of the two coils.

Many modifications and other embodiments of the invention will come to one skilled in the art having the benefit of the teachings presented in the foregoing descriptions and the associated drawings.

That which is claimed is:

1. A method for detecting variation in load in a load transmitting member which experiences a plurality of load producing events at different times, at least one of which load producing events may be a zero load, said method comprising the steps of:
   obtaining a plurality of signals at different times, each such signal related to, but not directly correlated with, stress in the member produced by at least one load producing event;
   using said plurality of signals to obtain a statistical value indicative of the degree of variation in the plurality of signals over time, and
   using said statistical value to detect variation in load between different load producing events occurring at different times.

2. The method of claim 1 wherein
   the statistical value is one of a standard deviation, an estimate of a standard deviation, a variance, an estimate of a variance, and an expectation value, and
   the variation in load is a variation in force.

3. The method of claim 1 wherein
   said load transmitting member is a component of a brake pedal system.

4. The method of claim 1 wherein
   said load transmitting member is a component of a brake pedal system wherein the signals are obtained by using a magnetostrictive sensor, and wherein said method further comprises the step of providing an indication of variation in brake pedal force to an anti-lock braking system control unit.

5. The method of claim 1 wherein
   said load transmitting member is a component of a suspension system.

6. The method of claim 1 wherein
   said load transmitting member is a component of a suspension system wherein the signals are obtained by using a magnetostrictive sensor, and wherein said method further comprises the step of providing an indication of suspension system force variation to an electronic monitoring unit.

7. A method for detecting variation in load in a load transmitting member which experiences a plurality of load producing events at different times, at least one of which load producing events may be a zero load, said method comprising the steps of:
   obtaining a plurality of signals which result from the electrical output of a magnetostrictive sensor, wherein each such signal is related to stress in the member produced by at least one load producing event;
   using said plurality of signals to obtain a statistical value indicative of the degree of variation in the plurality of signals over time,
   comparing said statistical value to a threshold to detect variation in load between different load producing events occurring at different times.

8. The method of claim 7 wherein the variation in load is a variation in force.

9. A method for detecting variation in load in a load transmitting member which experiences a series of load producing events at different times, said method comprising the steps of:
   obtaining a first signal related to, but not necessarily directly correlated with, a derivative with respect to time of stress in the member produced by a first at least one load producing event at a first time;
   obtaining a second signal related to, but not necessarily directed correlated with, a derivative with respect to time of stress in the member produced by a second at least one load producing event at a second time different from the first time; and
   comparing said first signal to said second signal to detect the variation in load between different load producing events occurring at different times
   wherein said first and second times may each be an interval in time of any duration including a zero duration point in time.

10. The method of claim 9 wherein
    the derivatives with respect to time of stress in the member produced by the first and second at least one load producing events are first derivatives.

11. The method of claim 9 wherein
    the derivatives with respect to time of stress in the member produced by the first and second at least one load producing events are derivatives higher than the first derivative.

12. The method of claim 9 wherein
    said load transmitting member is a component of a brake pedal system wherein the signals are obtained by using a magnetostrictive sensor, and wherein said method further comprises the step of providing an indication of variation in brake pedal force to an anti-lock braking system control unit.

13. The method of claim 9 wherein
    said load transmitting member is a component of a suspension system wherein the signals are obtained by using a magnetostrictive sensor, and wherein said method further comprises the step of providing an indication of suspension system force variation to an electronic monitoring unit.

14. A method for detecting variation in load in a load transmitting member which experiences a plurality of load producing events, at least one of which may be a zero load, said method comprising the steps of:

obtaining a plurality of signals, each related to, but not directly correlated with, stress in the member produced by at least one load producing event;

using said plurality of signals to obtain a statistical value indicative of the degree of variation in the plurality of signals, comparing said statistical value to a threshold to detect variation in load between different load producing events.

15. The method of claim 14 wherein the statistical value is a moving standard deviation.

16. The method of claim 14 wherein the statistical value is an estimate of a moving standard deviation.

17. A method for detecting variation in load in a load transmitting member which experiences a plurality of load producing events, at least one of which may be a zero load, said method comprising the steps of:

obtaining a plurality of signals which result from the electrical output of a magnetostrictive sensor, wherein each such signal is related to stress in the member produced by at least one load producing event;

using said plurality of signals to obtain a statistical value indicative of the degree of variation in the plurality of signals, comparing said statistical value to a threshold to detect variation in load between different load producing events.

18. The method of claim 17 wherein the statistical value is a moving standard deviation.

19. The method of claim 17 wherein the statistical value is an estimate of a moving standard deviation.

* * * * *